US007404000B2

(12) United States Patent
Lolayekar et al.

(10) Patent No.: US 7,404,000 B2
(45) Date of Patent: *Jul. 22, 2008

(54) PROTOCOL TRANSLATION IN A STORAGE SYSTEM

(75) Inventors: Santosh C. Lolayekar, Sunnyvale, CA (US); Yu-Ping Cheng, San Jose, CA (US); Wan-Hui Lee, Milpitas, CA (US); Renato E. Maranon, Livermore, CA (US); Enyew Tan, San Jose, CA (US)

(73) Assignee: EMC Corporation, Hopkinton, MA (US)

( * ) Notice: Subject to any disclaimer, the term of this patent is extended or adjusted under 35 U.S.C. 154(b) by 1281 days.

This patent is subject to a terminal disclaimer.

(21) Appl. No.: 10/051,415

(22) Filed: Jan. 18, 2002

(65) Prior Publication Data

US 2003/0093541 A1    May 15, 2003

Related U.S. Application Data

(60) Provisional application No. 60/325,704, filed on Sep. 28, 2001.

(51) Int. Cl.
*G06F 15/16* (2006.01)
(52) U.S. Cl. .................... 709/230; 709/231; 709/249; 709/250
(58) Field of Classification Search ................. None
See application file for complete search history.

(56) References Cited

U.S. PATENT DOCUMENTS 5,331,631 A * 7/1994 Teraslinna .................. 370/392

| 5,365,526 A | 11/1994 | Wu |
| 5,436,886 A | 7/1995 | McGill |
| 5,596,569 A | 1/1997 | Madonna et al. |

(Continued)

FOREIGN PATENT DOCUMENTS

| JP | 2000339098 | 12/2000 |
| JP | 2001014147 | 1/2001 |
| WO | WO 99/56433 | 11/1999 |
| WO | WO 01/06385 A1 | 12/2001 |

OTHER PUBLICATIONS

Julian Satran, draft-ietf-ips-iSCSI-07.txt, Jul. 20, 2001, 160 pages.

(Continued)

*Primary Examiner*—John B. Walsh
(74) *Attorney, Agent, or Firm*—Barry N. Young

(57) ABSTRACT

A storage switch in accordance with an embodiment of the invention is a highly scalable switch that allows the creation of a SAN that is easy to deploy and that can be centrally managed. Moreover, such a storage switch also allows the deployment of a global infrastructure, allowing the resources of the SAN, such as storage devices, to essentially be positioned anywhere on the globe. Further, such a storage switch allows a multi-protocol SAN, e.g., one that includes both iSCSI or Fibre Channel, and processes data packets at "wire speed." To further enable wire-speed processing, a switch in accordance with the invention has "intelligence" distributed to each of its linecards, through which it classifies packets into data and control packets, it performs virtualization functions, and it performs protocol translation functions. A switch in accordance with the invention further performs serverless storage services such as mirroring, snapshot, and replication.

35 Claims, 38 Drawing Sheets

U.S. PATENT DOCUMENTS

| | | | |
|---|---|---|---|
| 5,719,854 A | 2/1998 | Choudhury et al. | |
| 5,894,481 A * | 4/1999 | Book | 370/412 |
| 5,898,841 A | 4/1999 | Higgins | |
| 5,905,873 A * | 5/1999 | Hartmann et al. | 709/249 |
| 5,941,972 A | 8/1999 | Hoese et al. | |
| 5,954,799 A | 9/1999 | Goheen et al. | |
| 6,023,733 A | 2/2000 | Periasamy et al. | |
| 6,057,863 A | 5/2000 | Olarig | 345/520 |
| 6,067,545 A | 5/2000 | Wolff | 707/10 |
| 6,092,178 A | 7/2000 | Jindal et al. | |
| 6,101,508 A | 8/2000 | Wolff | 707/218 |
| 6,115,752 A | 9/2000 | Chauhan | |
| 6,148,414 A | 11/2000 | Brown et al. | 714/9 |
| 6,154,787 A | 11/2000 | Urevig et al. | |
| 6,157,963 A | 12/2000 | Courtright, II et al. | |
| 6,185,601 B1 | 2/2001 | Wolff | 709/203 |
| 6,195,703 B1 | 2/2001 | Blumenau et al. | |
| 6,199,112 B1 | 3/2001 | Wilson | 709/227 |
| 6,199,146 B1 | 3/2001 | Pence | 711/154 |
| 6,201,810 B1 | 3/2001 | Masuda et al. | |
| 6,209,023 B1 | 3/2001 | Dimitroff | 709/211 |
| 6,212,606 B1 | 4/2001 | Dimitroff | 711/147 |
| D442,585 S | 5/2001 | Toussi et al. | D14/356 |
| 6,247,099 B1 | 6/2001 | Skazinski et al. | 711/141 |
| 6,260,120 B1 | 7/2001 | Blumenau | 711/152 |
| 6,272,534 B1 | 8/2001 | Guha | 709/216 |
| 6,292,489 B1 | 9/2001 | Fukushima et al. | |
| 6,304,578 B1 | 10/2001 | Fluss | |
| 6,389,432 B1 | 5/2002 | Pothapragada et al. | |
| 6,400,730 B1 | 6/2002 | Latif et al. | |
| 6,421,723 B1 | 7/2002 | Tawil | |
| 6,434,656 B1 | 8/2002 | Downer et al. | |
| 6,438,595 B1 | 8/2002 | Blumenau et al. | |
| 6,470,013 B1 | 10/2002 | Barach et al. | |
| 6,493,750 B1 | 12/2002 | Mathew et al. | |
| 6,621,818 B1 | 9/2003 | Szczepanek et al. | |
| 6,647,019 B1 | 11/2003 | McKeown et al. | |
| 6,687,247 B1 | 2/2004 | Wilford et al. | |
| 6,693,906 B1 | 2/2004 | Tzeng | |
| 6,701,411 B2 * | 3/2004 | Matsunami et al. | 711/114 |
| 6,725,393 B1 | 4/2004 | Pellegrino et al. | |
| 6,745,207 B2 | 6/2004 | Reuter et al. | |
| 6,785,290 B1 | 8/2004 | Fujisawa et al. | |
| 6,831,916 B1 | 12/2004 | Parthasarathy et al. | |
| 6,880,070 B2 * | 4/2005 | Gentieu et al. | 712/228 |
| 6,947,737 B2 * | 9/2005 | Massie et al. | 455/426.1 |
| 6,993,027 B1 | 1/2006 | Kadambi et al. | |
| 7,089,293 B2 | 8/2006 | Grosner et al. | |
| 7,200,144 B2 * | 4/2007 | Terrell et al. | 370/389 |
| 2001/0020254 A1 | 9/2001 | Blumenau et al. | 709/229 |
| 2001/0034812 A1 | 10/2001 | Ignatius et al. | 711/112 |
| 2001/0037371 A1 | 11/2001 | Ohran | 709/214 |
| 2002/0004883 A1 | 1/2002 | Nguyen et al. | |
| 2002/0057684 A1 | 5/2002 | Miyamoto et al. | |
| 2002/0080786 A1 | 6/2002 | Roberts | |
| 2002/0099797 A1 | 7/2002 | Merrell et al. | |
| 2002/0099914 A1 | 7/2002 | Matsunami et al. | |
| 2002/0103889 A1 | 8/2002 | Markson et al. | |
| 2002/0116535 A1 | 8/2002 | Ryals et al. | |
| 2002/0133539 A1 | 9/2002 | Monday | |
| 2002/0156987 A1 | 10/2002 | Gajjar et al. | |
| 2002/0194324 A1 | 12/2002 | Guha | |
| 2003/0074473 A1 * | 4/2003 | Pham et al. | 709/246 |
| 2003/0236945 A1 | 12/2003 | Nahum | |

OTHER PUBLICATIONS

American National Standard, Information Systems—dpANS Fibre Channel Protocol for SCSI, Rev. 012, Robert Snively, Dec. 4, 1995, 75 pages.
Julian Satran, draft-ietf-ips-iSCSI-09.txt, Nov. 19, 2001, 230 pages.
Molero, X, et al. On the Switch Architecture for Fibre Channel Storage Area Networks, Eighth International Conf. on Parallel and Distributed Systems 2001. Proceedings, Jun. 2001, pp. 484-491.
Blunden Metal: "Storage Networking Virtualization what it all about" IBM Red Books, Dec. 2000.

* cited by examiner

VTD

VTD ID
FlowID
Extent Descriptors (e.g., size, location)
# of outstanding commands
Max # of commands
Response time
LUN
TCP control block index
S_ID/D_ID
MaxCmdSN
Total open sequences

Fig. 7a

| Byte | Byte 0 | Byte 1 | Byte 2 | Byte 3 |
|---|---|---|---|---|
| 0 | X I  0x01 | FRW 00 ATTR | Rsvd | CRN or Rsvd |
| 4 | TotalAHSLength | DataSegmentLength | | |
| 8 | Logical Unit Number (LUN) | | | |
| 16 | Initiator Task Tag | | | |
| 20 | Expected Data Transfer Length | | | |
| 24 | CmdSN | | | |
| 28 | ExpStatSN or ExpDataSN | | | |
| 32 | SCSI Command Descriptor Block (CDB) | | | |
| 48 | | | | | iSCSI Command PDU

Fig. 8a

| Byte | Byte 0 | Byte 1 | Byte 2 | Byte 3 |
|---|---|---|---|---|
| 0 | 1 1  0x31 | 1 | Rsvd (0) | |
| 4 | Rsvd (0) | | | |
| 16 | Initiator Task Tag | | | |
| 20 | Target Transfer Tag | | | |
| 24 | StatSN | | | |
| 28 | ExpCmdSN | | | |
| 32 | MaxCmdSN | | | |
| 36 | R2TSN | | | |
| 40 | Buffer Offset | | | |
| 44 | Desired Data Transfer Length | | | |
| 48 | | | | | iSCSI R2T PDU

Fig. 8b

| Byte | Byte 0 | Byte 1 | Byte 2 | Byte 3 |
|---|---|---|---|---|
| 0 | 0 0   0x05 | F | Rsvd (0) | |
| 4 | Rsvd (0) | DataSegmentLength | | |
| 8 | LUN or Reserved (0) | | | |
| 16 | Initiator Task Tag | | | |
| 20 | Target Transfer Tag or 0xffffffff | | | |
| 24 | Rsvd (0) | | | |
| 28 | ExpCmdSN | | | |
| 32 | Rsvd (0) | | | |
| 36 | DataSN | | | |
| 40 | Buffer Offset | | | |
| 44 | Rsvd (0) | | | |
| 48 | Data | | | | iSCSI Write Data PDU

Fig. 8c

| Byte | Byte 0 | Byte 1 | Byte 2 | Byte 3 |
|---|---|---|---|---|
| 0 | 1 1   0x25 | F      O U S | Rsvd (0) | Status or Rsvd |
| 4 | Rsvd (0) | DataSegmentLength | | |
| 8 | Rsvd (0) | | | |
| 16 | Initiator Task Tag | | | |
| 20 | Rsvd (0) | | | |
| 24 | StatSN or Rsvd (0) | | | |
| 28 | ExpCmdSN | | | |
| 32 | MaxCmdSN | | | |
| 36 | DataSN | | | |
| 40 | Buffer Offset | | | |
| 44 | Residual Count | | | |
| 48 | Data | | | | iSCSI Read Data PDU

Fig. 8d

| | Byte 0 | Byte 1 | Byte 2 | Byte 3 |
|---|---|---|---|---|
| 0 | 1 1    0x21 | 1 rsv 0 u 0 u 0 | Status | Response |
| 4 | Rsvd (0) | DataSegmentLength | | |
| 8 | Rsvd (0) | | | |
| 16 | Initiator Task Tag | | | |
| 20 | Basic Residual count | | | |
| 24 | StatSN | | | |
| 28 | ExpCmdSN | | | |
| 32 | MaxCmdSN | | | |
| 36 | ExpDataSN or Rsvd (0) | | | |
| 40 | ExpR2TSN or Rsvd (0) | | | |
| 44 | Bidi-Read Residual Count | | | |
| 48 | Sense Data and Response Data (optional) | | | | iSCSI Response PDU

Fig. 8e

| Bits Word | 31-24 | 23-16 | 15-08 | 07-00 |
|---|---|---|---|---|
| 0 | R_CTL | D_ID | | |
| 1 | rsvd | S_ID | | |
| 2 | TYPE | F_CTL | | |
| 3 | SEQ_ID | DF_CTL | SEQ_CNT | |
| 4 | OX_ID | | RX_ID | |
| 5 | RLTV_OFF | | | |

FC Frame Header

Fig. 8f

| Field Name | Description | Size |
|---|---|---|
| FCP_LUN | logical unit number | 8 bytes |
| FCP_CNTL | control field | 4 bytes |
| FCP_CDB | SCSI command descriptor block | 16 bytes |
| FCP_DL | Data Length | 4 bytes |

FCP_CMND Payload

Fig. 8g

| Field Name | Description | Size |
|---|---|---|
| DATA_RO | Relative offset of first byte of FCP_DATA IU that follows | 4 bytes |
| BURST_LEN | length of FCP_DATA IU that follows | 4 bytes |
| rsvd | | 4 bytes |

FCP_XFR_RDY Payload

Fig. 8h

| Field Name | Description | Size |
|---|---|---|
| rsvd | | 4 bytes |
| rsvd | | 4 bytes |
| FCP_STATUS | field validity and SCSI status | 4 bytes |
| FCP_RESID | residual count | 4 bytes |
| FCP_SNS_LEN | Length of FCP_SNS_INFO field | 4 bytes |
| FCP_RSP_LEN | Length of FCP_RSP_INFO field | 4 bytes |
| FCP_RSP_INFO | FCP response info | m bytes |
| FCP_SNS_INFO | FCP sense info | n bytes |

FCP_RSP Payload

Fig. 8i (Classification - PACE - iSCSI - ingress)

(Classification - PACE - iSCSI - egress)

(classification - PACE -
FCP - ingress)

(classification - PACE -
FCP - egress)

(Classification - PPU - ingress)

(Classification - PPU - egress)

(Virtualization Ingress - cmd)

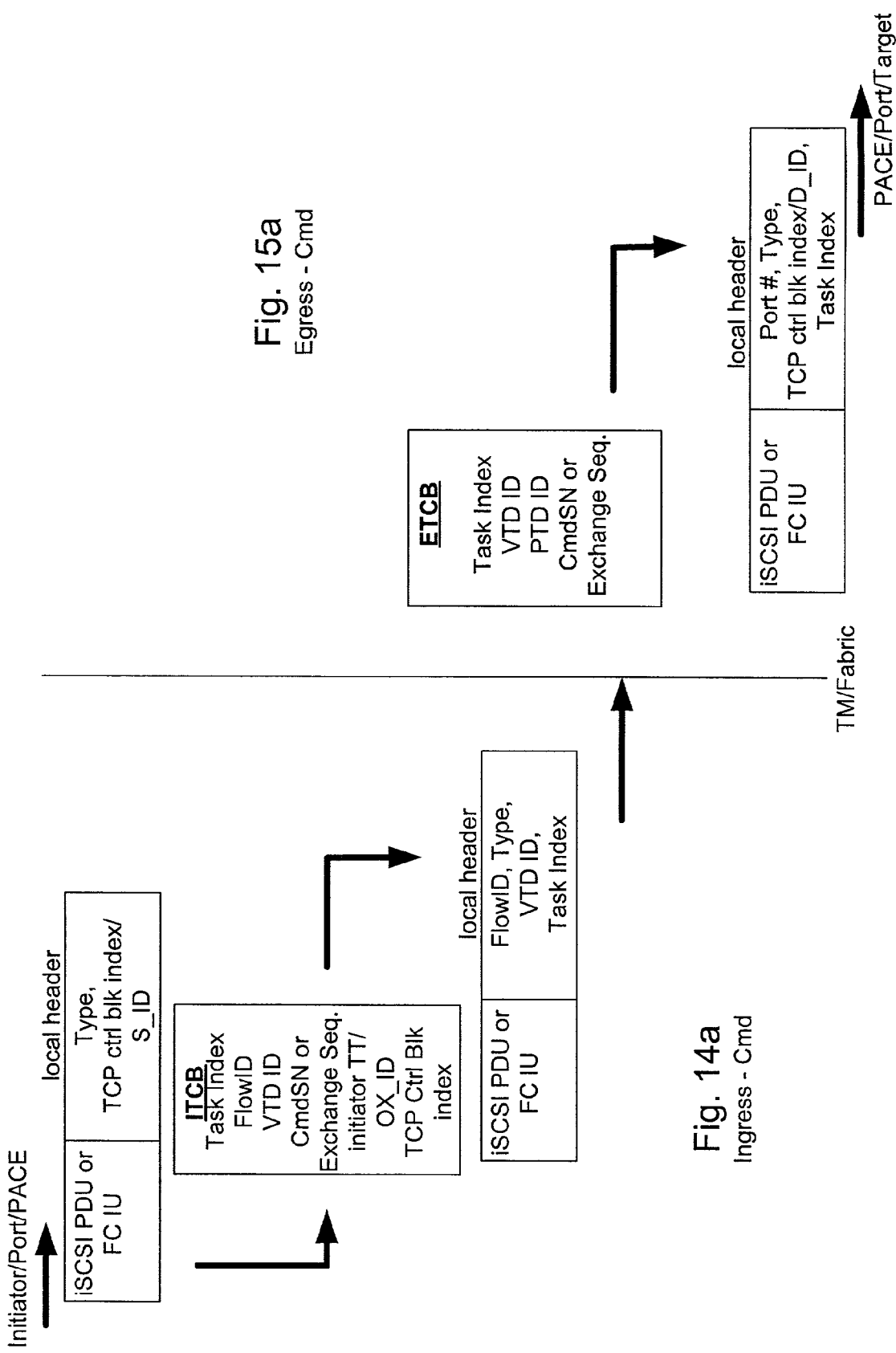

(Virtualization - Egress - cmd)

(Virtualization - Ingress - R2T/XFR_RDY)

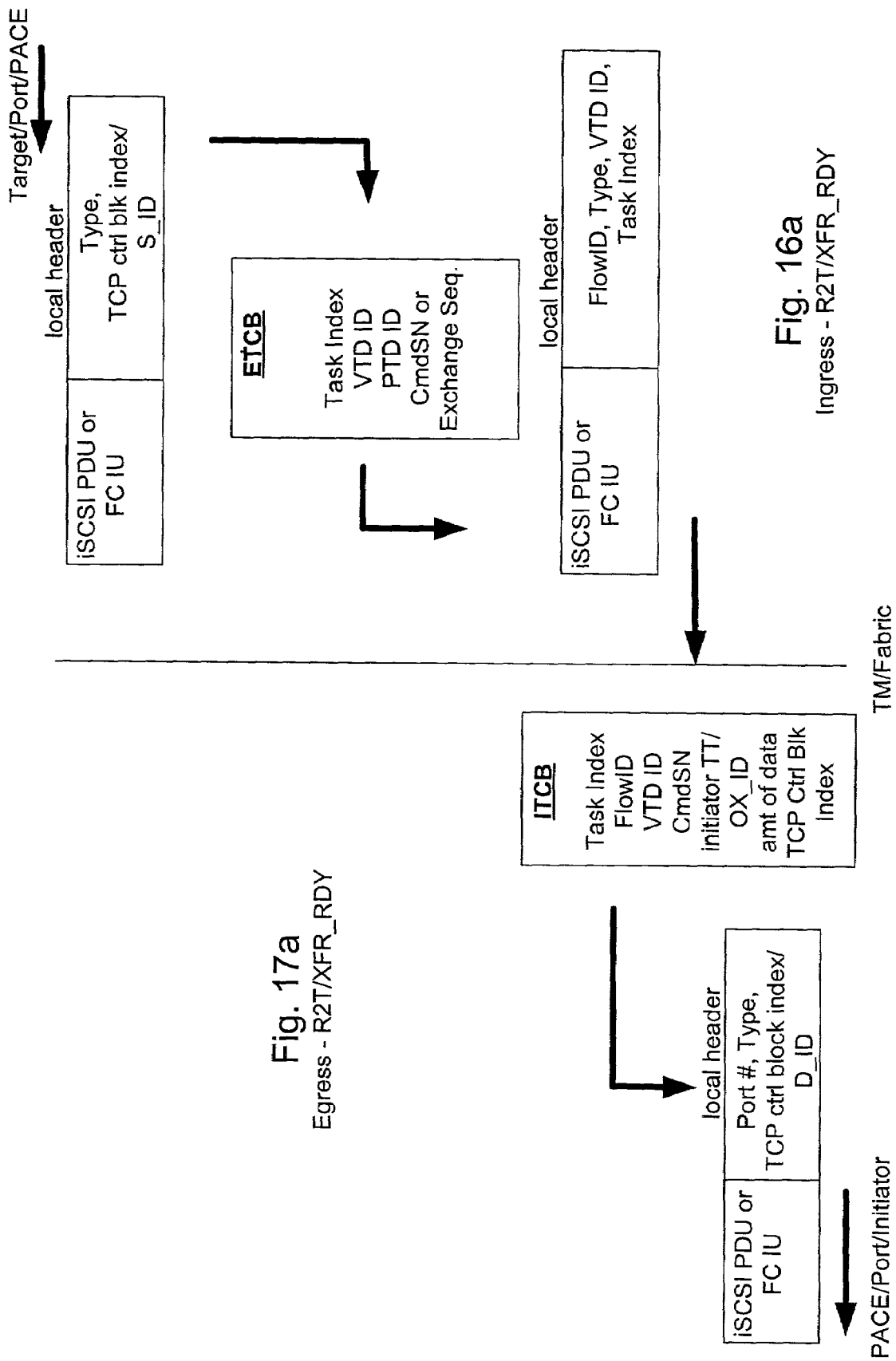

(Virtualization - Egress - R2T/XFR_RDY)

(Virtualization - Ingress - write data packet)

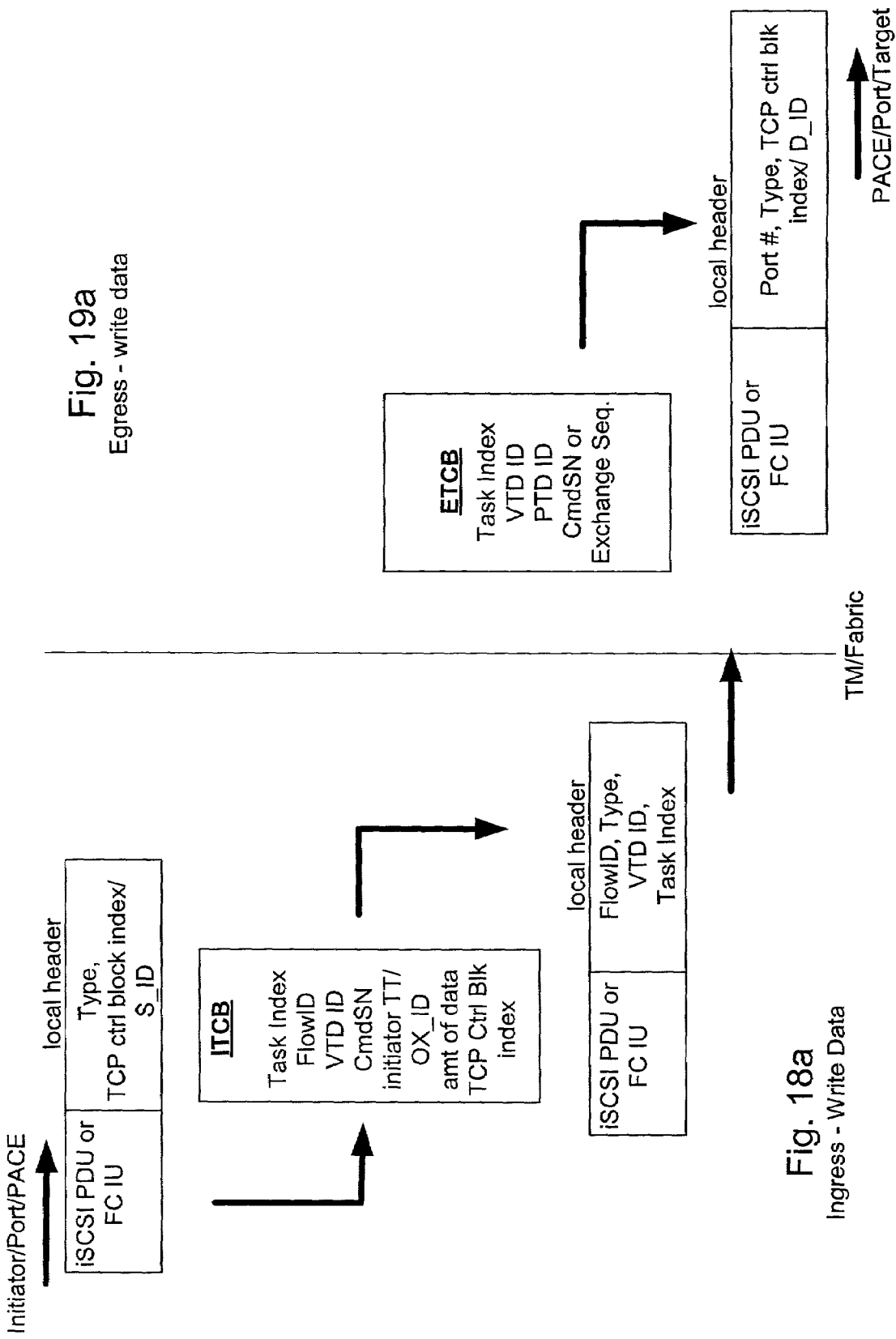

(Virtualization - Egress - write data pkt)

(Virtualization - Ingress - Read Data pkt)

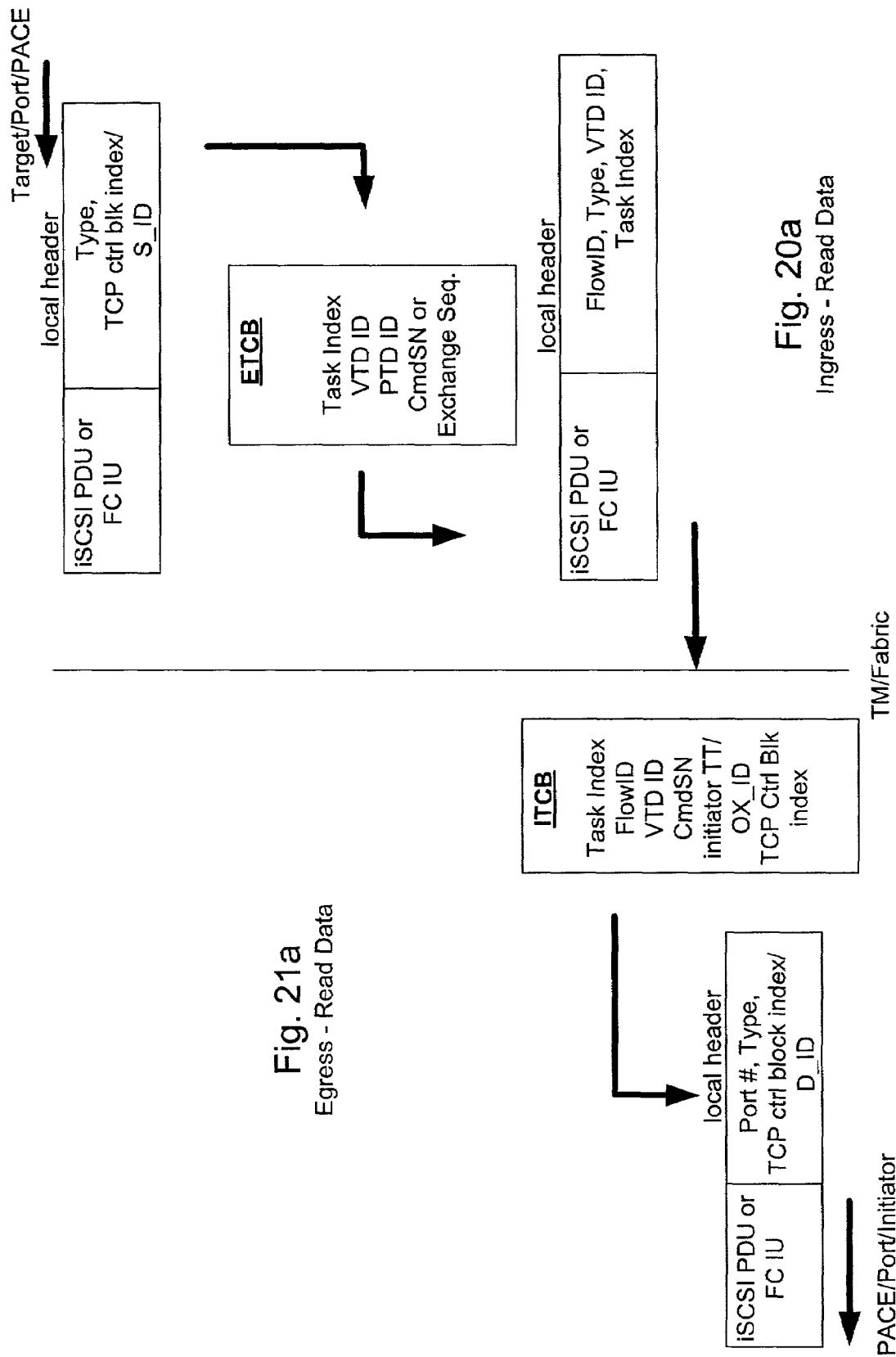

(Virtualization - Egress-Read Data pkt)

(Virtualization - Ingress - response pkt)

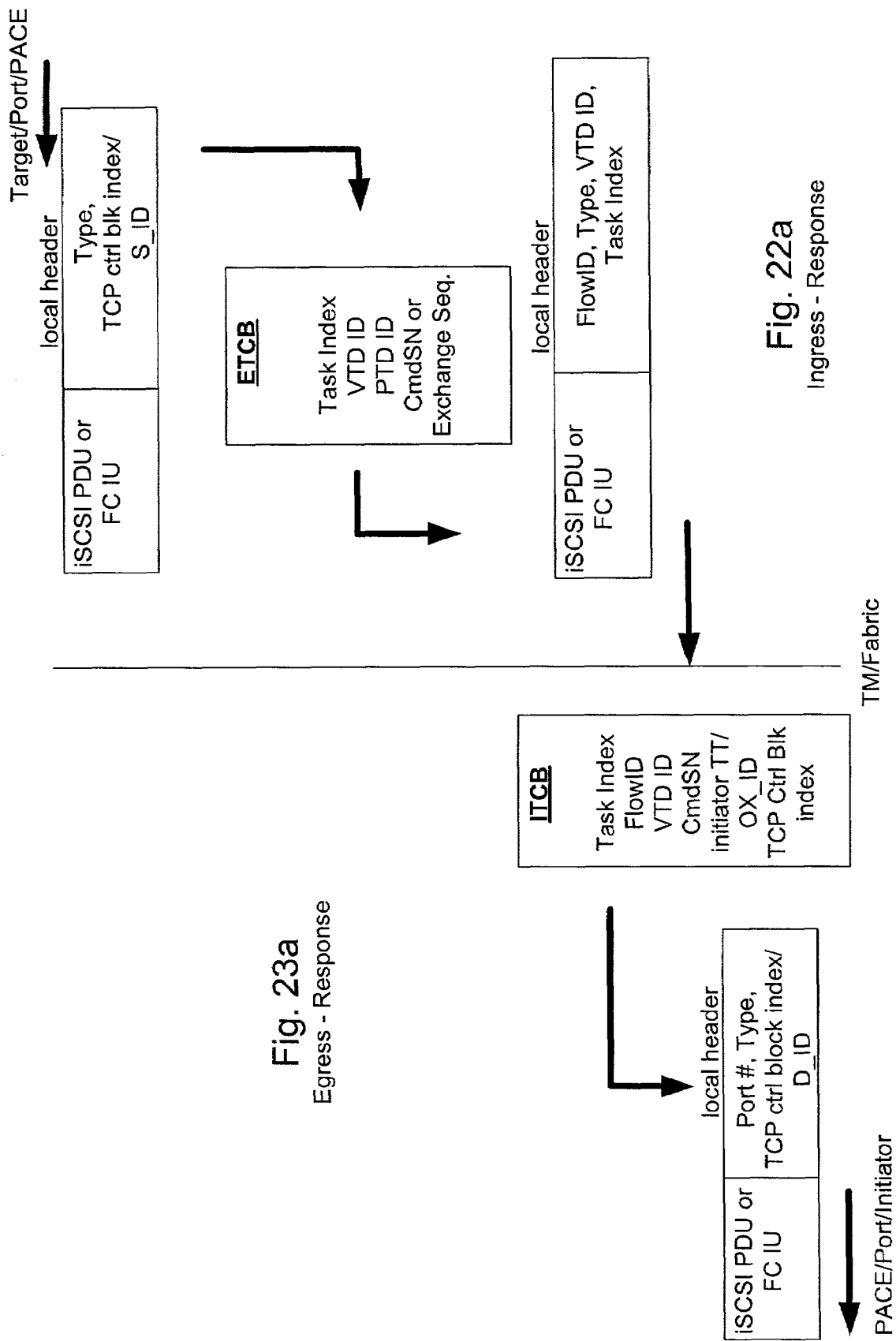

(Virtualization - Egress - response pkt)

PROTOCOL TRANSLATION IN A STORAGE SYSTEM

CROSS REFERENCE TO RELATED APPLICATIONS

This application claims priority to Provisional Application Ser. No. 60/325,704, entitled STORAGE SWITCH FOR STORAGE AREA NETWORK, and filed Sep. 28, 2001, and incorporated by reference herein.

This application is also related to the following applications, all filed concurrently herewith and all incorporated herein by reference:

STORAGE SWITCH FOR STORAGE AREA NETWORKS, Ser. No. 10/051,321, filed Jan. 18, 2002;
SWITCH-BASED STORAGE SERVICES, Ser. No. 10/051,164, filed Jan. 18, 2002, now U.S. Pat. No. 7,185,062, issued Feb. 27, 2007;
PACKET CLASSIFICATION IN A STORAGE SYSTEM Ser. No. 10/051,093, filed Jan. 18, 2002;
VIRTUALIZATION IN A STORAGE SYSTEM, Ser. No. 10/051,396, filed Jan. 18, 2002;
ENFORCING QUALITY OF SERVICE IN A STORAGE NETWORK, Ser. No. 10/051,339, filed Jan. 18, 2002;
POOLING AND PROVISIONING STORAGE RESOURCES IN A STORAGE NETWORK, Ser. No. 10/050,974, filed Jan. 18, 2002, now U.S. Pat. No. 6,976,134, issued Dec. 13, 2005; and
LOAD BALANCING IN A STORAGE NETWORK, Ser. No. 10/051,053, filed Jan. 18, 2002.

FIELD OF INVENTION

The present invention relates to storage area networks (SANs).

BACKGROUND

The rapid growth in data intensive applications continues to fuel the demand for raw data storage capacity. As companies rely more and more on e-commerce, online transaction processing, and databases, the amount of information that needs to be managed and stored can be massive. As a result, the ongoing need to add more storage, service more users and back-up more data has become a daunting task.

To meet this growing demand for data, the concept of the Storage Area Network (SAN) has been gaining popularity. A SAN is defined by the Storage Networking Industry Association (SNIA) as a network whose primary purpose is the transfer of data between computer systems and storage elements and among storage elements. Unlike connecting a storage device directly to a server, e.g., with a SCSI connection, and unlike adding a storage device to a LAN with a traditional interface such as Ethernet (e.g., a NAS system), the SAN forms essentially an independent network that does not tend to have the same bandwidth limitations as its direct-connect SCSI and NAS counterparts.

More specifically, in a SAN environment, storage devices (e.g., tape drives and RAID arrays) and servers are generally interconnected via various switches and appliances. The connections to the switches and appliances are usually Fibre Channel. This structure generally allows for any server on the SAN to communicate with any storage device and vice versa. It also provides alternative paths from server to storage device. In other words, if a particular server is slow or completely unavailable, another server on the SAN can provide access to the storage device. A SAN also makes it possible to mirror data, making multiple copies available and thus creating more reliability in the availability of data. When more storage is needed, additional storage devices can be added to the SAN without the need to be connected to a specific server; rather, the new devices can simply be added to the storage network and can be accessed from any point.

An example of a SAN is shown in the system 100 illustrated in the functional block diagram of FIG. 1. As shown, there are one or more servers 102. Three servers 102 are shown for exemplary purposes only. Servers 102 are connected through an Ethernet connection to a LAN 106 and/or to a router 108 and then to a WAN 110, such as the Internet. In addition, each server 102 is connected through a Fibre Channel connection to each of a plurality of Fibre Channel switches 112 sometimes referred to as the "fabric" of the SAN. Two switches 112 are shown for exemplary purposes only. Each switch 112 is in turn connected to each of a plurality of SAN appliances 114. Two appliances 114 are shown for exemplary purposes only. Each appliance is also coupled to each of a plurality of storage devices 116, such as tape drives, optical drives, or RAID arrays. In addition, each switch 112 and appliance 114 is coupled to a gateway 118, which in turn is coupled to router 108, which ultimately connects to a Wide Area Network (WAN) 118, such as the Internet. FIG. 1 shows one example of a possible configuration of a SAN 119, which includes switches 112, appliances 114, storage devices 116, and gateways 118. Still other configurations are possible. For instance, one appliance may be connected to fewer than all the switches.

Appliances 114 perform the storage management of the SAN. When the appliance 114 receives data, it stores the data in a memory in the appliance. Then, with a processor (also in the appliance), analyzes and operates on the data in order to forward the data to the correct storage device(s). This store-and-forward process typically slows down data access.

While the appliances do perform some switching, because there may be a large number of servers (many more than three), and because each appliance has few ports (usually only two or four), switches 112 are needed to connect the many servers to the few appliances. Nevertheless, switches 112 have little built-in intelligence and merely forward data to a selected appliance 114.

One limitation of appliances is the fact that an appliance typically has very few ports, e.g., only two ports. As a result, the bandwidth available through the appliance can be limited. Adding ports to an appliance, although possible, is typically very expensive. Every one or two ports are supported by an expensive CPU or server card. So generally to add ports, entire file cards (which perform virtualization and store-and-forward functions) must be added to the device, which is usually very costly. In the alternative, appliances are simply added to the SAN, but again, this tends to be very costly.

In addition, SANs, usually in the appliances 114, generally perform a function known as "virtualization." Virtualization occurs when space on one or more physical storage devices is allocated to a particular user, but the physical location of that space remains unknown to the user. For instance, a user may access its company's "engineering storage space," ENG:, accessing and "seeing" the virtual space ENG: as he or she would access or "see" an attached disk drive. Nonetheless, the ENG: space maybe divided over several physical storage devices or even fragmented on a single storage device. Thus, when a server requests a virtual device (e.g., ENG:) and block number, the appliance must determine the device(s) that physically correlate to the virtual device requested and direct the data accordingly.

In general, SANs are formed using a single protocol to interconnect the devices. Although Fibre Channel is the most commonly used, Ethernet connections have also been used. Nonetheless, if both protocols are desired to be used, some kind of transition between the two protocols must occur. In such instances, a Fibre Channel SAN 119 is typically coupled to an Ethernet SAN 122 via a bridge 121. To transition from one protocol to the other, a packet is received by the bridge and stored in memory. Once the packet is stored in a memory, a processor operates on the packet to remove the headers of one protocol and build the headers of the other protocol, thereby constructing an entirely new packet. More specifically, referring to FIG. 2, when a request (which may be comprised of one or more packets) is received by bridge 121, it is received, for example, by a Host Bus Adapter (HBA) 202 over a Fibre Channel connection 204. The entire request is stored in memory 206 until a processor 208 is ready to analyze and operate on it, i.e., to rebuild the request in accordance with the outgoing protocol. Once the request has been operated on by the processor 208, the request is sent to the Network Interface Card (NIC) 210 and then out over the ethernet connection 212. Of course, the same process could occur vice versa (ethernet to fibre channel). Hence, the transition between protocols requires significant memory and processor resources, which not only cause delays in transmitting data but also increase the cost of the system in both money and real estate. Nonetheless, the only alternative currently available is to keep the protocols isolated on distinct networks.

Gateways 118 (FIG. 1), in addition to connecting a SAN to a WAN, are often used to connect two or more SANs together. Gateways usually do not transition the various protocols, but rather encapsulate the data in IP packets, as is known in the art. Nonetheless, when multiple SANs are connected, there must be a unique address for each connected device. However, although the IP protocol contains 32 bits for addressing, the Fibre Channel protocol only contains 24 bits. Hence, because most SANs use Fibre Channel, scalability can be a problem despite the use of a gateway, limiting use of SANs over the Internet.

Although SANs were introduced several years ago, interoperability problems, lack of available skills, and high implementation costs remain major obstacles to widespread use. For instance, SANs as they currently exist have high deployment costs and high management costs. Referring again to FIG. 1, each switch, appliance, and gateway typically come from different vendors, creating a lack of management standards that has resulted in the proliferation of vendor-specific management tools. As a result, to deploy a SAN, equipment must be purchased from multiple vendors. And, as shown in FIG. 1, each switch, appliance, gateway, storage device, server, and router will have its own management, shown as management stations 120. Although independent physical management stations are shown, it is to be understood that independent management is frequently in the form of independent, vendor-specific software on a single computer but which software does not communicate with one another. As a result, there is no centralized management of the SAN and its management costs are high given that there are usually multiple management stations that frequently require many people to manage.

SUMMARY

A storage switch in accordance with an embodiment of the invention is a highly scalable switch that allows the creation of a SAN that is easy to deploy and that can be centrally managed. Moreover, such a storage switch also allows the deployment of a global infrastructure, allowing the resources of the SAN, such as storage devices, to essentially be positioned anywhere on the globe. Further, a storage switch in accordance with the invention allows a multi-protocol SAN, e.g., one that includes both iSCSI (a recently introduced protocol carried over an Ethernet connection) or Fibre Channel, and to process any data packets at "wire speed"—that is, without introducing anymore latency that would be introduced by a switch that merely performed switching or routing functions—and thus a switch in accordance with the invention has a high bandwidth. Typically to process data at wire speed, a storage switch in accordance with an embodiment of the invention will not buffer packets, unlike that done conventionally. Thus, compared to conventional practices, an architecture in accordance with an embodiment of the invention allows the required time to process a packet to be minimal.

More specifically, a switch in accordance with the invention offers virtualization and translation services at wire speed. To perform such wire-speed processing, "intelligence" is distributed at every port of the switch linecard. Each linecard is further able to classify a packet and thus separate data packets from control packets. Because of the distributed intelligence, each linecard also performs virtualization (converting a virtual address to a physical one) and protocol translation (converting an incoming packet of a first protocol to an outgoing packet of a second protocol) when necessary on the data packets and can do so without a user or a server having to be aware of or involved in the necessity for the virtualization or translation. Having distributed intelligence allows many linecards to be made that are less expensive than traditional CPU or server cards, allowing for further ease of scalability of the storage switch, e.g., to accommodate more ports.

In addition, each switch is able to offer serverless storage services such as mirroring, mirroring over a slow link, snapshot, virtual target cloning (replication), third party copy, periodic snapshot and backup, and restore. Once the switch receives a request for such services, it is able to perform those services without the assistance of any other device, such as a server or management station.

BRIEF DESCRIPTION OF THE DRAWINGS

The present invention is described with respect to particular exemplary embodiments thereof and reference is accordingly made to the drawings in which:

FIG. 7a is a generalized block diagram of a Virtual Target Descriptor used in a storage switch in accordance with an embodiment of the invention;

FIGS. 8a-8e are generalized block diagrams of various iSCSI PDUs, as are known in the art;

FIGS. 8f-8i are generalized block diagrams of Fibre Channel Protocol (FCP) frames and payloads, as are known in the art;

FIGS. 14a and 15a illustrate block diagrams of the local header and task control blocks (ITCB and ETCB) during a virtualization process, where FIG. 14a shows the header and ITCB for a command packet in the ingress direction (from the initiator server/port) and where FIG. 15a shows a header and ETCB for a command packet in the egress direction (from the fabric/traffic manager);

FIGS. 16a and 17a illustrate block diagrams of the local header and task control blocks (ITCB and ETCB) during a virtualization process, where FIG. 16a shows the header and ETCB for a R2T/XFR_RDY packet in the ingress direction (from the target storage device/port) and where FIG. 17a shows a header and ITCB for a R2T/XFR_RDY packet in the egress direction (from the fabric/traffic manager);

FIGS. 18a and 19a illustrate block diagrams of the local header and task control blocks (ITCB and ETCB) during a virtualization process, where FIG. 18a shows the header and ITCB for a write data packet in the ingress direction (from the intiator server/port) and where FIG. 15a shows a header and ETCB for a write data packet in the egress direction (from the fabric/traffic manager);

FIGS. 20a and 21a illustrate block diagrams of the local header and task control blocks (ITCB and ETCB) during a virtualization process, where FIG. 20a shows the header and ETCB for a read data packet in the ingress direction (from the target storage device/port) and where FIG. 21 a shows a header and ITCB for a read data packet in the egress direction (from the fabric/traffic manager);

FIGS. 22a and 23a illustrate block diagrams of the local header and task control blocks (ITCB and ETCB) during a virtualization process, where FIG. 22a shows the header and ETCB for a response packet in the ingress direction (from the target storage device/port) and where FIG. 23a shows a header and ITCB for a response packet in the egress direction (from the fabric/traffic manager);

DETAILED DESCRIPTION

Figure 3:
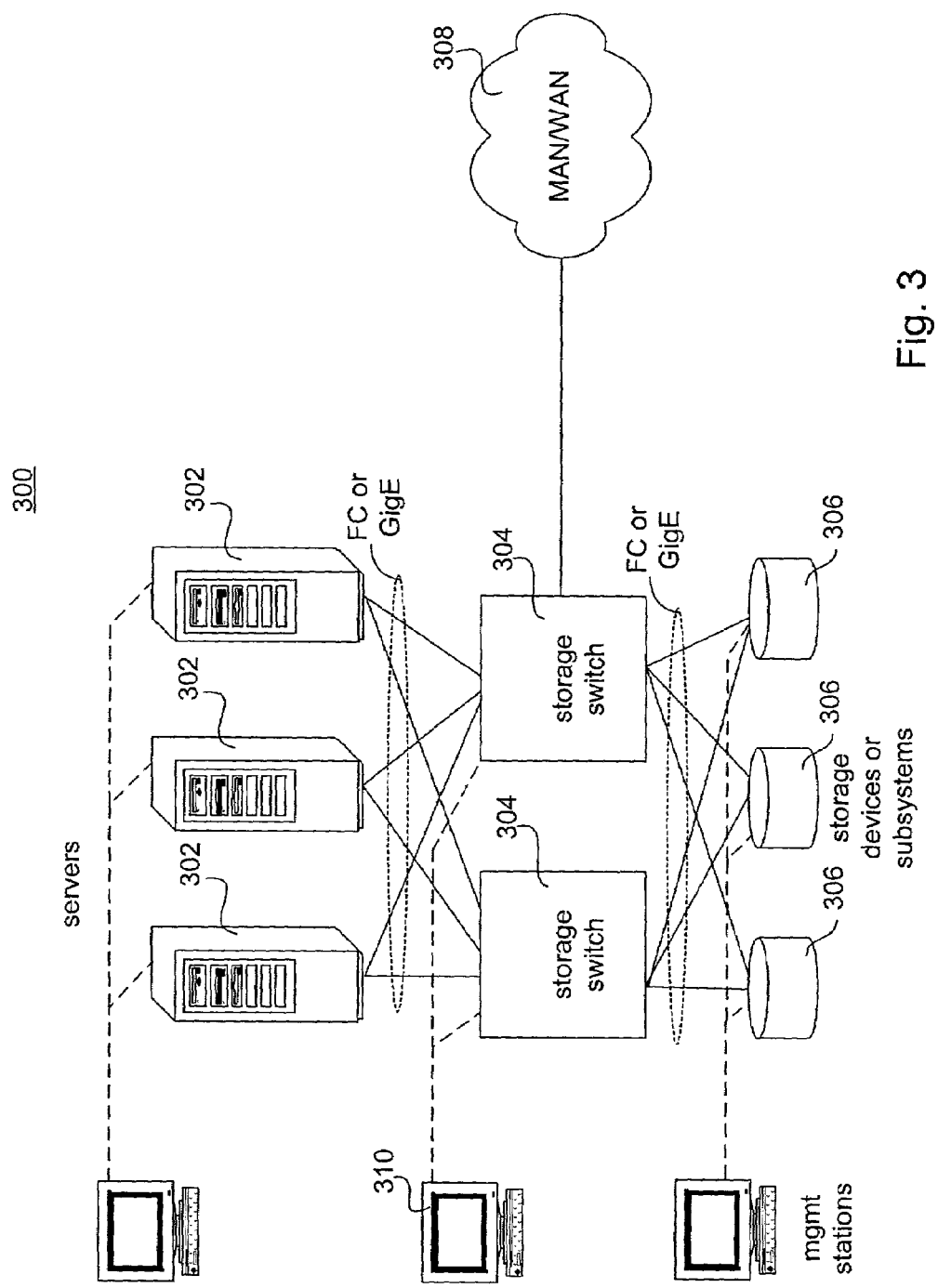
FIG. 3 is a generalized function block diagram of a SAN system using a storage switch in accordance with an embodiment of the invention.

A system 300 that includes a storage switch in accordance with the invention is illustrated in FIG. 3. As shown, such a system is greatly simplified over existing systems. In one embodiment, system 300 includes a plurality of servers 302. For purposes of illustration only, three servers 302 are shown, although more or fewer servers could be used in other embodiments. Although not shown, the servers could also be coupled to a LAN. As shown, each server 302 is connected to a storage switch 304. In other embodiments, however, each server 302 may be connected to fewer than all of the storage switches 304 present. The connections formed between the servers and switches can utilize any protocol, although in one embodiment the connections are either Fibre Channel or Gigabit Ethernet (carrying packets in accordance with the iSCSI protocol). Other embodiments may use the Infiniband protocol, defined by Intel Inc., or other protocols or connections. In the embodiment illustrated, each switch is in turn connected to each of a plurality of storage devices or subsystems 306. Nonetheless, in other embodiments, each switch may be connected to fewer than all of the storage devices or subsystems 306. The connections formed between the storage switches and storage devices can utilize any protocol, although in one embodiment the connections are either Fibre Channel or Gigabit Ethernet. In some embodiments, one or more switches 304 are each coupled to a Metropolitan Area Network (MAN) or Wide Area Network (WAN), such as the Internet 308. The connection formed between a storage switch and a WAN will generally use the Internet Protocol (IP) in most embodiments. Although shown as directly connected to MAN/WAN 308, other embodiments may utilize a router (not shown) as an intermediary between switch 304 and MAN/WAN 308. In addition, respective management stations 310 are connected to each storage switch 304, to each server 302, and to each storage device 306. Although management stations are illustrated as distinct computers, it is to be understood that the software to manage each type of device could collectively be on a single computer.

Figure 4:
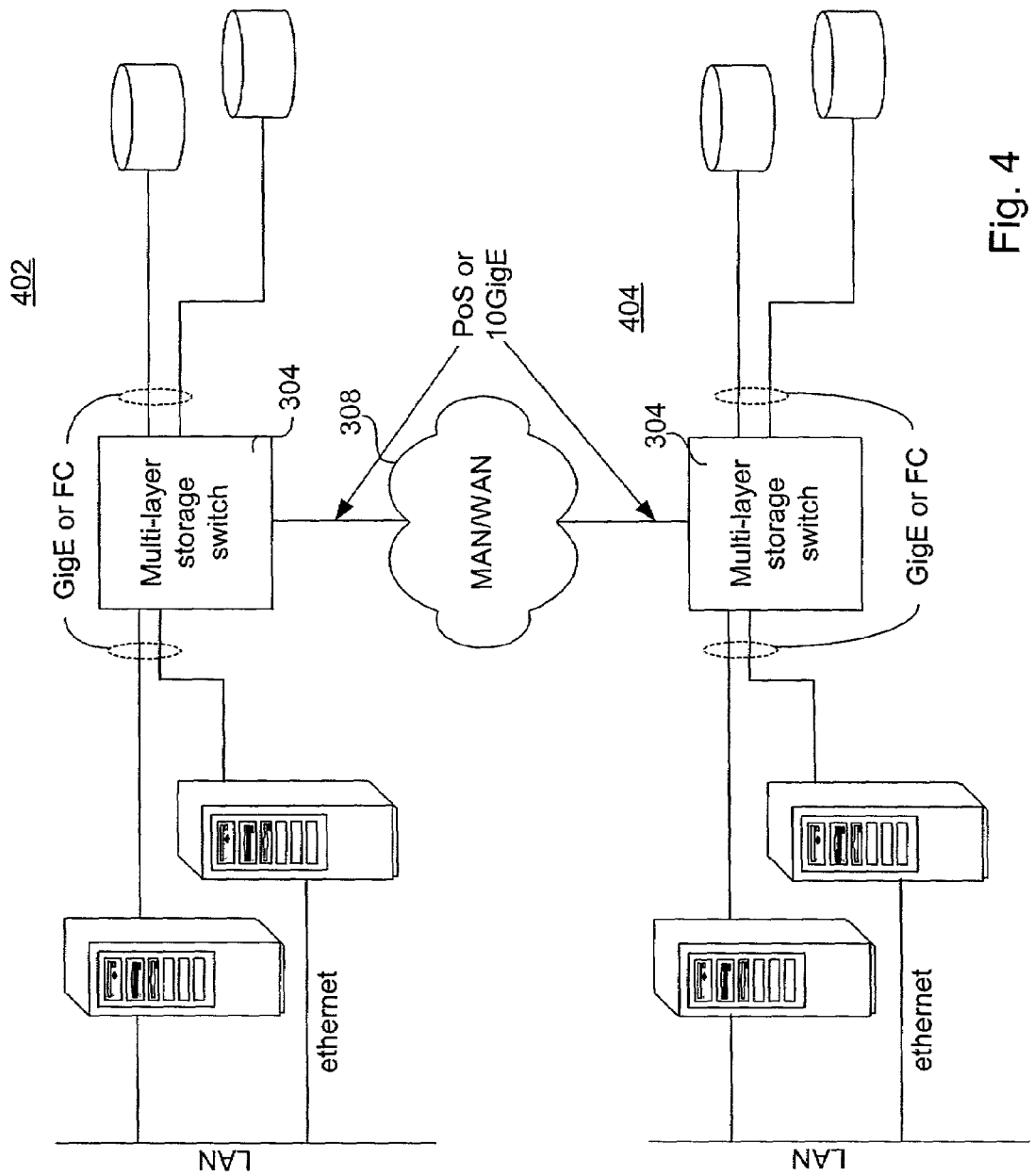
FIG. 4 is a generalized function block diagram of another embodiment of a system using a storage switch in accordance with an embodiment of the invention.

FIG. 4 shows an alternative embodiment of a system in accordance with the invention. In such an embodiment, two SANs 402, 404 are formed, each using one or more storage switches 304 in accordance with an embodiment of the invention. The SANs 402 and 404 are coupled through a WAN 308, such as the Internet, by way of switches 304. Connections 308 can be any standard or protocol, but in one embodiment will be Packet over SONET (PoS) or 10 Gigabit Ethernet.

Figure 5:
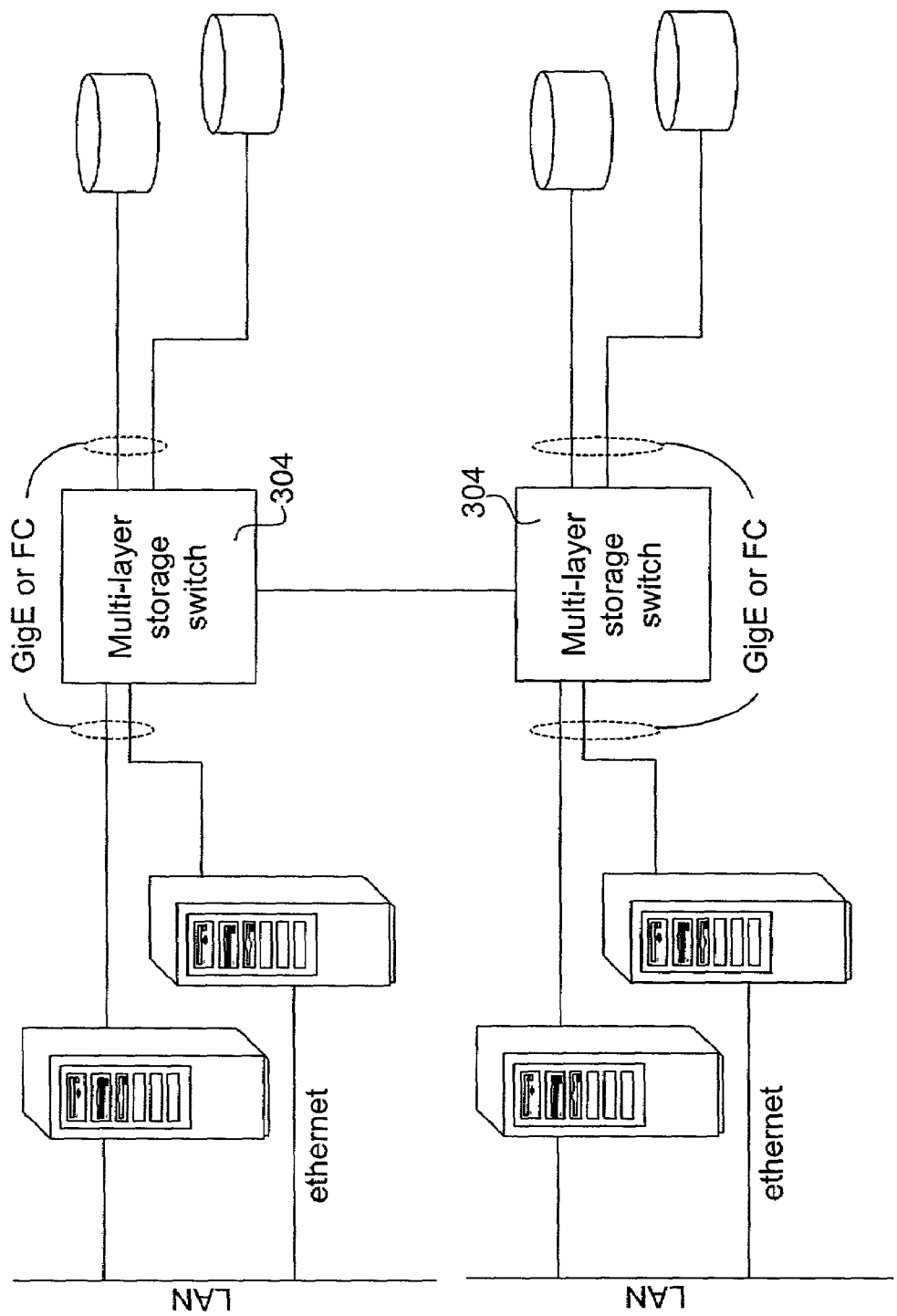
FIG. 5 is a generalized function block diagram of yet another embodiment of a system using a storage switch in accordance with an embodiment of the invention.

FIG. 5 shows still another embodiment of a system in accordance with the invention wherein switches 304 are coupled directly to one another. In any of the embodiments shown in FIG. 3 or 4, if more than one switch is used, those switches could be coupled as illustrated in FIG. 5.

A storage switch in accordance with the invention enables a centralized management of globally distributed storage devices, which can be used as shared storage pools, instead of having a huge number of management stations distributed globally and an army of skilled management personnel. Such a storage switch is an "intelligent" switch, and, as can be seen by comparing FIG. 3 to FIG. 1, the functions of switch, appliance, and gateway have effectively been united in a storage switch 304 in accordance with an embodiment of the invention. Such a storage switch 304, in addition to its switching function, provides the virtualization and storage services (e.g., mirroring) that would typically be provided by appliances in conventional architectures, and it also provides protocol translation. A storage switch in accordance with some embodiments of the invention also performs additional functions (for instance, data security through a Virtual Private Network). Such additional functions include functions that are performed by other devices in conventional systems, such as load balancing, which is traditionally performed by the servers, as well as other functions not previously available in conventional systems.

The intelligence of a storage switch in accordance with an embodiment of the invention is distributed to every switch port. This distributed intelligence allows for system scalability and availability.

Figure 1:
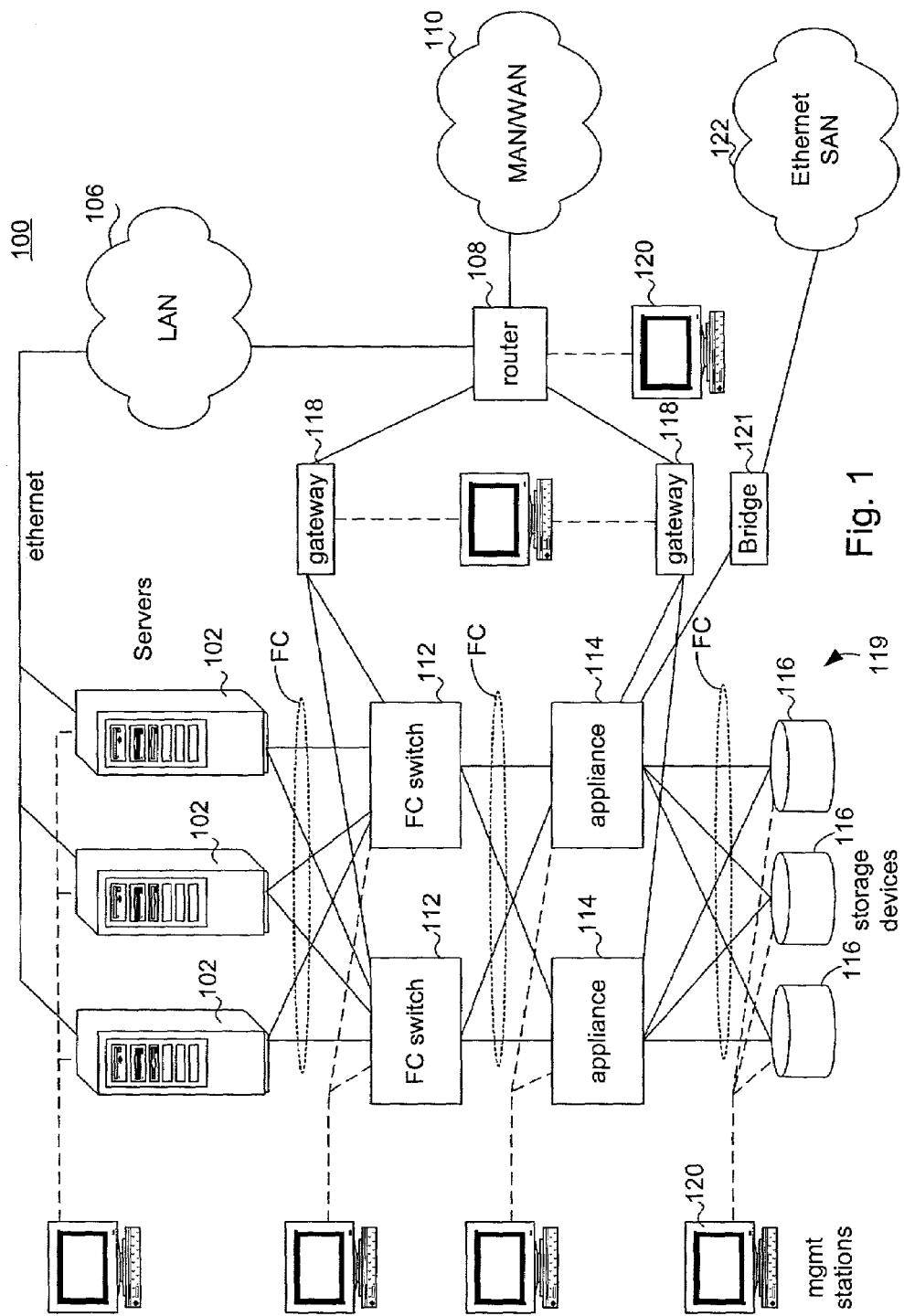
FIG. 1 is a generalized function block diagram of a SAN in accordance with a conventional system.
Figure 2:
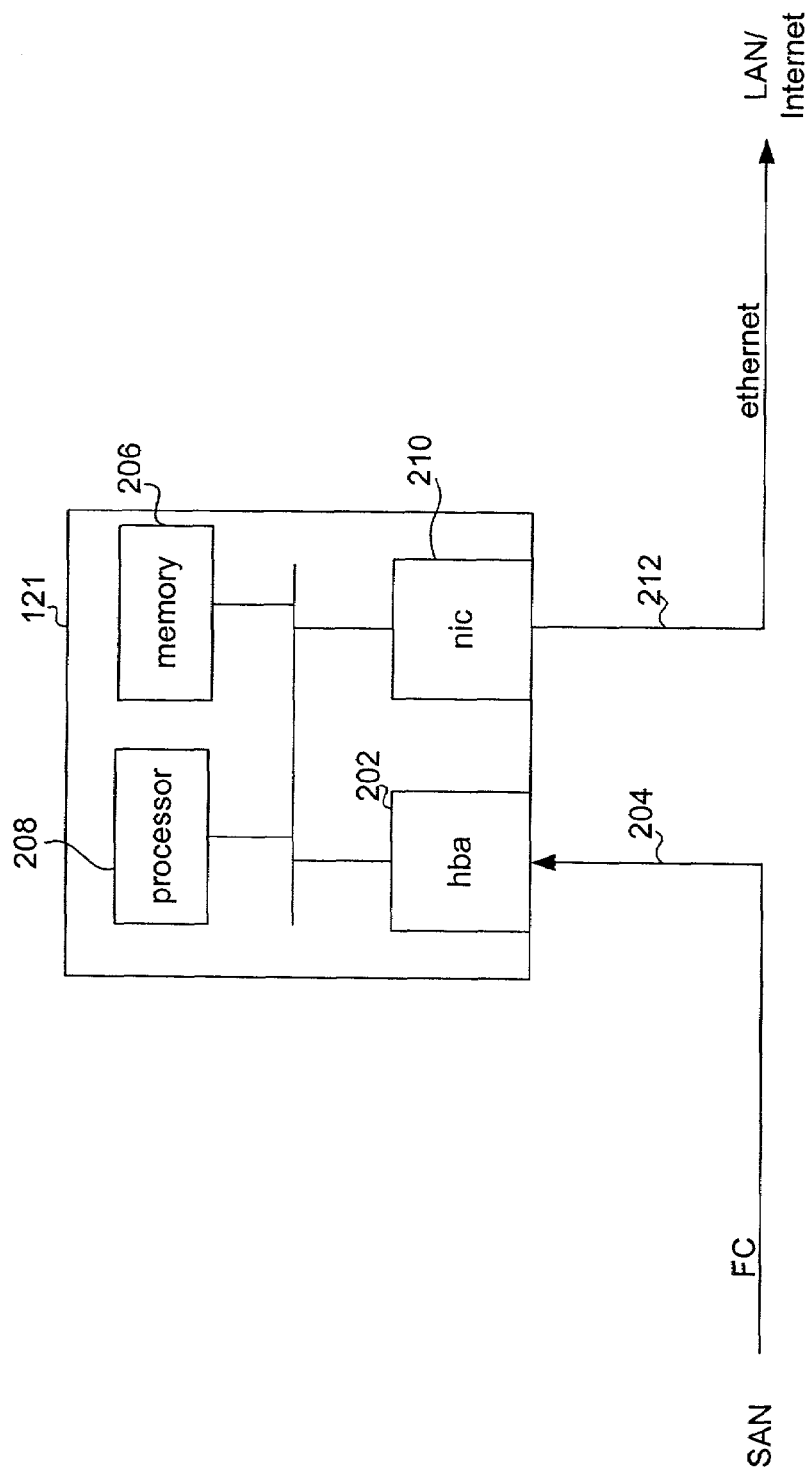
FIG. 2 is a generalized function block diagram of a device used for interfacing between protocols in accordance with conventional methodologies.

Further, the distributed intelligence allows a switch in accordance with an embodiment of the invention to process data at "wire speed," meaning that a storage switch 304 introduces no more latency to a data packet than would be introduced by a typical network switch (such as switch 112 in FIG. 1). Thus, "wire speed" for the switch is measured by the connection to the particular port. Accordingly, in one embodiment having OC-48 connections, the storage switch can keep up with an OC-48 speed (2.5 bits per ns). A two Kilobyte packet (with 10 bits per byte) moving at OC-48 speed takes as little as eight microseconds coming into the switch. A one Kilobyte packet takes as little as four microseconds. A minimum packet of 100 bytes only elapses merely 400 ns. Nonetheless, when the term "wire-speed" processing is used herein, it does not mean that such processing needs as few as 400 ns to process a 100-byte packet. However, it does mean that the storage switch can handle the maximum Ethernet packet of 1500 bytes (with ten-bit encoding, so that a byte is ten bits) at OC-48 speed, i.e., in about 6 µs (4 µs per Kilobyte or 2.5 bits per ns), in one embodiment. In embodiments with a 1 Gb Ethernet port, where processing is generally defined as one bit per nanosecond, "wire-speed" data for that port will be 10 µs per Kilobyte, indicating that the switch has up to 10 µs to process a Kilobyte. In embodiments with a 2 Gb Fibre Channel port, "wire speed" will be 5 µs per Kilobyte. Still other embodiments may process data at ten Gigabit Ethernet or OC-192 speeds or faster.

As used herein, "virtualization" essentially means the mapping of a virtual target space subscribed to by a user to a space on one or more physical storage target devices. The terms "virtual" and "virtual target" come from the fact that storage space allocated per subscription can be anywhere on one or more physical storage target devices connecting to a storage switch 304. The physical space can be provisioned as a "virtual target" which may include one or more "logical units" (LUs). Each virtual target consists of one or more LUs identified with one or more LU numbers (LUNs), which are frequently used in the iSCSI and FC protocols. Each logical unit, and hence each virtual target, is generally comprised of one or more extents—a contiguous slice of storage space on a physical device. Thus, a virtual target may occupy a whole storage device (one extent), a part of a single storage device (one or more extents), or parts of multiple storage devices (multiple extents). The physical devices, the LUs, the number of extents, and their exact locations are immaterial and invisible to a subscriber user.

While the storage space may come from a number of different physical devices, each virtual target belongs to one or more domains. Only users of the same domain are allowed to share the virtual targets in their domain. A domain-set eases the management of users of multiple domains. The members of a domain set can be members of other domains as well. But a virtual target can only be in one domain in an embodiment of the invention.

Figure 6:
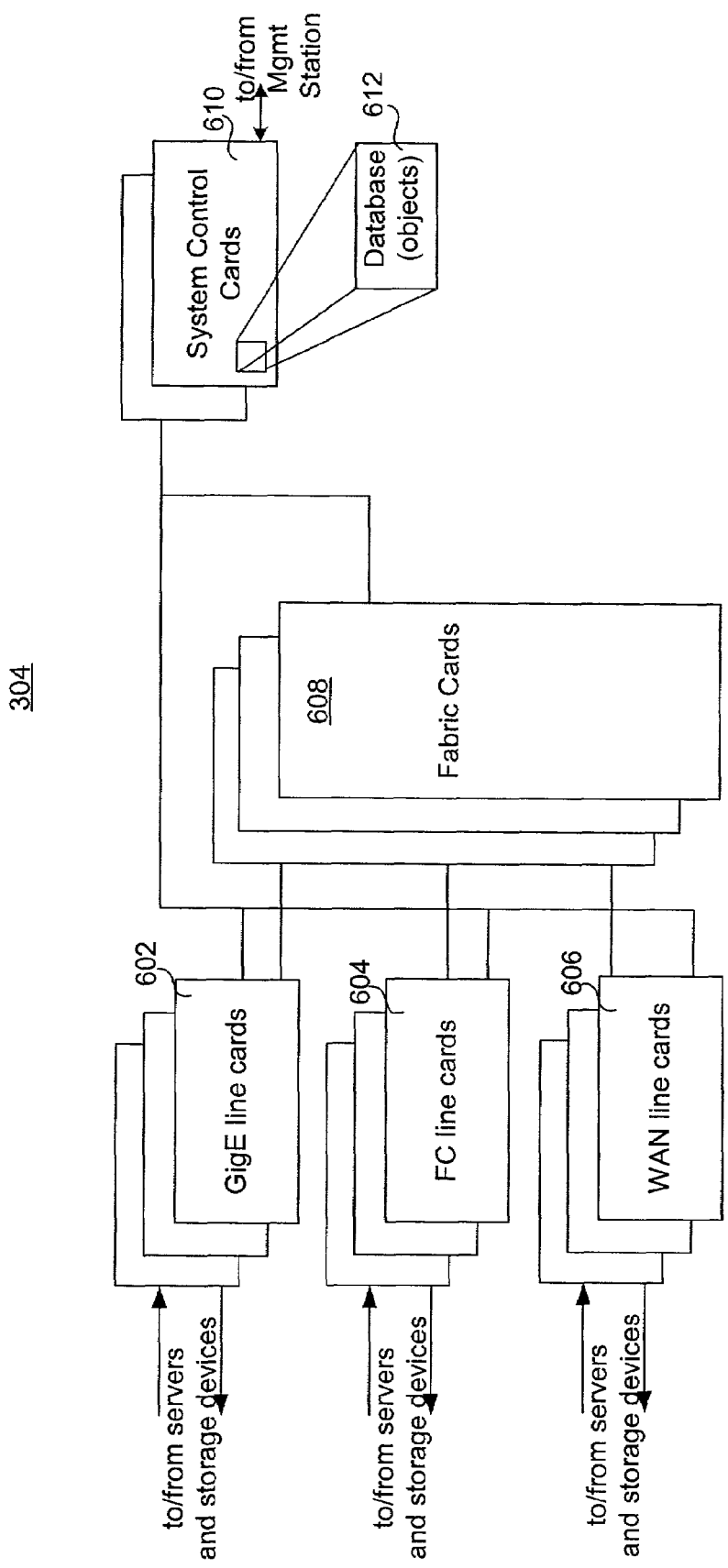
FIG. 6 is a generalized function block diagram of a storage switch in accordance with an embodiment of the invention.

FIG. 6 illustrates a function block diagram of a storage switch 304 in accordance with an embodiment of the invention. In one embodiment, the storage switch 304 includes a plurality of linecards 602, 604, and 606, a plurality of fabric cards 608, and two system control cards 610, each of which will be described in further detail below.

System Control Cards. Each of the two System Control Cards (SCCs) 610 connects to every line card 602, 604, 606. In one embodiment, such connections are formed by I²C signals, which are well known in the art, and through an Ethernet connection with the SCC. The SCC controls power up and monitors individual linecards, as well as the fabric cards, with the I²C connections. Using inter-card communication over the ethernet connections, the SCC also initiates various storage services, e.g., snapshot and replicate, to be discussed further later.

In addition the SCC maintains a database 612 that tracks configuration information for the storage switch as well as all virtual targets and physical devices attached to the switch, e.g., servers and storage devices. In addition, the database keeps information regarding usage, error and access data as well as information regarding different domains and domain sets of virtual targets and users. The records of the database are referred to herein as "objects." Each initiator (e.g., a server) and target (e.g., a storage device) has a World Wide Unique Identifier (WWUI), which are known in the art. The database is maintained in a memory device within the SCC, which in one embodiment is formed from flash memory, although other memory devices will also be satisfactory.

The storage switch 304 can be reached by a management station (310) through the SCC 610 using an ethernet connection. Accordingly, the SCC also includes an additional Ethernet port for connection to a management station. An administrator at the management station can discover the addition or removal of storage devices or virtual targets, as well as query and update virtually any object stored in the SCC database 612.

Of the two SCCs 610, one is the main operating SCC while the other is a backup, remaining synchronized to the actions in the storage switch, but not directly controlling them. The SCCs operate in a high availability mode wherein if one SCC fails, the other becomes the primary controller.

Fabric Cards. In one embodiment of switch 304, there are three fabric cards 608, although other embodiments could have more or fewer fabric cards. Each fabric card 608 is coupled to each of the linecards 602,604, 606 in one embodiment and serves to connect all of the linecards together. In one embodiment, the fabric cards 608 can each handle maximum traffic when all linecards are populated. Such traffic loads handled by each linecard are up to 160 Gbps in one embodiment although other embodiments coul lower maximum traffic volumes. If one fabric card 608 fails, the two surviving cards still have enough bandwidth for the maximum possible switch traffic: in one embodiment, each linecard generates 20 Gbps of traffic, 10 Gbps ingress and 10 Gbps egress. However, under normal circumstances, all three fabric cards are active at the same time. From each linecard, the data traffic is sent to any one of the three fabric cards that can accommodate the data.

Linecards. The linecards form connections to servers and to storage devices. In one embodiment, storage switch 304 supports up to sixteen linecards although other embodiments could support a different number. Further, in one embodiment, three different types of linecards are utilized: Gigabit Ethernet (GigE) cards 602, Fibre Channel (FC) cards 604, and WAN cards 606. Other embodiments may include more or fewer types of linecards. The GigE cards 602 are for Ethernet connections, connecting in one embodiment to either iSCSI servers or iSCSI storage devices (or other Ethernet based devices). The FC cards 604 are for Fibre Channel connections, connecting to either Fibre Channel Protocol (FCP) servers or FCP storage devices. The WAN cards 606 are for connecting to a MAN or WAN.

Figure 7:
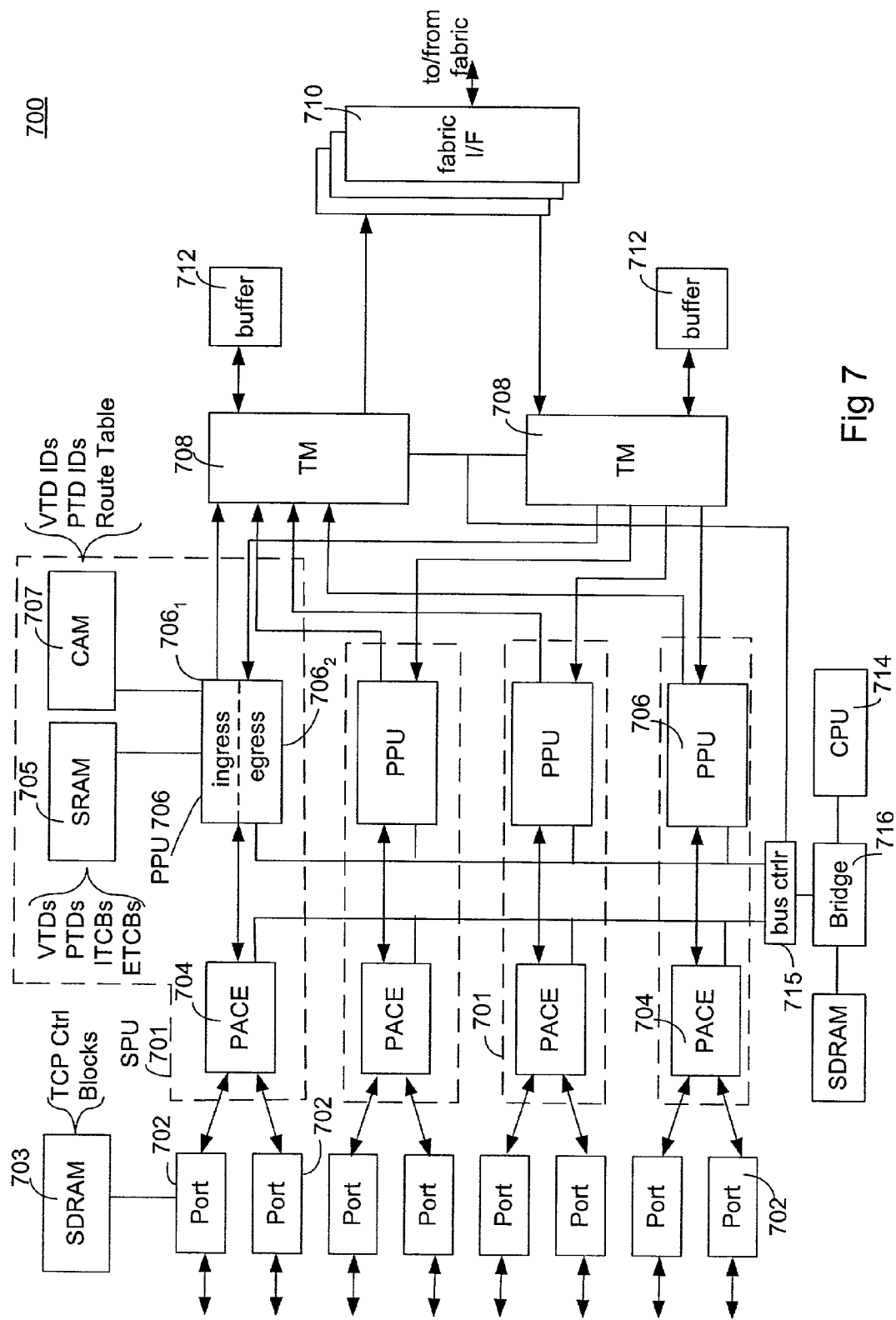
FIG. 7 is a generalized function block diagram of a linecard used in a storage switch in accordance with an embodiment of the invention.

FIG. 7 illustrates a functional block diagram of a generic line card 700 used in one embodiment of a storage switch 304 in accordance with the invention. The illustration shows those components that are common among all types of linecards, e.g., GigE 602, FC 604, or WAN 606. In other embodiments other types of linecards can be utilized to connect to devices using other protocols, such as Infiniband. The differences in the linecards are discussed subsequently.

Ports. Each line card 700 includes a plurality of ports 702. The ports form the linecard's connections to either servers or storage devices. Eight ports are shown in the embodiment illustrated, but more or fewer could be used in other embodiments. For example, in one embodiment each GigE card can support up to eight 1 Gb Ethernet ports, each FC card can support up to either eight 1 Gb FC ports or four 2 Gb FC ports, and each WAN card can support up to four OC-48 ports or two OC-192 ports. Thus, in one embodiment, the maximum possible connections are 128 ports per switch 304. The ports of each linecard are full duplex and connect to either a server or other client, or to a storage device or subsystem.

In addition each port 702 has an associated memory 703. Although only one memory device is shown connected to one port, it is to be understood that each port may have its own memory device or the ports may all be coupled to a single memory device. Only one memory device is shown here coupled to one port for clarity of illustration.

Storage Processor Unit. In one embodiment, each port is associated with a Storage Processor Unit (SPU) 701. The SPU rapidly processes the data traffic allowing for wire-speed operations. In one embodiment, the SPU includes several elements: a Packet Aggregation and Classification Engine (PACE) 704, a Packet Processing Unit (PPU) 706, an SRAM 705, and a CAM 707. Still other embodiments may use more or fewer elements or could combine elements to obtain the same functionality.

PACE. Each port is coupled to a Packet Aggregation and Classification Engine (PACE) 704. As illustrated, the PACE 704 aggregates two ports into a single data channel having twice the bandwidth. For instance, the PACE 704 aggregates two 1 Gb ports into a single 2 Gb data channel. The PACE classifies each received packet into a control packet or a data packet, as will be discussed further below. Control packets are sent to the CPU 714 for processing, via bridge 716. Data packets are sent to a Packet Processing Unit (PPU) 706, discussed below, with a local header added. In one embodiment the local header is sixteen bytes resulting in a data "cell" or "local packet" of 64 bytes (16 bytes of header and 48 bytes of payload). The local header is used to carry information and used internally by switch 204. The local header is removed before the packet leaves the switch. Accordingly, as used herein a "cell" or a "local packet" is a transport unit that is used locally in the switch that includes a local header and the original packet (in some embodiments, the original TCP/IP headers are also stripped from the original packet). Nonetheless, not all embodiments of the invention will create a local header or have "local packets" (cells) that differ from external packets. Accordingly, the term "packet" as used herein can refer to either "local" or "external" packets.

The classification function helps to enable a switch to perform storage virtualization and protocol translation functions at wire speed without using a store-and-forward model of conventional systems. Each PACE has a dedicated path to a PPU 706 while all four PACEs in the illustrated embodiment share a path to the CPU 714, which in one embodiment is a 104 MHz/32 (3.2 Gbps) bit data path.

Packet Processing Unit (PPU). The PPU 706 performs virtualization and protocol translation on-the-fly, meaning, the cells (local packets) are not buffered for such processing. It also implements switch-based storage service functions, described later. The PPU is capable, in one embodiment, of moving cells at OC-48 speed or 2.5 Gbps for both the ingress and egress directions, while in other embodiments it can move cells at OC-192 speeds or 10 Gbps. The PPU in one embodiment includes an ingress PPU $706_1$ and an egress PPU $706_2$, which both run concurrently. The ingress PPU $706_1$ receives incoming data from PACE 704 and sends data to the Traffic Manager 708 while the egress PPU 7062 receives data from Traffic Manager 708 and sends data to a PACE 704.

A large number of storage connections (e.g., server to virtual target) can be established concurrently at each port. Nonetheless, each connection is unique to a virtual target and can be uniquely identified by a TCP Control Block Index (in the case of iSCSI connections) and a port number. When a connection is established, the CPU 714 of the linecard 700 informs the PPU 706 of an active virtual target by sending it a Virtual Target Descriptor (VTD) for the connection. The VTD includes all relevant information regarding the connection and virtual target that the PPU will need to properly operate on the data, e.g., perform virtualization, translation, and various storage services. The VTD is derived from an object in the SCC database and usually contains a subset of information that is stored in the associated object in the SCC database. An example of the fields in a VTD in one embodiment of the invention are shown in FIG. 7*a*. Nonetheless, other embodiments of the invention may have a VTD with more, fewer, or different fields.

To store the VTDs and have quick access to them, in one embodiment the PPUs 706 are connected to an SRAM 705 and CAM 707. SRAM 705 stores a VTD database. A listing of VTD identifiers (VTD IDs), or addresses, is also maintained in the PPU CAM 707 for quick accessing of the VTDs. The VTD IDs are indexed (mapped) using a TCP Control Block Index and a LUN. In addition, for IP routing services, the CAM 707 contains a route table, which is updated by the CPU when routes are added or removed.

Note that although only one CAM and an SRAM are illustrated as connected to one PPU, this is to maintain clarity of the illustration. In various embodiments, each PPU will be connected with its own CAM and SRAM device, or the PPUs will all be connected to a single CAM and/or SRAM.

For each outstanding request to the PPU (e.g., reads or writes), a task control block is established in the PPU SRAM 707 to track the status of the request. There are ingress task control blocks (ITCBs) tracking the status of requests received by the storage switch on the ingress PPU and egress task control blocks (ETCBs) tracking the status of requests sent out by the storage switch on the egress PPU. For each virtual target connection, there can be a large number of concurrent requests, and thus many task control blocks. Task control blocks are allocated as a request begins and freed as the request completes.

Traffic Manager. There are two traffic managers (TMs) 708 on each linecard 700: one TM for ingress traffic and one TM for egress traffic. The ingress TM receives packets from all four SPUs, in the form of multiple 64-byte data cells, in one embodiment. In such an embodiment, each data cell has 16 bytes of local header and 48 bytes of payload. The header contains a FlowID that tells the TM the destination port of the cell. In some embodiments, the SPU may also attach a TM header to the cell prior to forwarding the cell to the TM. Either the TM or the SPU can also subdivide the cell into smaller cells for transmission through the fabric cards in some embodiments.

The ingress TM sends data cells to the fabric cards via a 128-bit 104 Mhz interface 710 in one embodiment. The egress TM receives the data cells from the fabric cards and delivers them to the four SPUs.

Both ingress and egress TMs have a large buffer 712 to queue cells (local packets) for delivery. Both buffers 712 for the ingress and egress TMs are 64 MB, which can queue a large number of packets. The SPUs can normally send cells to the ingress TM quickly as the outgoing flow of the fabric cards is as fast as the incoming flow. Hence, the cells are moving to the egress TM quickly. On the other hand, an egress TM maybe backed up because the outgoing port is jammed or being fed by multiple ingress linecards. In such a case, a flag is set in the header of the outgoing cells to inform the egress SPU to take actions quickly. The egress TM sends a request to the ingress SPU to activate a flow control function. It is worth noting that, unlike communications traffic over the Internet, for storage traffic dropping a packet is unacceptable. Therefore, as soon as the amount of cells in the buffer exceeds a specified threshold, the SPU must activate its flow control function to slow down the incoming traffic to avoid buffer overflow.

Fabric Connection. The fabric connection 710 converts the 256-bit parallel signals of the TM (128 bits ingress and 128 bits egress, respectively), into a 16-bit serial interface (8-bit ingress and 8-bit egress) to the backplane at 160 Gbps. Thus the backplane is running at one sixteenth of the pins but sixteen times faster in speed. This conversion enables the construction of a high availability backplane at a reasonable cost without thousands of connecting pins and wires. Further, because there are three fabric cards in one embodiment, there are three high-speed connectors on each linecard in one embodiment, wherein the connectors each respectively connect the 8-bit signals to a respective one of the three fabric cards. Of course, other embodiments may not require three fabric connections 710.

CPU. On every linecard there is a processor (CPU) 714, which in one embodiment is a PowerPC 750 Cxe. In one embodiment, CPU 714 connects to each PACE with a 3.2 Gb bus, via a bus controller 715 and a bridge 716. In addition, CPU 714 also connects to each PPU, CAM and TM, however, in some embodiments this connection is slower at 40 Mbps. Both the 3.2 Gb and 40 Mb paths allow the CPU to communicate with most devices in the linecard as well as to read and write the internal registers of every device on the linecard, download microcode, and send and receive control packets.

The CPU on each linecard is responsible to initialize every chip at power up and to download microcode to the SPUs and each port wherever the microcode is needed. Once the linecard is in running state, the CPU processes the control traffic. For information needed to establish a virtual target connection, the CPU requests the information from the SCC, which in turn gets the information from an appropriate object in the SCC database.

Distinction in Linecards—Ports. The ports in each type of linecard, e.g., GigE, FC, or WAN are distinct as each linecard only supports one type of port in one embodiment. Each type of port for one embodiment is described below. Of course other linecard ports could be designed to support other protocols, such as Infiniband in other embodiments.

GigE Port. A gigabit Ethernet port connects to iSCSI servers and storage devices. While the GigE port carries all kinds of Ethernet traffic, the only network traffic generally to be processed by a storage switch 304 at wire speed in accordance with one embodiment of the invention is an iSCSI Packet Data Unit (PDU) inside a TCP/IP packet. Nonetheless, in other embodiments packets in accordance with other protocols (like Network File System (NFS)) carried over Ethernet connections may be received at the GigE Port and processed by the SPU and/or CPU.

The GigE port receives and transmits TCP/IP segments for virtual targets or iSCSI devices. To establish a TCP connection for a virtual target, both the linecard CPU 714 and the SCC 610 are involved. When a TCP packet is received, and after initial handshaking is performed, a TCP control block is created and stored in the GigE port memory 703. A VTD must also be retrieved from an object of the SCC database and stored in the CPU SDRAM 705 for the purpose of authenticating the connection and understanding the configuration of the virtual target. The TCP Control Block identifies a particular TCP session or iSCSI connection to which the packet belongs, and contains in one embodiment, TCP segment numbers, states, window size, and potentially other information about the connection. In addition, the TCP Control Block is identified by an index, referred to herein as the "TCP Control Block Index." A VTD for the connection must be created and stored in the SPU SRAM 705. The CPU creates the VTD by retrieving the VTD information stored in its SDRAM and originally obtained from the SCC database. A VTD ID is established in a list of VTD IDs in the SPU CAM 707 for quick reference to the VTD. The VTD ID is affiliated with and indexed by the TCP Control Block Index.

When the port receives iSCSI PDUs, it serves essentially as a termination point for the connection, but then the switch initiates a new connection with the target. After receiving a packet on the ingress side, the port delivers the iSCSI PDU to the PACE with a TCP Control Block Index, identifying a specific TCP connection. For a non-TCP packet or a TCP packet not containing an iSCSI PDU, the port receives and transmits the packet without acting as a termination point for the connection. Typically, the port 702 communicates with the PACE 704 that an iSCSI packet is received or sent by using a TCP Control Block Index. When the TCP Control Block Index of a packet is −1, it identifies a non-iSCSI packet.

FC Port. An FC port connects to servers and FC storage devices. The FC port appears as a fibre channel storage subsystem to the connecting servers, meaning, it presents a large pool of virtual target devices that allow the initiators (e.g., servers) to perform a Process Login (PLOGI or PRLI), as are understood in the art, to establish a connection. The FC port accepts the GID extended link services (ELSs) and returns a list of target devices available for access by that initiator (e.g., server).

When connecting to fibre channel storage devices, the port appears as a fibre channel F-port, meaning, it accepts a Fabric Login, as is known in the art, from the storage devices and provides name service functions by accepting and processing the GID requests.

At the port initialization, the linecard CPU must go through both sending Fabric Logins, Process Logins, and GIDs as well as receive the same. The SCC supports an application to convert FC ELS's to iSNS requests and responses. As a result, the same database in the SCC keeps track both the FC initiators (e.g., servers) and targets (e.g., storage devices) as if they were iSCSI initiators and targets.

When establishing an FC connection, unlike for a GigE port, an FC port does not need to create TCP control blocks or their equivalent; all the necessary information is available from the FC header. But, a VTD (indexed by a D_ID) will still need to be established in a manner similar to that described for the GigE port.

An FC port can be configured for 1 Gb or 2 Gb. As a 1 Gb port, two ports are connected to a single PACE as illustrated in FIG. 7; but in an embodiment where it is configured as a 2 Gb port, port traffic and traffic that can be accommodated by the SPU should match to avoid congestion at the SPU. The port connects to the PACE with a POS/PHY interface in one embodiment. Each port can be configured separately, i.e. one PACE may have two 1 Gb ports and another PACE has a single 2 Gb port.

WAN Ports. In embodiments that include a WAN linecard, the WAN linecard supports OC-48 and OC-192 connections in one embodiment. Accordingly, there are two types of WAN ports: OC-48 and OC-192. For OC-48, there is one port for each SPU. There is no aggregation function in the PACE, although there still is the classification function. A WAN port connects to SONET and works like a GigE port as it transmits and receives network packets such as ICMP, RIP, BPG, IP and TCP. Unlike the GigE port, a WAN port in one embodiment supports network security with VPN and IPSec that requires additional hardware components.

Since OC-192 results in a faster wire speed, a faster SPU will be required in embodiments that support OC-192.

Switch-Based Storage Operations

A storage switch in accordance with an embodiment of the invention performs various switch-based storage operations, including classification of packets, virtualization, and translation. These services are generally performed by the SPU. In one embodiment, every port has an SPU, enabling the processing of data traffic as fast as possible while passing control traffic to the CPU, which has the resources to handle the control traffic. As shown in FIG. 7, four SPUs share a single CPU supporting eight ports. Thus, minimum resources and overhead are used for data traffic, allowing a large number of low cost ports each with the intelligence to process storage traffic at wire speed. The SPU functions will be described in detail below.

Before discussing the SPU functions, however, a brief overview of iSCS™ PDU's (Packet Data Units) and FC IUs (Information Units) will be useful. Nonetheless, a general knowledge of the iSCSI and FC protocols is assumed. For more information on iSCSI refer to "draft-ietf-ips-iSCSI-07.txt," an Internet Draft and work in progress by the Internet Engineering Task Force (IETF), Jul. 20, 2001, incorporated by reference herein. For more information about Fibre Channel (FC) refer to "Information Systems—dpANS Fibre Channel Protocol for SCSI," Rev. 012, Dec. 4, 1995 (draft proposed American National Standard), incorporated by reference herein.

A brief description of relevant PDUs and IUs follows below.

iSCSI Command PDU. An iSCSI Command PDU is shown in FIG. 8*a*. As shown it includes 48 bytes having the following fields. In the first byte (Byte 0), the X bit is used as a Retry/Restart indicator for PDUs from initiator to target. The I bit is used as an immediate delivery marker. The Opcode 0x01 indicates that the type of iSCSI PDU is a command. Byte 1 has a number of flags, F (final), R (read), and W (write). Byte 1 also has a task attribute field ATTR, which is usually 3 bits. CRN in Byte 3 is a SCSI command reference number. TotalAHSLength represents the total length of any additional optional header segments (not shown) in 4-byte words. DataSegmentLength indicates the length of the payload. LUN specifies a logical unit number. The Initiator Task Tag identifies a task tag assigned by the initiator (e.g., a server) to identify the task. Expected Data Transfer Length states the number of bytes of data to be transferred to or from the initiator for the operation. CmdSN is a command sequence number. ExpStatSN is an expected status sequence number and ExpDataSN is an expected data sequence number. The Command Descriptor block (CDB) is generally 16 bytes and embodies the SCSI command itself.

iSCSI R2T PDU. An iSCSI R2T PDU is shown in FIG. 8*b*. In byte 0, 0x31 identifies the packet as an R2T packet. The Initiator Task Tag is the same as for the Command PDU. The Target Transfer Tag is assigned by the target (e.g., a storage device) and enables identification of data packets. The StatSN field contains a status sequence number. ExpCmdSN identifies the next expected CmdSN from the initiator and MaxCmdSN identifies the maximum CmdSN acceptable from the initiator. R2TSN identifies the R2T PDU number. Desired Data Transfer Length specifies how many bytes the target wants the initiator to send (the target may request the data in several chunks). The target, therefore, also specifies a Buffer Offset that indicates the point at which the data transfer should begin.

iSCSI Write and Read Data PDUs. An iSCSI Write Data PDU is shown in FIG. 8c. An iSCSI Read Data PDU is shown in FIG. 8d. In byte 0, 0x05 identifies the packet as a write packet and 0x25 identifies the packet as a read packet. Most of the fields in these PDUs are the same as for those PDUs described above. In addition, the DataSN identifies a data sequence number and Residual Count identifies how many bytes were not transferred out of those expected to be transferred, for instance if the initiator's Expected Data Transfer Length was too small.

iSCSI Response PDU. An iSCSI Response PDU is shown in FIG. 8e. In Byte 0, 0x21 identifies the packet as a response packet. The Status field is used to report the SCSI status of the command. The response field contains an iSCSI service response code that identifies that the command is completed or that there has been an error or failure. Basic Residual Count identifies how many bytes were not transferred out of those expected to be transferred, for instance if the initiator's Expected Data Transfer Length was too small. Bidi_Read Residual Count indicates how many bytes were not transferred to the initiator out of those expected to be transferred. Other fields are the same as those discussed previously for other PDUs.

FCP Frame Header. Each FCP Information Unit (IU) uses the Frame Header shown in FIG. 8f and which will be followed by a payload, described below. The R_CTL field identifies the frame as part of an FC operation and identifies the information category. D_ID identifies the destination of the frame. S_ID identifies the source of the frame. TYPE is generally set to 0x08 for all frames of SCSI FCP sequences. F_CTL manages the beginning and normal or abnormal termination of sequences and exchanges. SEQ_ID identifies each sequence between a particular exchange originator and exchange responder with a unique value. DF_CTL indicates any optional headers that may be present. SEQCNT indicates the frame order within the sequence. The OX_ID field is the originator (initiator) identification of the exchange. The RX_ID field is the responder (target) identification of the exchange. The RLTV_OFF field indicates the relative displacement of the first byte of each frame's payload with reference to the base address of the information category.

FCP_CMND Payload. The payload for a FCP command IU is shown in FIG. 8g. FCP_LUN is a logical unit number. FCP_CNTL is a control field that contains a number of control flags and bits. FCP_CDB contains the actual SCSI CDB to be interpreted by the addressed logical unit. FCP_DL contains a count of the greatest number of data bytes expected to be transferred to or from the target.

FCP XFR RDY Payload. The payload for an FCP XFR_RDY IU is shown in FIG. 8h. The DATA_RO field indicates the contents of the RLTV_OFF field for the first data byte of the next FCP_DATA IU. The BURST_LEN field indicates the amount of buffer space prepared for the next FCP_DATA IU and requests the transfer of an IU of that exact length.

FCP DATA IU. The payload for a data IU is the actual data transferred.

FCP_RSP_IU. The payload for an FCP response IU is shown in FIG. 8i. The FCP_STATUS field is set to 0 upon the successful completion of a command task. Otherwise it indicates various status conditions. The FCP_RESID field contains a count of the number of residual data bytes which were not transferred in the FCP_DATA IU for this SCSI command. FCP SNS_LEN specifies the number of bytes in the FCP_SNS_INFO field. FCP_RSP_LEN specifies the number of bytes in the FCP_RSP_INFO field. The FCP_RSP_INFO field contains information describing any protocol failures detected. The FCP_SNS_INFO field contains any sense data present.

The details of each iSCSI PDU and FC IU have been only generally described. Further details regarding iSCSI PDUs, FC IUs, and their respective fields can be found in the iSCSI and FC documents referenced above. Classification for Storage Switch As packets or frames (generically referred to herein as "packets") arrive at the storage switch they are separated at each port into data and control traffic. Data traffic is routed to the PPU for wire-speed virtualization and translation, while control traffic such as connection requests or storage management requests are routed to the CPU. This separation is referred to herein as "packet classification" or just "classification" and is generally initiated in the PACE of the SPU. Accordingly, unlike the existing art, which forwards all packets to the CPU for processing, a system in accordance with the invention recognizes the packet contents, so that data traffic can be processed separately and faster, aiding in enabling wire-speed processing. GigE packets and FC frames are handled slightly differently, as described below.

Figure 9A:
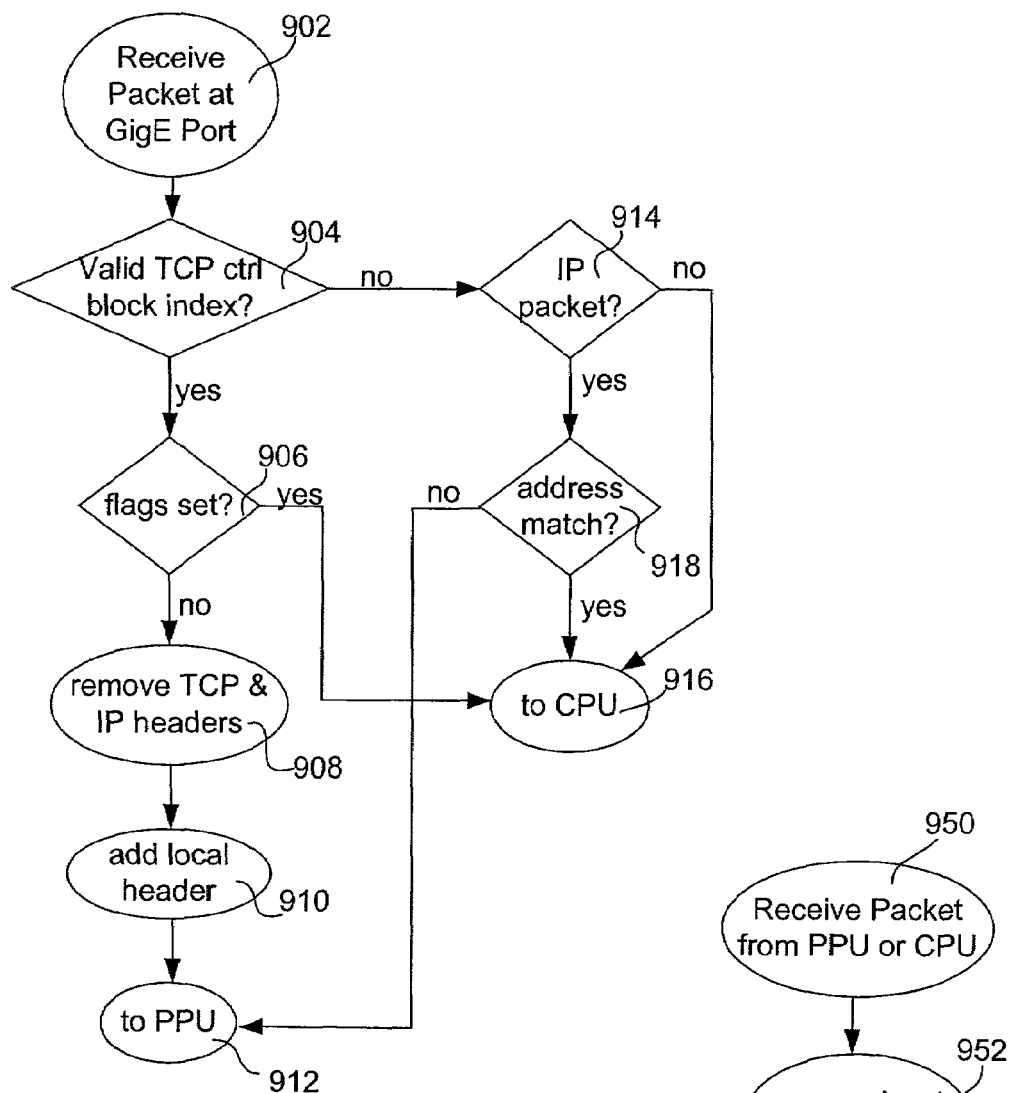
FIG. 9a is a flow diagram illustrating a classification process of iSCSI packets in the ingress direction as the process occurs in the PACE, in accordance with an embodiment of the invention.

For packets arriving at a GigE port in the ingress direction (packets arriving at the switch), the following steps will be described with reference to FIG. 9a. A GigE port will receive a packet, which in one embodiment is either an IP packet or an iSCSI packet, step 902. Once the packet is received, the PACE determines if a virtual target access is recognized by whether it receives from the port a valid TCP Control Block Index with the packet (e.g., an index that is not −1), step 904. If there is a valid TCP Control Block Index, the PACE next checks the flags of the packet's TCP header, step 906. If the SYN, FIN, and RST flags of the TCP header are set, the packet is forwarded to the CPU, step 916, as the CPU would be responsible to establish and terminate a TCP session. Once an iSCSI TCP session is established, for managing the TCP session, the GigE port will receive a valid TCP control block from the CPU. But if the flags are not set, then in one embodiment the PACE will remove the TCP, IP, and MAC headers, step 908, leaving the iSCSI header, and then add a local header, step 910. Other embodiments, however, may leave the TCP, IP and MAC headers, and simply add a local header. Once the local header is added, the packet is sent to the PPU, step 912.

Figure 10A:
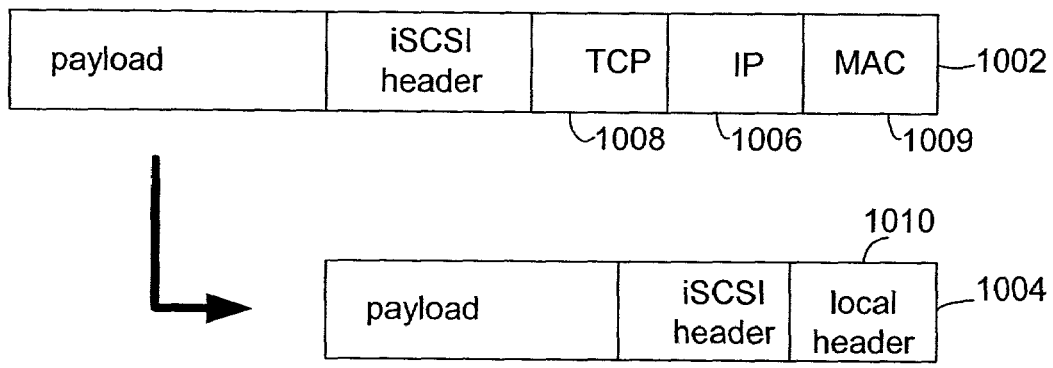
FIGS. 10a and 10b illustrate block diagrams of TCP packets as they enter a storage switch in accordance with the invention and how the packets are modified for use within the storage switch.
Figure 10B:
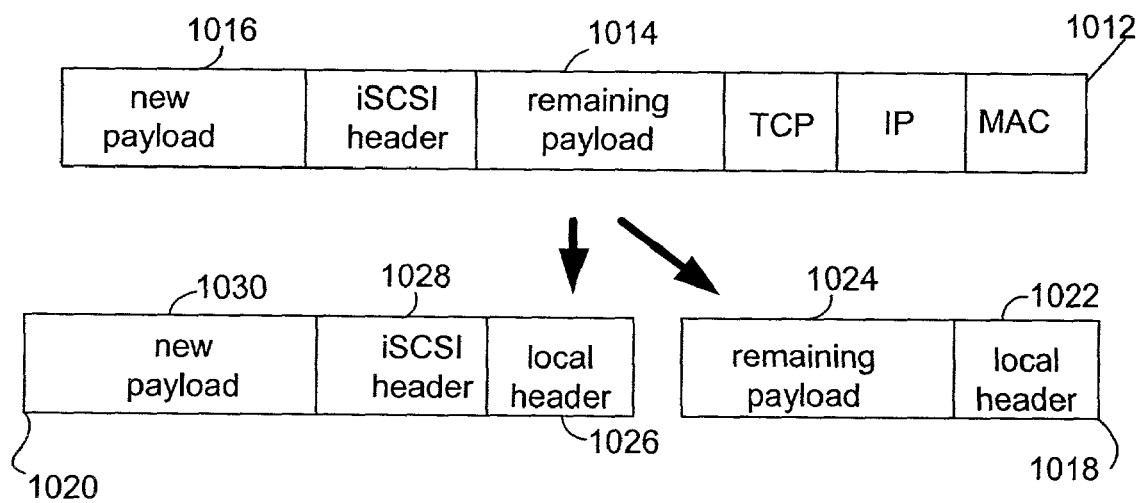

Referring additionally to FIG. 10a, if step 910 is performed, the received TCP packet 1002 would be converted to a local packet 1004, having the IP, TCP, and MAC headers 1006, 1008, 1009 removed (in one embodiment) and a local header 1010 added. In some cases, however, the payload for an iSCSI packet may be split over two TCP/IP packets. Thus, referring to FIG. 10b, sometimes a received TCP packet 1012 includes a second portion 1014 of a payload, where the first part of the payload was sent in a previous packet. The packet containing the second portion of the payload may additionally contain a new independent payload 1016. The received packet 1012 would be divided into two local packets, 1018 and 1020. Local packet 1018 includes a local header 1022 and the second portion of the payload 1024 from a previous packet, but not an iSCSI header. Local packet 1020 includes the local header 1026, the iSCSI header 1028, and the new payload 1030.

Figure 11:
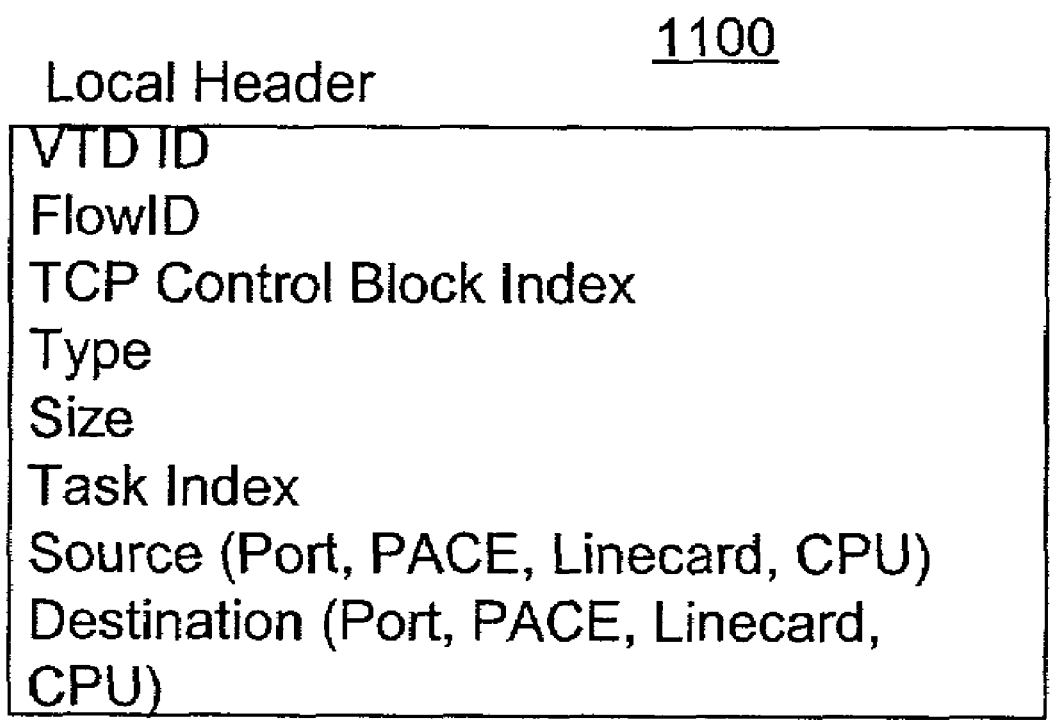
FIG. 11 is a generalized block diagram of a Local Header used in a storage switch in accordance with an embodiment of the invention.

An example local header 1100 used in one embodiment is shown in FIG. 11. The local header 1100 includes the following fields in one embodiment. A VTD ID field is used to identify a VTD for a particular connection. A FlowID specifies the destination port for a packet. A TCP Control Block Index specifies a TCP control block for a particular connection (if a TCP connection). The Type field specifies the packet classification, e.g., data or control. The Size field indicates the packet size. The Task Index is used to track and direct the packet within the switch as well as to locate stored information related to the packet for the particular task. The local header further includes some hardware identifiers such as source identifiers (e.g., identifying a source port, PACE, linecard, and/or CPU) and destination identifiers (e.g., identifying a distinction Port, PACE linecard, and/or CPU).

The local header is used by various devices (e.g., PACE, PPU) throughout the switch. Accordingly, in some instances not all fields of the local header will be fully populated and in some instances the field contents may be changed or updated.

Referring again to FIG. 9a, in the event that there is no valid TCP Control Block Index, step 904, then it is determined if the packet is an IP packet, step 914. If the packet is not an IP packet, it is forwarded to the CPU, step 916. If the packet is an IP packet, then the PACE checks the destination IP address, step 918. If the IP address matches that of the port of the storage switch, the packet is sent to the CPU, step 916, for processing. If the IP address does not match that of the port of the storage switch, then it is routing traffic and is forwarded to the PPU, step 912.

Figure 9B:
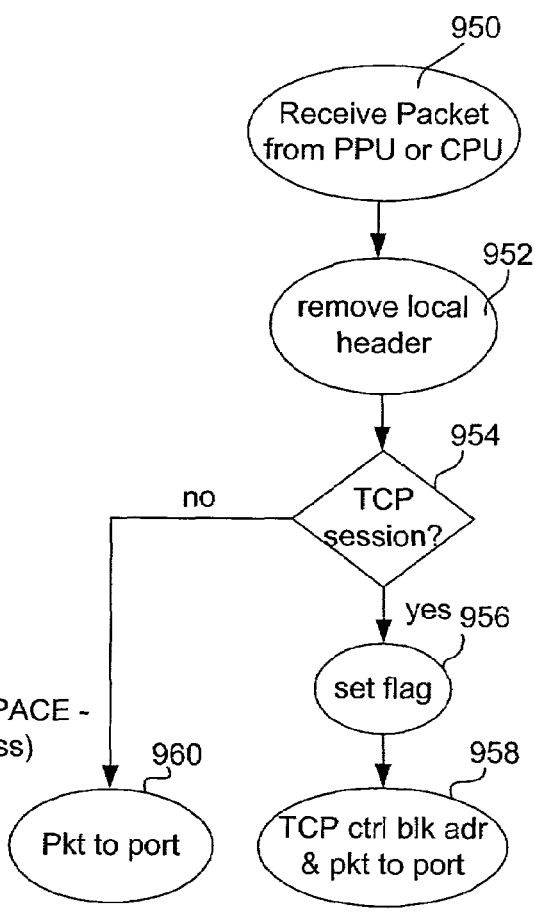
FIG. 9b is a flow diagram illustrating a classification process of iSCSI packets in the egress direction as the process occurs in the PACE, in accordance with an embodiment of the invention.

Referring to FIG. 9b, when a packet destined for a GigE port is received in the egress direction by the PACE from an PPU or CPU, step 950, the PACE removes the local header, step 952. If the packet is for a TCP session, step 954, the PACE sets a control flag in its interface with the port to so inform the GigE port, step 956. If the packet is for a TCP session, the PACE passes the packet and the TCP Control Block Index to the port using interface control signals, step 958. If there is no TCP session, the packet is simply passed to the port, step 960.

Figure 12A:
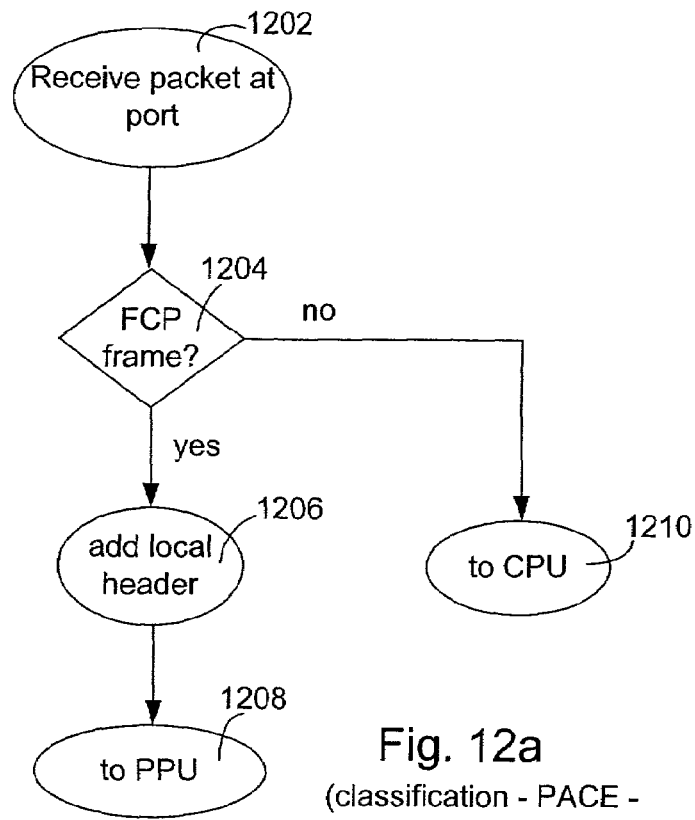
FIG. 12a is a flow diagram illustrating a classification process of FCP frames in the ingress direction as the process occurs in the PACE, in accordance with an embodiment of the invention.

FIG. 12a illustrates the steps that occur at the PACE in classifying packets that arrive from an FC port. Unlike for a GigE port, the PACE for an FC port does not have to deal with a TCP Control Block Index. Instead, upon receiving a packet at an FC port, step 1202, the S_ID field of the FCP frame header can be consulted to determine if the frame belongs to an open FC connection, however, this step is performed after the packet is passed to the PPU. Thus, the PACE only need determine if the frame is an FCP frame, step 1204, which can be determined by consulting the R_CTL and TYPE fields of the frame header. A local header 1100 (FIG. 11) is added, step 1206, although the FCP frame header is not removed at this point as the data in the header will be useful to the PPU later. The local packet is then passed to the PPU, step 1208. If the frame is not an FCP frame, it is passed to the CPU, step 1210.

Figure 12B:
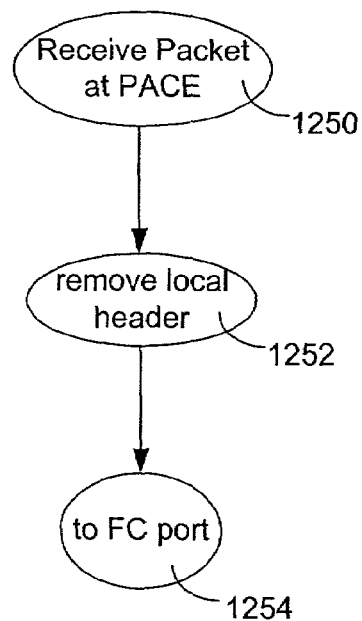
FIG. 12b is a flow diagram illustrating a classification process of FCP frames as in the egress direction as the process occurs in the PACE, in accordance with an embodiment of the invention.

Referring to FIG. 12b, when a packet destined for an FC port is received in the egress direction by the PACE from an PPU or CPU, step 1250, the PACE simply removes the local header, step 1252, before passing the frame to the FC port, step 1254. The local header will indicate to the PACE which port (of the two ports the PACE is connected to) the packet is destined for.

Figure 13A:
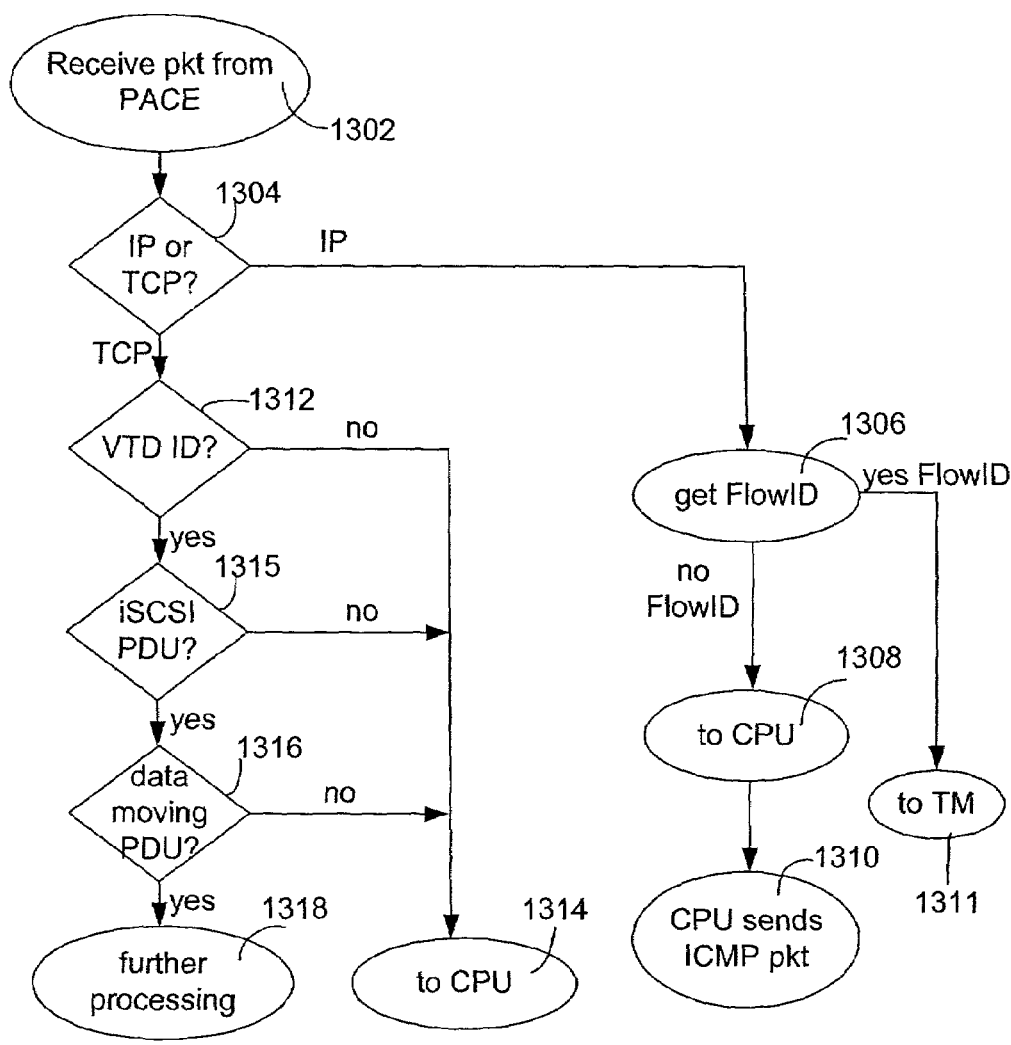
FIG. 13a is a flow diagram illustrating a classification process in the ingress direction as the process occurs in the PPU, in accordance with an embodiment of the invention.

For packets received at either a GigE or FC port and that are passed to the PPU, the PPU further separates control traffic in one embodiment. Referring to FIG. 13a, when the PPU receives a packet from the PACE, step 1302, the PPU determines if it is an IP or TCP packet, step 1304. If the packet is an IP packet, the PPU searches its CAM to obtain the FlowID of the packet from its route table, step 1306. If the search fails, the packet has an unknown destination IP address, and it is passed to the CPU, step 1308, which in turn sends an ICMP packet back to the source IP address step 1310. If the search returns a FlowID, then the packet is forwarded to the Traffic Manager, step 1311.

When the packet received is a TCP packet, step 1304, the PPU searches its CAM using the TCP Control Block Index, which identifies the TCP session, together with the LUN from the iSCSI header, which identifies the virtual target, to get a virtual target descriptor ID (VTD ID), step 1312. The VTD ID's are essentially addresses or pointers to the VTDs stored in the PPU SRAM. The PPU uses the VTD ID to obtain the address of the VTD, step 1312, so a search of VTD ID's allows the ability to quickly locate a VTD. If the VTD cannot be obtained, then the iSCSI session has not yet been established, and the packet is sent to the CPU, step 1314. But if the VTD ID is obtained in step 1312, the PPU determines if the packet contains an iSCSI PDU, step 1315. If the packet does not contain an iSCSI PDU, it is forwarded to the CPU, step 1314. But if it does include an iSCSI PDU, the PPU determines if the PDU is a data moving PDU (e.g., read or write command, R2T, write data, read data, response), step 1316. If the PDU is not a data moving PDU, then the packet is passed to the CPU, step 1314. But if the PDU is a data moving PDU, then the PPU performs further processing on the packet, step 1318, e.g., virtualization and translation, as will be described later.

When the PPU receives an FCP frame with an FCP command IU in the ingress direction, the PPU performs similar steps to those described in FIG. 13a, steps 1302, 1312-1318, except that the CAM search in step 1312 uses the S_ID address and the LUN from the FCP frame to find the VTD ID.

Figure 13B:
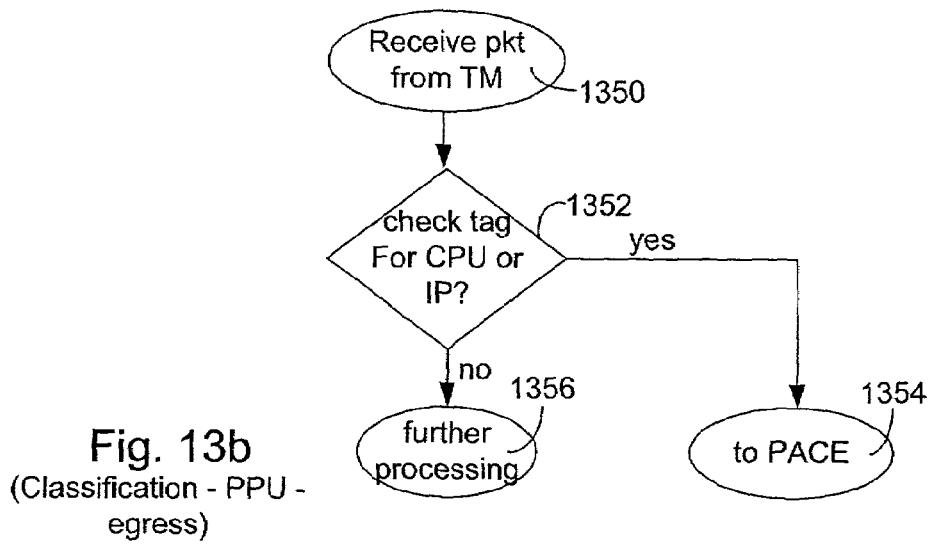
FIG. 13b is a flow diagram illustrating a classification process in the egress direction as the process occurs in the PPU, in accordance with an embodiment of the invention.

In the egress direction, shown in FIG. 13b, after receiving a packet from the traffic manager, step 1350, the PPU checks the Type field of the local header, step 1352. If the field indicates that the packet is an IP packet or a packet destined for the CPU, then the PPU sends the packet to the PACE, step 1354. Otherwise, the PPU performs further processing on the packet, step 1356, e.g., virtualization and translation, as will be described later.

As described above, the CPU will be passed packets from the SPU in several situations. These situations include:

1. A non-TCP packet having the storage switch as its destination. Such a packet could be an ICMP, IP, RIP, BGP, or ARP packet, as are understood in the art. The CPU performs the inter-switch communication and IP routing function. The packet may also be SLP or iSNS requests that will be forwarded to the SCC.
2. An IP packet without a CAM match to a proper routing destination. While this situation will not frequently occur, if it does, the CPU returns an ICMP packet to the source IP address.
3. A non-iSCSI TCP packet. Such a packet would generally be for the CPU to establish or terminate a TCP session for iSCSI and will typically be packets with SYN, FIN, or RST flags set.
4. A non-FCP FC frame. Such frames are FLOGI, PLOGI, and other FCP requests for name services. Similar to iSCSI TCP session, these frames allow the CPU to recognize and to communicate with the FC devices. In one embodiment, the CPU needs to communicate with the SCC to complete the services.
5. An iSCSI PDU that is not a SCSI command, response, or data. Such a packet may be a ping, login, logout, or task management. Additional iSCSI communication is generally required before a full session is established. The CPU will need information from the SCC database to complete the login.

6. An iSCSI command PDU with a SCSI command that is not Read/Write/Verify. These commands are iSCSI control commands to be processed by the CPU where the virtual target behavior is implemented.
7. An FCP frame with a SCSI command that is not Read/Write/Verify. These commands are FCP control commands to be processed by the CPU where the virtual target behavior is implemented.

Virtualization

After the packet is classified, as described above, the PPU performs wire-speed virtualization and does so without data buffering in one embodiment.

For each packet received, the PPU determines the type of packet (e.g., command, R2T/XFR_RDY, Write Data, Read-Data, Response, Task Management/Abort) and then performs either an ingress (where the packet enters the switch) or an egress (where the packet leaves the switch) algorithm to translate the virtual target to a physical target or vice versa. Thus, the virtualization function is distributed amongst ingress and egress ports. To further enable wire-speed processing, virtual descriptors are used in conjunction with a CAM, to map the request location to the access location. In addition, for each packet there may be special considerations. For instance, the virtual target to which the packet is destined may be spaced over several noncontiguous extents, may be mirrored, or both. (Mirroring is discussed in the "Storage Services" section of this document.) The ingress and egress process for each packet type is described below. However, generally, the ingress process for each packet validates the virtual target, determines the egress port to send the packet to, and leaves trace tags so responsive packets can be tracked. The egress process generally continues to maintain trace tags and makes adjustments to the block addresses to translate from the virtual world to the physical one.

Command Packet—Ingress

Figure 14:
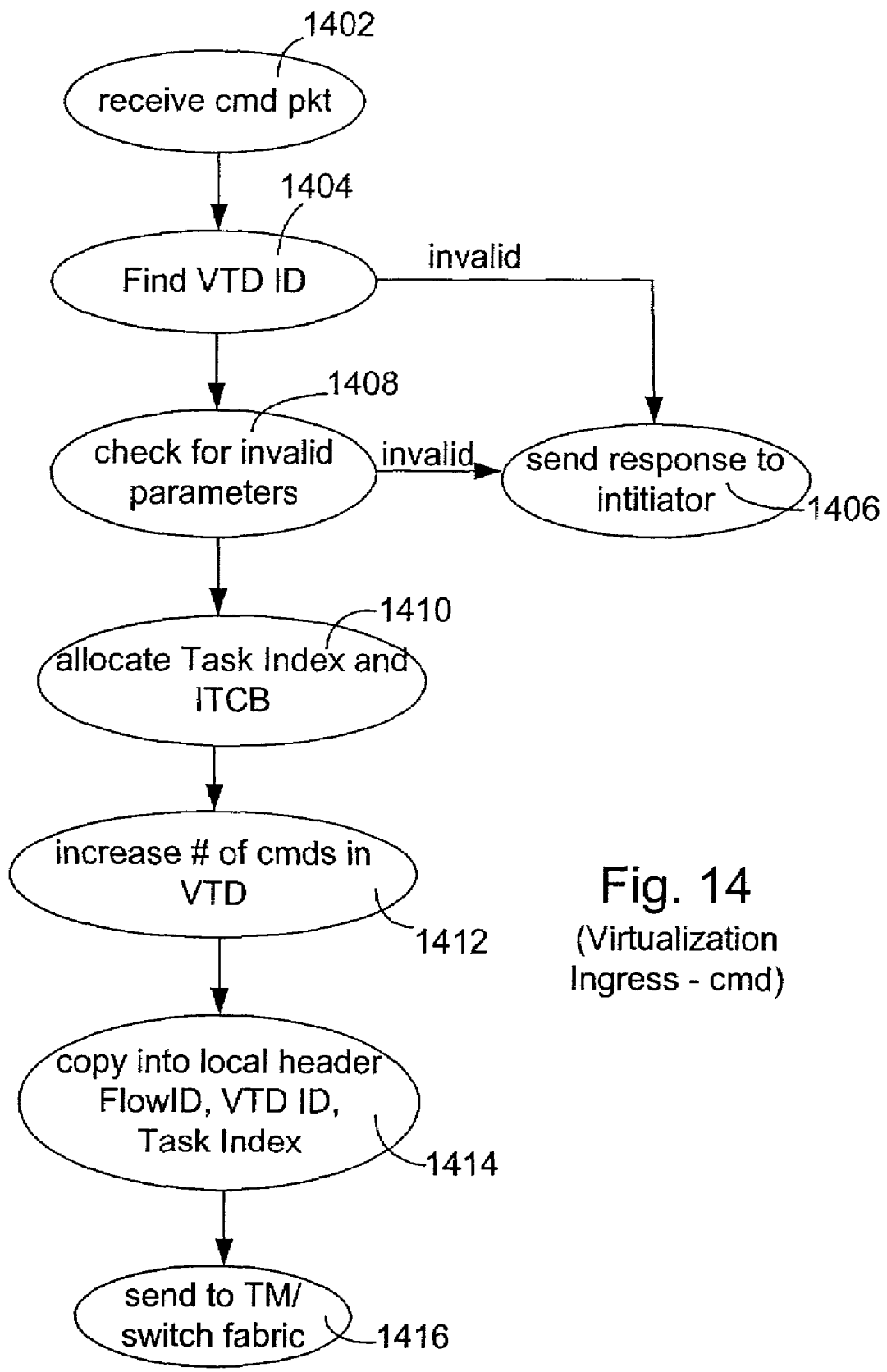
FIG. 14 is a flow diagram illustrating a virtualization process in the ingress direction for command packets or frames, in accordance with an embodiment of the invention.

To initiate a transfer task to or from the virtual target, a SCSI command is always sent by an iSCSI or FC initiator in an iSCSI PDU or FCP IU, respectively. Referring to FIGS. 14 and 14a, when such a packet is received at the PPU (after classification), step 1402, the PPU CAM is next checked to determine if a valid VTD ID exists, using the TCP Control Block Index and the logical unit number (LUN), in the case of an iSCSI initiator, or the S_ID and the LUN, in the case of an FC initiator, step 1404. The LUNs in each case are found in the respective iSCSI PDU or FCP IU. If no valid VTD ID is found, then a response packet is sent back to the initiator, step 1406. If a valid VTD is found, then a check is made for invalid parameters, step 1408. Such checks may include checking to determine if the number of outstanding commands for the virtual target has exceeded a maximum allowable number or if the blocks requested to be accessed are in an allowable range. If invalid parameters exists, a response packet is sent back to the iSCSI or FC initiator, step 1406.

If all parameters checked are valid, then a Task Index is allocated along with an Ingress Task Control Block (ITCB), step 1410 and shown in FIG. 14a. The Task Index points to or identifies the ITCB. The ITCB stores the FlowID (obtained from the VTD), the VTD ID, CmdSN (from the iSCSI packet itself), as well as the initiator_task_tag sent in the iSCSI PDU or the OX_ID in the FCP frame header. The ITCB is stored in the PPU SRAM. Of course there may be many commands in progress at any given time, so the PPU may store a number of ITCBs at any particular time. Each ITCB will be referenced by its respective Task Index.

The VTD tracks the number of outstanding commands to a particular virtual target, so when a new ITCB is established, it must increment the number of outstanding commands, step 1412. In some embodiments, VTDs establish a maximum number of commands that may be outstanding to any one particular virtual target. The FlowID, the VTD ID, and the Task Index are all copied into the local header, step 1414. The FlowID tells the traffic manager the destination linecards and ports. Later, the Task Index will be returned by the egress port to identify a particular task of a packet. Finally, the packet is sent to the traffic manager and then the routing fabric, so that it ultimately reaches an egress PPU, step 1416.

When a virtual target is composed of multiple extents, then there will be multiple FlowIDs identified in the VTD, one for each extent. The PPU checks the block address for the packet and then selects the correct FlowID. For example, if a virtual target has two 1 Gb extents, and the block address for the command is in the second extent, then the PPU selects the FlowID for the second extent. In other words, the FlowID determines the destination/egress port. If a read command crosses an extent boundary, meaning that the command specifies a starting block address in a first extent and an ending block address in a second extent, then after reading the appropriate data from the first extent, the PPU repeats the command to the second extent to read the remaining blocks. For a write command that crosses an extent boundary, the PPU duplicates the command to both extents and manages the order of the write data. When a read command crosses an extent boundary, there will be two read commands to two extents. The second read command is sent only after completing the first to ensure the data are returned sequentially to the initiator.

Note that in reference to FIG. 14a, not all fields in the local header are necessarily illustrated.

Command Packet—Egress

Figure 15:
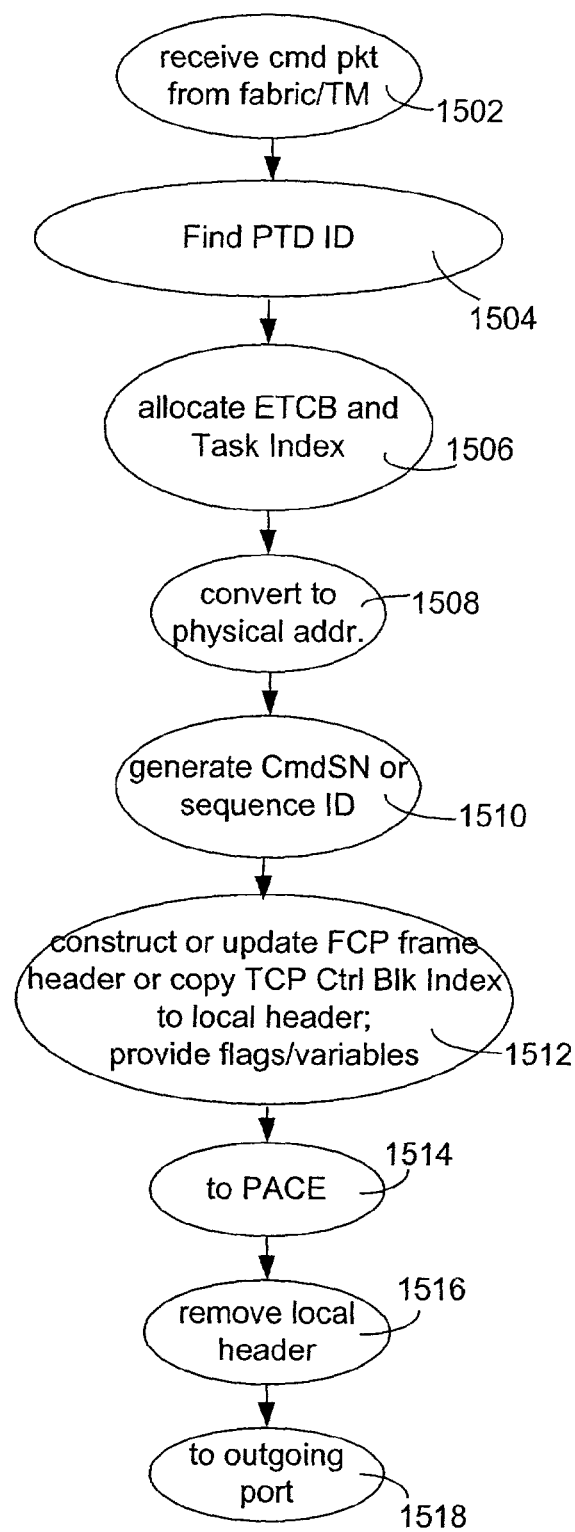
FIG. 15 is a flow diagram illustrating a virtualization process in the egress direction for command packets or frames, in accordance with an embodiment of the invention.

Referring to FIGS. 15 and 15a, after the command PDU or IU has passed through the switch fabric, it will arrive at an PPU, destined for an egress port, step 1502. The PPU then attempts to identify the physical device(s) that the packet is destined for, step 1504. To do so, the VTD ID from the local header is used to search the PPU CAM for a PTD ID (Physical Target Descriptor Identifier): The VTD ID is affiliated with and indexes a particular PTD ID associated with the particular egress PPU. PTDs are stored in the PPU SRAM, like VTDs, and also contain information similar to that found in a VTD. If the search is unsuccessful, it is assumed that this is a command packet sent directly by the CPU and no additional processing is required by the PPU, causing the PPU to pass the packet to the proper egress port based on the FlowID in the local header. If the search is successful, the PTD ID will identify the physical target (including extent) to which the virtual target is mapped and which is in communication with the particular egress linecard currently processing the packet.

The PPU next allocates a Task Index together with an egress task control block (ETCB), step 1506, and shown in FIG. 15a. In an embodiment, the Task Index used for egress is the same as that used for ingress. The Task Index also identifies the ETCB. In addition, the ETCB also stores any other control information necessary for the command, including CmdSN of an iSCSI PDU or an exchange sequence for an FCP IU.

Next, using the contents of the PTD, the PPU converts the SCSI block address from a virtual target to the block address of a physical device, step 1508. Adding the block address of the virtual target to the beginning block offset of the extent can provide this conversion. For instance, if the virtual target block sought to be accessed is 1990 and the starting offset of the corresponding first extent is 3000, then the block address of the extent to be accessed is 4990. Next the PPU generates proper iSCSI CmdSN or FCP sequence ID, step 1510 and places them in the iSCSI PDU or FCP frame header. The PPU also constructs the FCP frame header if necessary (in some embodiments, after the ingress PPU reads the necessary information from the FCP header, it will remove it, although other embodiments will leave it intact and merely update or change the necessary fields at this step) or for a packet being sent to an iSCSI target, the TCP Control Block Index is copied into the local header from the PTD, step 1512. In addition, the PPU provides any flags or other variables needed for the iSCSI or FCP headers. The completed iSCSI PDU or FCP frame are then sent to the PACE, step 1514, which in turn strips the local header, step 1516, and passes the packet to appropriate port, step 1518.

For a virtual target of multiple extents, each extent has a different starting offset. So when a command must be split between two extents, the PPU must determine the proper address. For instance, assume a virtual target includes two extents defined in Table 1:

TABLE 1

| Extent | 1 | 2 |
|---|---|---|
| Starting offset | 3000 | 5000 |
| Size in blocks | 2000 | 2500 |

If it is desired to access the virtual target starting at address 1990 for 30 blocks, then the PPU for the first extent sends the command to address 4990 for 10 blocks (5120 bytes of data— in one embodiment a block is 512 bytes). The PPU for the second extent sends the command to address 5000 for 20 blocks (10,240 bytes of data). In other words, the PPU for the first extent must add the address to be accessed to the starting offset of the first extent (3000+1990) and then subtract that address from its total size (2000–1990) to determine how many blocks it can access. The PPU for the second extent will start at its starting offset (5000) and add the remaining blocks (20) from there (5000-5019). As a further example, if it was desired to access virtual block 2020, the PPU for the second extent would subtract the size of the first extent (2000), before adding the offset for the second extent (5000), to achieve the resulting address 5020.

R2T or XFR_RDY—Ingress

Figure 16:
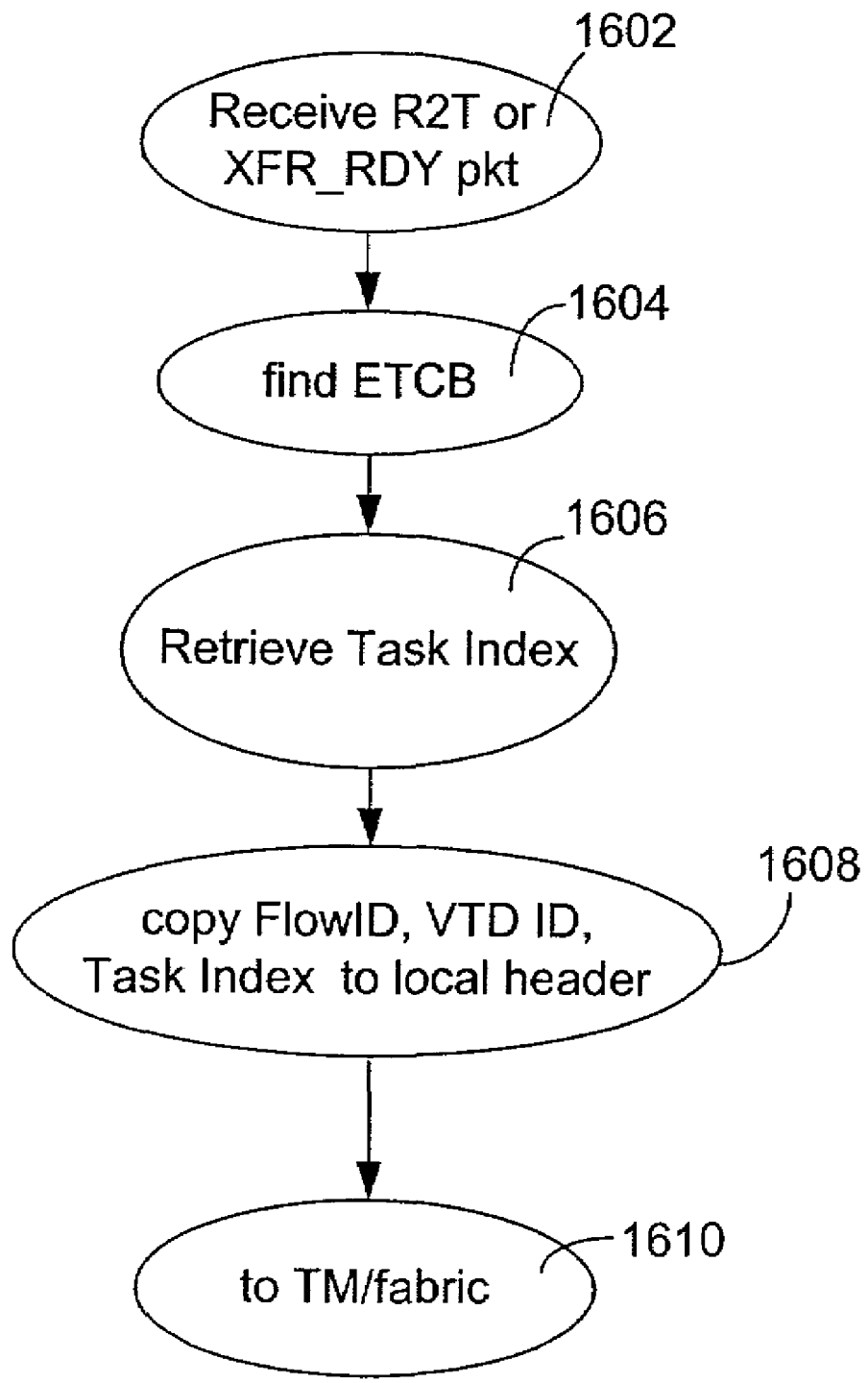
FIG. 16 is a flow diagram illustrating a virtualization process in the ingress direction for R2T/XFR_RDY packets or frames, in accordance with an embodiment of the invention.
Figure 17:
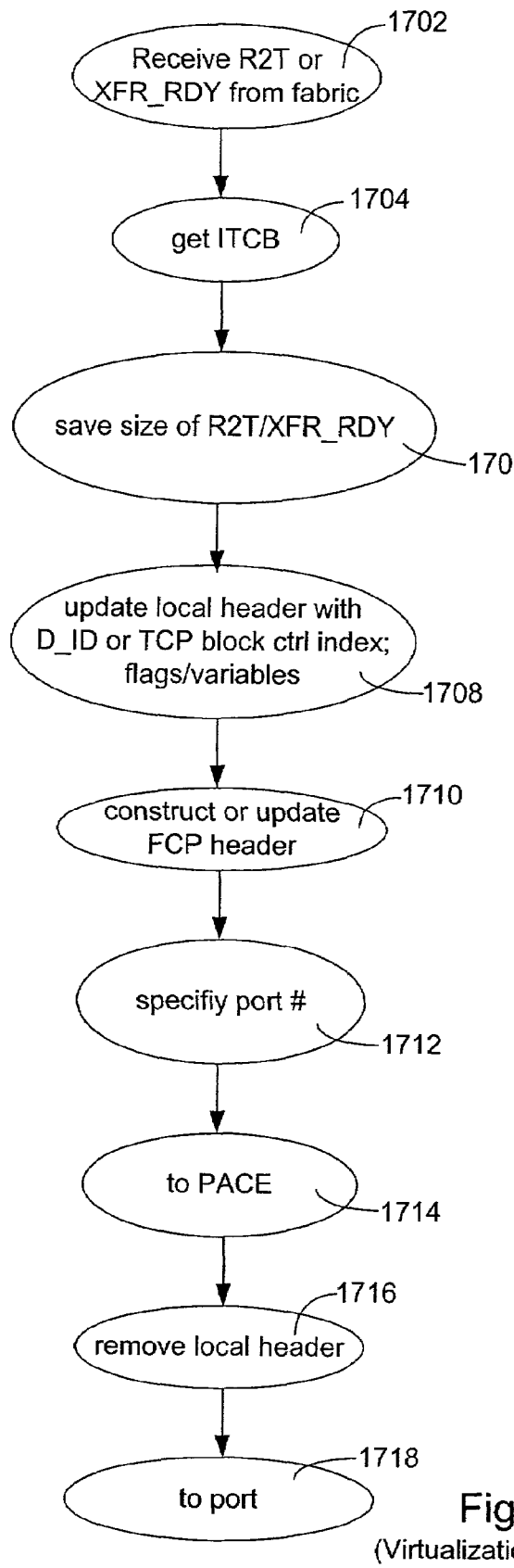
FIG. 17 is a flow diagram illustrating a virtualization process in the egress direction for R2T/XFR_RDY packets or frames, in accordance with an embodiment of the invention.

Referring to FIGS. 16 and 16*a*, after a command has been sent to a target storage device as described above, and the command is a write command, an R2T PDU or an XFR_RDY IU will be received from a storage device when it is ready to accept write data, step 1602. The PPU identifies the corresponding ETCB, step 1604, by using the initiator_task_tag or OX_ID inside the packet. In some embodiments, the initiator_task_tag or OX_ID of the packet is the same as the Task Index, which identifies the ETCB. If the PPU cannot identify a valid ETCB because of an invalid initiator_task_tag or OX_ID, the packet is discarded. Otherwise, once the ETCB is identified, the PPU retrieves the Ingress Task Index (if different from the Egress Task Index) and the VTD ID from the ETCB, step 1606. The PPU also retrieves the FlowID from the PTD, which is also identified in the ETCB by the PTD ID. The FlowID indicates to the traffic manager the linecard of the original initiator (ingress) port. The FlowID, the VTD ID, and the Task Index are copied into the local header of the packet, step 1608. Finally the packet is sent to the traffic manager and the switch fabric, step 1610.

R2T or XFR RDY—Egress

After the R2T or XFR_RDY packet emerges from the switch fabric, it is received by a PPU, step 1702, on its way to be passed back to the initiator (the device that initiated the original command for the particular task). The Task Index identifies the ITCB to the PPU, step 1704, from which ITCB the original initiator_task_tag and the VTD ID can be obtained. The R2T/XFR_RDY Desired Data Transfer Length or BURST_LEN field is stored in the ITCB, step 1706. The local header is updated with the FCP D_ID or the TCP Control Block Index for the TCP connection, step 1708. Note that the stored S_ID from the original packet, which is stored in the ITCB, becomes the D_ID. If necessary an FCP frame header is constructed or its fields are updated, step 1710. The destination port number is specified in the local header in place of the FlowID, step 1712, and placed along with the initiator_task_tag in the SCSI PDU or, for an FC connection, the RX_ID and OX_ID are placed in the FCP frame. The PPU also places any other flags or variables that need to be placed in the PDU or FCP headers. The packet is forwarded to the PACE, step 1714, which identifies the outgoing port from the local header. The local header is then stripped, step 1716 and forwarded to the proper port for transmission, step 1718.

In the event that the command is split over two or more extents, e.g., the command starts in one extent and ends in another, then the PPU must hold the R2T or XFR_RDY of the second extent until the data transfer is complete to the first extent, thus ensuring a sequential data transfer from the initiator. In addition, the data offset of the R2T or XFR_RDY of the second extent will need to be modified by adding the amount of data transferred to the first extent. Referring to the example of Table 1, if the command is to access block 1990 for 30 blocks, then the data offset for the R2T or XFR_RDY of the second extent must add 10 blocks so that block 11 is the first block to be transferred to the second extent.

Write Data Packet—Ingress

Figure 18:
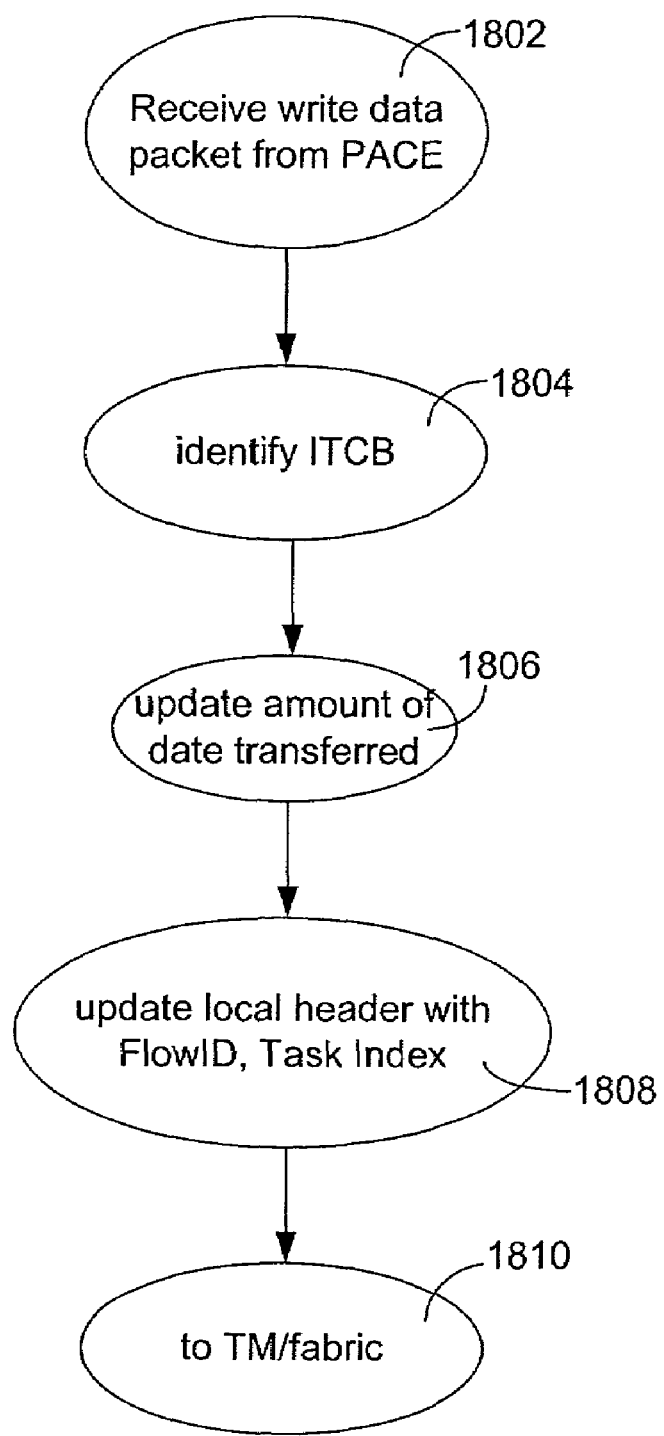
FIG. 18 is a flow diagram illustrating a virtualization process in the ingress direction for write data packets or frames, in accordance with an embodiment of the invention.

After an initiator receives an R2T or XFR_RDY packet it returns a write-data packet. Referring to FIGS. 18 and 18*a* when a write-data iSCSI PDU or FC IU is received from an initiator, step 1802, the ITCB to which the packet belongs must be identified, step 1804. Usually, the ITCB can be identified using the RX_ID or the target task tag, which is the same as the Task Index in some embodiments. The SPU further identifies that received packets are in order. In some circumstances, however, the initiator will transfer unsolicited data: data that is sent prior to receiving an R2T or XFR_RDY. In such a case, the PPU must find the ITCB by a search through the outstanding tasks of a particular virtual target. But if the ITCB is not found, then the packet is discarded. If the ITCB is found, the total amount of data to be transferred is updated in the ITCB, step 1806. The FlowID and Task Index are added to the local header of the packet, step 1808. The packet is then forwarded to the traffic manager and ultimately to the switch fabric, step 1810.

In the event that a command is split between two extents because the command starts in one and ends in the second, the PPU must determine the extent to which the particular data belongs and forward the data packet to the correct egress linecard. The PPU sets the proper FlowID to the extent. After completing the data transfer on the first extent, the PPU checks if the R2T or XFR_RDY of the second extent was received. Until the data transfer is completed on the first extent, the data will not be sent to the second extent to ensure sequential transfer.

Write Data Packet—Egress

Figure 19:
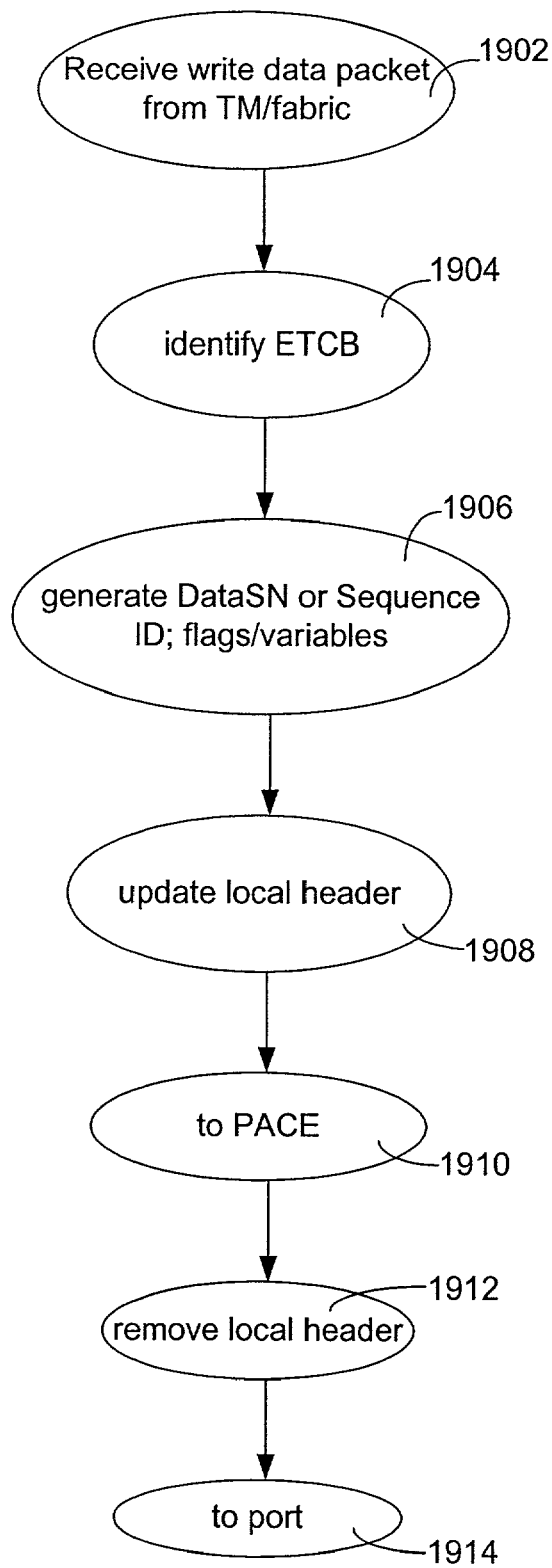
FIG. 19 is a flow diagram illustrating a virtualization process in the egress direction for write data packets or frames, in accordance with an embodiment of the invention.

Referring to FIGS. 19 and 19*a*, when a write-data packet is received from the switch fabric (via the traffic manager), step 1902, the ETCB for the packet needs to be identified, step 1904. Typically, the ETCB can be identified using the Task Index in the local header. Once the ETCB is found, using the information inside the ETCB, the PPU generates proper iSCSI DataSN or FCP sequence ID, step 1906, along with any other flags and variables, e.g, data offset, for the PDU or FCP frame header. The local header is updated with the TCP Control Block Index or the FCP D_ID from the PTD, step 1908. The port number is also added to the local header. The finished iSCSI PDU or FCP frame is sent to the PACE, step 1910, which removes the local header, step 1912, and forwards the packet to the appropriate port, 1914.

In the event that the command is split between two extents, the data offset of the packet to the second extent must be adjusted. Using the example of Table 1, if the command is to access virtual addresses starting at 1990 for 30 blocks, then the data offset of the write data packet to the second extent must be subtracted by ten blocks because the block 11 from an initiator is actually the first of the second extent.

Read Data Packet—Ingress

Figure 20:
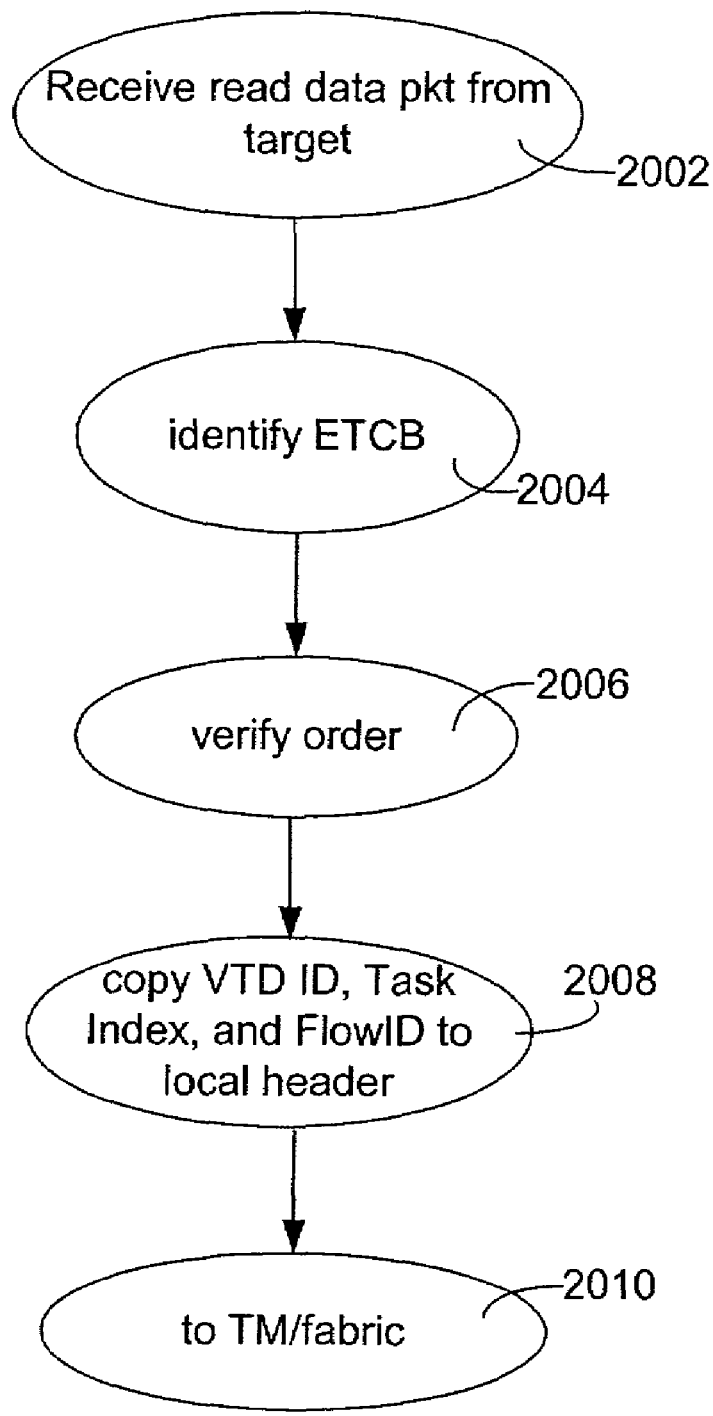
FIG. 20 is a flow diagram illustrating a virtualization process in the ingress direction for read data packets or frames, in accordance with an embodiment of the invention.

Referring to FIGS. 20 and 20a, after receiving a read command, the target device will respond with a read-data packet, which will be received at the PPU (after undergoing classification in the PACE), step 2002. The ETCB for the packet is then identified, using the OX_ID or initiator_task_tag, step 2004. The PPU further verifies if the packet was received in order using sequence numbers or verifying that data offsets are in ascending order, step 2006. If the packet was not in order, the read command is terminated in error. If the packet is in proper order, however, the VTD ID, Task Index, and FlowID are retrieved from the ETCB and VTD and copied into the local header, step 2008. The packet is sent to the traffic manager and ultimately the switch fabric, step 2010.

In the event that a read-data packet crosses an extent boundary, the data offset of the packet from the second extent must be modified. This offset is usually performed on the egress side, described below, as the FlowID will identify the packet from the second extent. In addition, in order to ensure sequentially returned data, the read command to the second extent will not be sent until completion of the read from the first extent.

Read Data Packet—Egress

Figure 21:
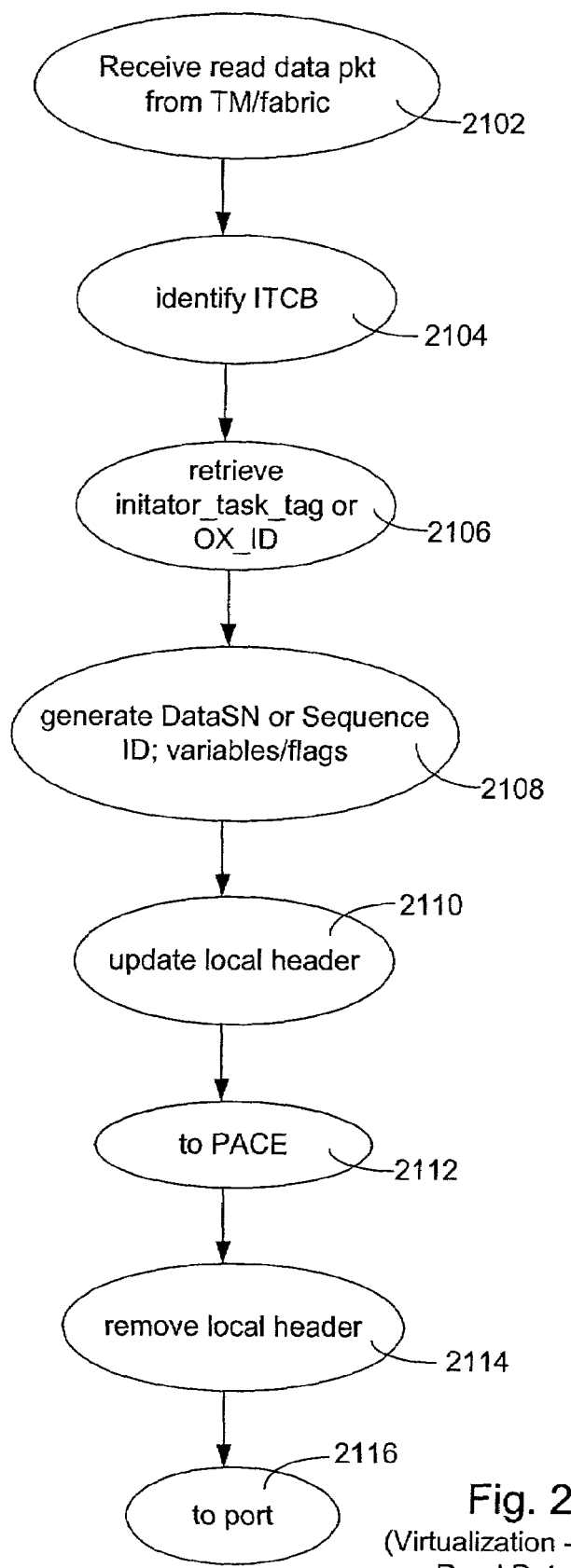
FIG. 21 is a flow diagram illustrating a virtualization process in the egress direction for read data packets or frames, in accordance with an embodiment of the invention.

Referring to FIGS. 21 and 21a, when a read-data packet is received by an PPU from the switch fabric, step 2102, the ITCB for the packet is identified, step 2104, usually using the Task Index in the local header. From the ITCB, the PPU retrieves the initiator_task_tag or OX_ID, step 2106. Using the saved data in the ITCB, the PPU generates proper iSCSI DataSN or FCP sequence IDs as well as other flags or variables of the PDU or FCP frame header, step 2108. The local header is updated with the TCP Control Block Index or FCP S_ID from the VTD, step 2110. Note, however, that for a packet going back to the initiator, the S_ID from the original packet will be used as the D_ID. The outgoing port number is also added to the local header. The packet is then sent to the PACE, step 2112, which removes the local header, step 2114, and forwards the packet to the appropriate port, step 2116.

In the event that a command is split between two extents (a fact tracked in the ITCB), the data offset of the packet from the second extent must be modified in a way similar to that described previously.

Response Packet—Ingress

Figure 22:
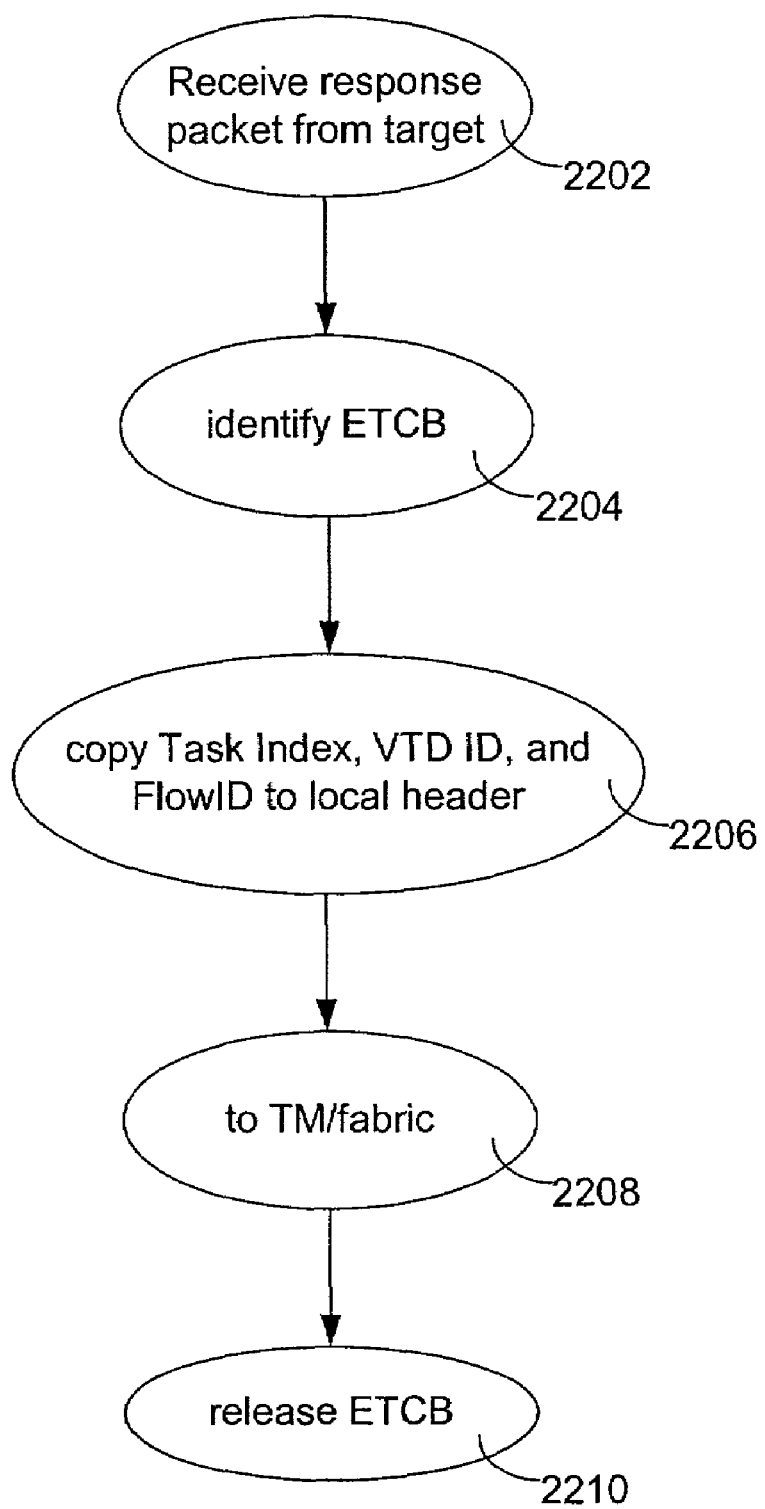
FIG. 22 is a flow diagram illustrating a virtualization process in the ingress direction for response packets or frames, in accordance with an embodiment of the invention.

Referring to FIGS. 22 and 22a, a response packet will be received from a target device, step 2202. The ETCB for the packet is then identified, step 2204, using the initiator_task tag or OX_ID of the packet. In some embodiments the initiator_task_tag or OX_ID will be the same as the Task Index. If the ETCB is not found, the packet is discarded. However, if the ETCB is found, then the Task Index is copied into the local header of the packet along with the VTD ID and the FlowID, step 2206. The packet is sent to the traffic manager and ultimately to the switch fabric, step 2208. Finally, because the response packet signals the completion of a task, the ETCB for the task is released, step 2210.

Response Packet—Egress

Figure 23:
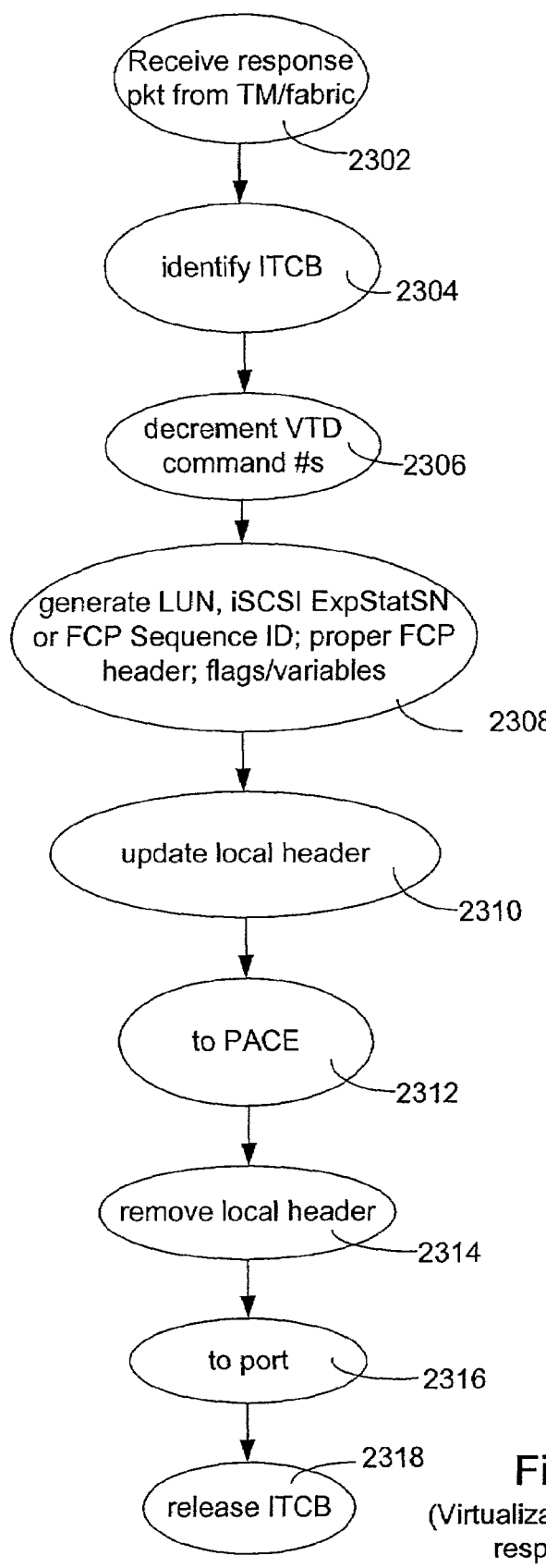
FIG. 23 is a flow diagram illustrating a virtualization process in the egress direction for response packets or frames, in accordance with an embodiment of the invention.

Referring to FIGS. 23 and 23a, after a response packet has been through the switch fabric, it will be received by an egress PPU, step 2302. The ITCB for the packet is identified, step 2304, using the Task Index from the local header. If the ITCB is not found, the packet is discarded. If the ITCB is found, the outstanding command count for the virtual target is decremented in the VTD, step 2306. The PPU generates the LUN, iSCSI ExpStatSN or FCP sequence ID from information in the ITCB and, if necessary, constructs or updates the proper FCP header, step 2308. The PPU also constructs other flags and variables for the PDU or FC frame header. The PPU updates the local header with the TCP Control Block Index or FCP S_ID (which becomes the D_ID) retrieved from the VTD, step 2310. The packet is forwarded to the PACE, step 2312, which removes the local header, step 2314, and forwards the packet to the appropriate port, step 2316. The PPU frees the ITCB, step 2318.

When a write command has been sent to more than one extent, a response packet is not sent to the initiator until completion of the write to all extents.

Note that for all FIGS. 9-23, although the steps are described to occur in a particular order, in other embodiments, the order of some of the steps may be changed and some may be performed simultaneously.

Task_Management_PDU, Abort Abort Sequence/Exchange—Ingress

An ABORT iSCSI function or Abort Sequence/Exchange terminates the command abnormally. The PPU finds the ITCB using the OX_ID or initiator_task_tag of the packet. If no ITCB is found, the command is assumed to have been completed or never received and a response will be generated indicating TASK-NOT-FOUND. If the ABORT is received from a target device, the PPU finds the ETCB and frees it. An ACK is returned to the target device, and the ABORT is passed to a linecard connecting to the initiator to terminate the command. If the ABORT is received from an initiator, the ABORT is passed to the linecard connecting to the target to terminate the command. The PPU frees the respective task control blocks, ITCB and ETCB.

Task_Management_PDU, Abort, Abort Sequence/Exchange—Egress

An ABORT from the ingress linecard indicates to the egress linecard to send an ABORT to the target device. When the completion response is returned from the target, the ETCB is freed. If the ETCB is not found, the ABORT is ignored.

Translation

As discussed previously, a storage switch in accordance with the invention can be coupled to devices that transmit data in accordance with any of a plurality of protocols. And as also discussed previously, in one embodiment, the protocols utilized by servers and storage devices are iSCSI and Fibre Channel. However, if a switch is coupled to a server that operates in accordance with one protocol and a storage device that operates in accordance with a second protocol, or vice versa, then the switch must perform protocol translation. Conventionally, to do such translation, the packet must be stored in memory and then operated on by a CPU before it can be forwarded out, if such a conventional system can perform protocol translation at all. In contrast, a storage switch in accordance with the invention can perform protocol translation without any buffering of the packets in the switch.

Both iSCSI PDUs and Fibre Channel IUs are designed to carry SCSI CDBs (command descriptor blocks) in their respective packet or frame. As such, these protocols have similar semantics, as recognized by the inventors of the present invention. Table 2 below illustrates a comparison between the protocols.

TABLE 2

| SCSI Phase | iSCSI Protocol | FC Protocol |
|---|---|---|
| Arbitrate and Select | Sending Ethernet packet | Sending fibre channel frame |
| Command | Command PDU | Command Frame |
| Disconnect | Receiving a packet | Receiving a frame |
| Reconnect for data transfer | R2T PDU | XFR_RDY frame |
| Data | Data PDU in TCP segments | Data sequences in frames |
| Status | Response PDU | Response frame |
| Abort and reset | iSCSI task management | Fibre channel ELS |
| Queue full status | MaxCmdSN window | Task set Full |
| No session login | iSCSI Login and logout | PLOGI and LOGO |

From the above table, it can be seen that there is a correlation between iSCSI Command PDU and FC Command Frame, an R2T PDU and XFR_RDY Frame, a Data PDU and Data Frame, and a Response PDU and Response Frame. Such correlations lend themselves to straightforward translation, which is performed in the PPU by mapping the fields from one packet to another and without buffering as will be described below. Abort-and-reset, session login- and-logout, and queue-full happen infrequently relative to the other packets and are passed to the CPU of the linecard for processing (except for the abort of a SCSI data movement (e.g., read/write) command which is performed by the PPU). Note that for SCSI Arbitrate-and-select and Disconnect, both iSCSI and FC simply send or receive a packet/frame.

Upon arrival of a packet to the PPU, as with virtualization, the PPU identifies the VTD associated with the packet by searching the CAM to determine if the incoming command belongs to a particular session (either iSCSI or FC) and a particular virtual target. The CAM search is conducted, as previously described, using the TCP Control Block Index and LUN (in the case of an iSCSI packet) or the S_ID and the LUN (in the case of an FC frame). However, in one embodiment of the invention, translation is performed at the egress PPU (the PPU that receives the packet after it has traveled through the switch fabric). The egress PPU also searches the CAM, but uses the VTD ID that is in the local header of the packet to find the PTD.

Note that although the CAM search is described for both the virtualization and translation functions, it is to be understood that it, as well as other steps described with respect to the various functions, need only be performed once by the PPU and that the steps performed with respect to all described functions (e.g., classification, virtualization, and translation) can be integrated in many respects.

As also previously discussed with respect to the virtualization function, while the VTD keeps track of variables for the virtual target and physical target, the PPU also keeps track of variables that are typically not shared between the protocols in their ITCBs and ETCBs (one of each per SCSI command). Such variables includes task tags, CmdSN, DataSN, and StatSN for iSCSI, and OX_ID, RX_ID, exchange sequence numbers, and sequence initiation flags for Fibre Channel. Once the PPU has the VTD (or PTD), as well as the respective ETCB or ITCB, then it has all of the information necessary to perform the translation. Translation from iSCSI to FC or vice versa generally entails taking the information from the field of the incoming packet (e.g,. iSCSI) and mapping the information to a corresponding field in the outgoing packet (e.g., FCP).

iSCSI Initiator to FC Target. Translation from an iSCSI initiator (server) to an FC target (storage device) will be described first. Translation of an iSCSI Command PDU to an FCP_CMND IU occurs in accordance with Table 3 below. Reference should also be made to FIGS. 8a-8i.

TABLE 3

| from iSCSI Command PDU | to FCP_CMND IU |
|---|---|
| LUN field of iSCSI PDU | FCP_LUN |
| ATTR (3 bits) | FCP_CNTL |
| CDB field | FCP_CDB |
| Expected data transfer length | FCP_DL |
| | OX_ID, SEQ_ID, SEQ_CNT |

According to the table above, the contents of LUN field of the iSCSI PDU are mapped to the FCP_LUN field of the FCP_CMND IU. The LUN for the Physical Target is obtained from the PTD. Only the 3 bits of the iSCSI Task Attribute field ATTR are mapped to the FCP_CNTL field. The contents of CDB field of the iSCSI PDU are mapped to the FCP_CDB field. The contents of the data transfer size field are mapped to the FCP_DL field. Since OX_ID is unique to the FCP frame header, it is filled in by the PPU, typically with the Task Index from the ETCB for easy identification of responsive packets from the target. Other fields in the FCP Frame Header can be easily generated with information from the PTD or VTD.

When the FC storage device responds, it will respond with an FC XFR_RDY frame, which must be translated back to the iSCSI R2T PDU:

TABLE 4

| from FCP XFR_RDY | to R2T iSCSI PDU |
|---|---|
| DATA_RO | Buffer_Offset |
| BURST_LEN | Data Transfer Length |
| | Initiator Task Tag and other fields |

As shown in Table 4, the Buffer Offset and Data Transfer Length fields can be mapped directly from the FCP XFR RDY frame. However, other fields such as StatSN, ExpCmdSN, MaxCmdSN, and R2TSN must be taken from the ITCB. In addition variables like task tags unique to the iSCSI R2T PDU are also placed in the packet by the PPU, usually using fields from the PTD or VTD.

After receiving an R2T, the iSCSI initiator will send a Write Data PDU, which must be translated to an FCP Data IU:

TABLE 5

| from iSCSI Write Data PDU | FCP DATA IU |
|---|---|
| Buffer_Offset | RLTV_OFF |
| payload | payload |
| | OX_ID, SEQ_CNT |

As shown in Table 5, the RLTV_OFF field for the FCP data IU will be mapped from the Buffer_Offset field of the iSCSI PDU. The payload for each packet/frame is identical. In addition, variables unique to the FCP frame are added, such as OX_ID and SEQ_CNT, taken from the ETCB.

When the iSCSI command sent initially from the iSCSI initiator is a read data command, the FC target will respond with an FCP_DATA IU, which needs to be translated to an iSCSI Read Data PDU:

TABLE 6

| from FCP DATA IU | to iSCSI Read Data PDU |
|---|---|
| RLTV_OFF | Buffer_Offset |
| Data Payload | Data Payload |
|  | Initiator Task Tag, Residual Count |

As shown in Table 6, the Buffer_offset field for the iSCSI PDU will be mapped from the RLTV_OFF field of the FCP IU. All other fields are taken from the ITCB as well as variables unique to the PDU such as task tags.

Once the task is complete (e.g., reading or writing of data is finished), then the FCP target sends a response packet (FCP_RSP IU) that must be translated into an iSCSI format:

TABLE 7

| from FCP RESPONSE IU | to iSCSI Response PDU |
|---|---|
| FCP_STATUS | Flags and status fields |
| FCP_SNS_LEN | DataSegmentLength |
| FCP_RESID | BasicResidualCount |
| FCP_SNS_INFO | Sense Data |
| FCP_RSP_INFO | error codes |
|  | Initiator Task Tag, MaxCmdSN, ExpCmdSN |

As shown in Table 7, the Status field of the FC IU is mapped to the flag and status fields of the iSCSI PDU. FCP_SNS_LEN, FCP_RESID, and FCP_SNS_INFO are mapped to DataSegmentLength, BasicResidualCount and Sense Data, respectively. The FCP_RSP_INFO field is for transport errors that must be mapped to the iSCSI error codes. Finally, variables like the Task Tag or ExpCmdSn, StatSN, MaxCmdSN, ExpDataSN, and ExpR2TSN that are unique to the iSCSI Status PDU are added from the ITCB or VTD.

When there are flags in the FCP_CNTL for task management like Abort Task Set, a separate iSCSI task management command will be sent to the iSCSI initiator devices. Similarly, if an iSCSI task management PDU is received, an NOP FC command with proper flags in the FCP_CNTL will be sent to the target device.

Note that not all fields that are unique to either the iSCSI PDU or FCP frame are listed in the above-described tables. Reference can be made to FIGS. 8a-8i for a complete listing of fields. It is to be understood that for any unlisted fields the information can be obtained from the relevant task control block, the VTD, the PTD, or can be easily generated (e.g., the FCP Type field is always 0x08).

FC Initiator to iSCSI Target. The FCP to iSCSI translation is the reverse of the iSCSI to FCP translation. Again, the translation is performed at the egress PPU. The FCP initiator will first send an FCP command, which must be translated for the iSCSI target:

TABLE 8

| from FCP Command IU | to iSCSI Command PDU |
|---|---|
| FCP_LUN | LUN |
| FCP_CNTL | ATTR |
| FCP_CDB | CDB |
| FCP_DL | Expected Data Transfer Length |
|  | CmdSN, task tag, ExpStatSN |

As shown in Table 8, the LUN, CNTL, CDB, and DL fields of the FC IU map into the LUN, ATTR, CDB, and Data Transfer Size fields of the iSCSI PDU. In addition, variables that are unique to the iSCSI PDU are created by the PPU such as CmdSN and a task tag, both of which can be obtained from the ETCB. Note that the DataSegmentLength field will be zero as there will be no immediate data for FCP frames.

After the iSCSI target has received the command (and the command is a write command), the target will respond with an R2T PDU, which must be translated into an FCP XFR_RDY IU:

TABLE 9

| from iSCSI R2T PDU | to FCP XFR_RDY IU |
|---|---|
| Buffer Offset | DATA_RO |
| Data Transfer Length | BURST_LEN |
|  | RX_ID, SEQ_ID |

As shown in Table 9, the Buffer Offset and Data Transfer Length fields of the iSCSI PDU map into the DATA_RO and BURST_LEN fields of the XFR_RDY IU. In addition, the PPU also adds variables unique to the FCP IU such as RX_ID and SEQ_ID, available in the ITCB.

After the FC initiator receives the XFR_RDY IU, it will send write data, which needs to be translated into an iSCSI format:

TABLE 10

| from FCP Data IU | to iSCSI Write data PDU |
|---|---|
| RLTV_OFF | Buffer_offset |
| payload | payload |
|  | Data SN, ExpCmdSN, target task tag |

As shown, for write data, the RLTV_OFF of the FCP IU maps into the Buffer_offset field of the iSCSI PDU, while the payload for each is the same. In addition, other fields are taken from the ETCB, including variables like DataSN, which is unique to the iSCSI Data PDU.

If the original initiator command was a read command, then the iSCSI target will respond with read data that must be placed in FCP format:

TABLE 11

| from iSCSI Read Data PDU | to FCP DATA IU |
|---|---|
| Buffer_Offset | RLTV_OFF |
| payload | payload |
|  | RX_ID, SEQ_ID |

As shown in Table 11, the Buffer_offset field maps into the RLTV_OFF field of the FCP IU, and the payload for both is the same. In addition, the PPU must add variables that are unique to the FCP IU such as RX_ID and SEQ_ID, which can be found in the ITCB.

Finally, once the task is complete, the iSCSI target will send a Response PDU, which must be translated to the FCP RSP IU:

TABLE 12

| from iSCSI Response PDU | to FCP RSP IU |
|---|---|
| Flags and status | FCP_STATUS |
| DataSegmentLength | FCP_SNS_LEN |

TABLE 12-continued

| from iSCSI Response PDU | to FCP RSP IU |
|---|---|
| BasicResidualCount | FCP_RESID |
| Sense data | FCP_SNS_INFO |
| transport errors | FCP_RSP_INFO |
| | OX_ID, SEQ_ID |

As shown in Table 12, the flags and status fields of the iSCSI PDU map to the STATUS field of the FCP IU. The iSCSI fields DataSegmentLength, BasicResidualCount, and Sense Data all map to FCP_SNS_LEN, FCP_RESID, and FCP_SNS_INFO, respectively, of the FCP IU. Transport errors are mapped to the FCP_RSP_INFO field of the FCP IU. In addition, variables that are unique to the FCP IU, such as OX_ID and SEQID are added by the PPU.

If an iSCSI task management packet such as Abort Task Set is received, it will be sent to the FC device using an NOP command with the task management flags in the FCP_CNTL field.

Note that not all fields that are unique to either the iSCSI PDU or FCP frame are listed in the above-described tables. Reference can be made to FIGS. 8a-8i for a complete listing of fields. It is to be understood that for any unlisted fields the information can be obtained from the relevant task control block, the VTD, the PTD, or can be easily generated (e.g., the FCP Type field is always 0x08).

Storage Services

A switch in accordance with an embodiment of the invention can provide switch-based storage services at wire speed, again by distributing tasks on multiple linecards, thereby maximizing throughput. Storage services that are provided in one embodiment of the invention include local mirroring, mirroring over slow link, snapshot, virtual target cloning (replication), third party copy, periodic snapshot and backup, and restore. Each of these services will be described in further detail below. Other embodiments may provide more or fewer services.

Figure 24:
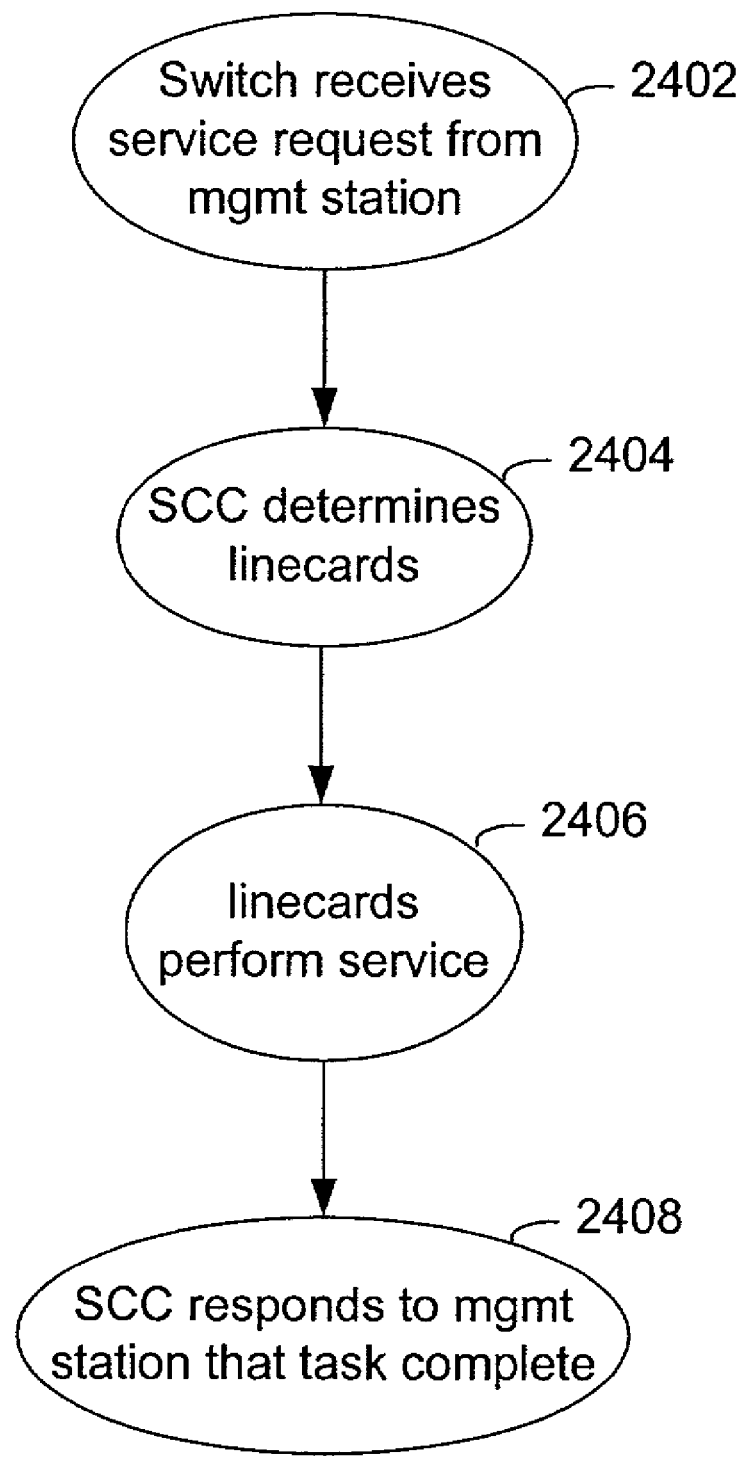
FIG. 24 is a flow diagram illustrating the general steps taken to perform storage services in accordance with an embodiment of the invention.

Before discussing specific services, referring to FIG. 24, in general, storage services are initially activated by a management station (or other device) over an ethernet connection to the storage switch, step 2402. Such ethernet communication occurs in one embodiment with the SCC 610 (FIG. 6). The SCC through its database, determines the linecards for the service and passes all relevant information to perform the service to those linecards, including VTD and LUN information, step 2404. All information is passed from the SCC to the linecards using intercard communication over the ethernet connection that the SCC has with each linecard. The linecards then perform the actual service requested, step 2406. When the task is completed, the SCC will initiate a response to be returned to the management station, step 2408, indicating that the service is complete. Hence, unlike conventional systems, the management station need not be involved in the service at all except to initiate a request for the service.

Local Mirroring

When a virtual target is mirrored, i.e., an identical copy of the data is stored in two separate physical locations, often referred to as "members" of the mirrored virtual target. The FlowID in the VTD indicates that the packet is to be multicast to multiple egress ports. In a mirrored virtual target, when a write command crosses an extent boundary, the PPU will duplicate the packet for each extent for each member of the mirrored target. The PPU also provides proper FlowIDs to the traffic manager, which in turn sends each command it receives to multiple egress ports. When reading from a mirrored virtual target, the PPU selects the one member of the mirrored target that has the smallest average response time. The FlowID of that member directs the read command to the selected egress port. The response time is available in the VTD.

In the event that the R2T or XFR_RDY is received from one of the members of a mirrored target after sending a write command, then the PPU waits until every member and/or extent has returned the R2T or XFR_RDY. Once all members have responded, then the PPU will prepare to send the initiator the R2T or XFR_RDY that specifies the smallest block available to receive data: when the data is returned, it will be multicast to all mirrored members, but a member cannot receive more data then it has requested. Thus, the PPU must also track in the ITCB the amount of requested data specified in the R2T or XFR_RDY for each extent. Once the smallest amount of data is received (from the initiator) and multicast to each member of the mirrored target, then the PPU waits for the extent that asked for the smallest amount of data to send another R2T or XFR_RDY. In the event that two (or more) targets asked for the smallest amount of data (i.e., they both asked for the same amount), then the PPU waits until both (or all) targets that asked for the smallest amount to send another R2T or XFR_RDY. Then the PPU returns another R2T or XFR_RDY of the smallest remaining amount of all the extents. The process continues until all of the extents have all the required data. An example is shown in Table 13 below:

TABLE 13

| | Extent 1 | Extent 2 | To initiator |
|---|---|---|---|
| Total Data to be written | 4k | 4k | |
| Size specified in first R2T or XFR_RDY | 2k | 3k | |
| PPU requests from initiator | | | 2k |
| Unsatisfied R2T or XFR_RDY (after 2k written) | 0k | 1k | |
| Size specified in second R2T or XFR_RDY | 2k | | |
| PPU requests from initiator | | | 1k |
| Unsatisfied R2T or XFR_RDY (after 1k written) | 1k | 0k | |
| Size specified in third R2T or XFR_RDY | | 1k | |
| PPU requests from initiator | | | 1k |
| Unsatisfied R2T or XFR_RDY (after 1k written) | 0k | 0k | |

Remote Mirroring Over Slow Link

As previously discussed, mirroring occurs when two identical sets of data are each respectively stored in separate physical locations. Most conventional systems only support local mirroring—that is, mirroring in devices that are both on the same SAN. However, an embodiment of the invention supports mirroring over slow link—for instance, when one copy of data is on one SAN and a second copy is stored at a remote location from the SAN, e.g., on a second SAN. For instance, referring to FIG. 4, a local copy of the data may be in SAN 402 while a remote mirrored copy may be in SAN 404. Thus, remote mirroring is made possible in a switch in accordance with an embodiment of the invention that enables exporting (or importing) of data to a target through a WAN such as the Internet.

One significant distinction between mirroring over slow link and local mirroring, however, is the latency inherent in communicating with the remote target. For instance, the average latency when communicating over a WAN with a remote target is 8 μs per mile. Thus, if a remote target is halfway around the globe, the latency is 100 ms (200 ms round trip), which will be significantly slower than when communicating with a local target.

In one embodiment, in mirroring two (or more) local virtual targets, as previously described after a write command is sent, a switch in accordance with the invention will wait to receive an R2T or XFR_RDY from all targets before requesting write data from the initiator (e.g., the server). Then the write data is multicast to all targets. For mirroring over slow link, however, to avoid a long network latency, the switch does not wait to receive an R2T or XFR_RDY from the remote target. Instead, when the switch receives an R2T or XFR_RDY from the local target, it immediately requests the write data from the initiator and writes to the local target. When the linecard connecting to the remote device receives the R2T or XFR_RDY from the remote target, it reads the data from the local target and then writes it to the remote target.

Figure 25:
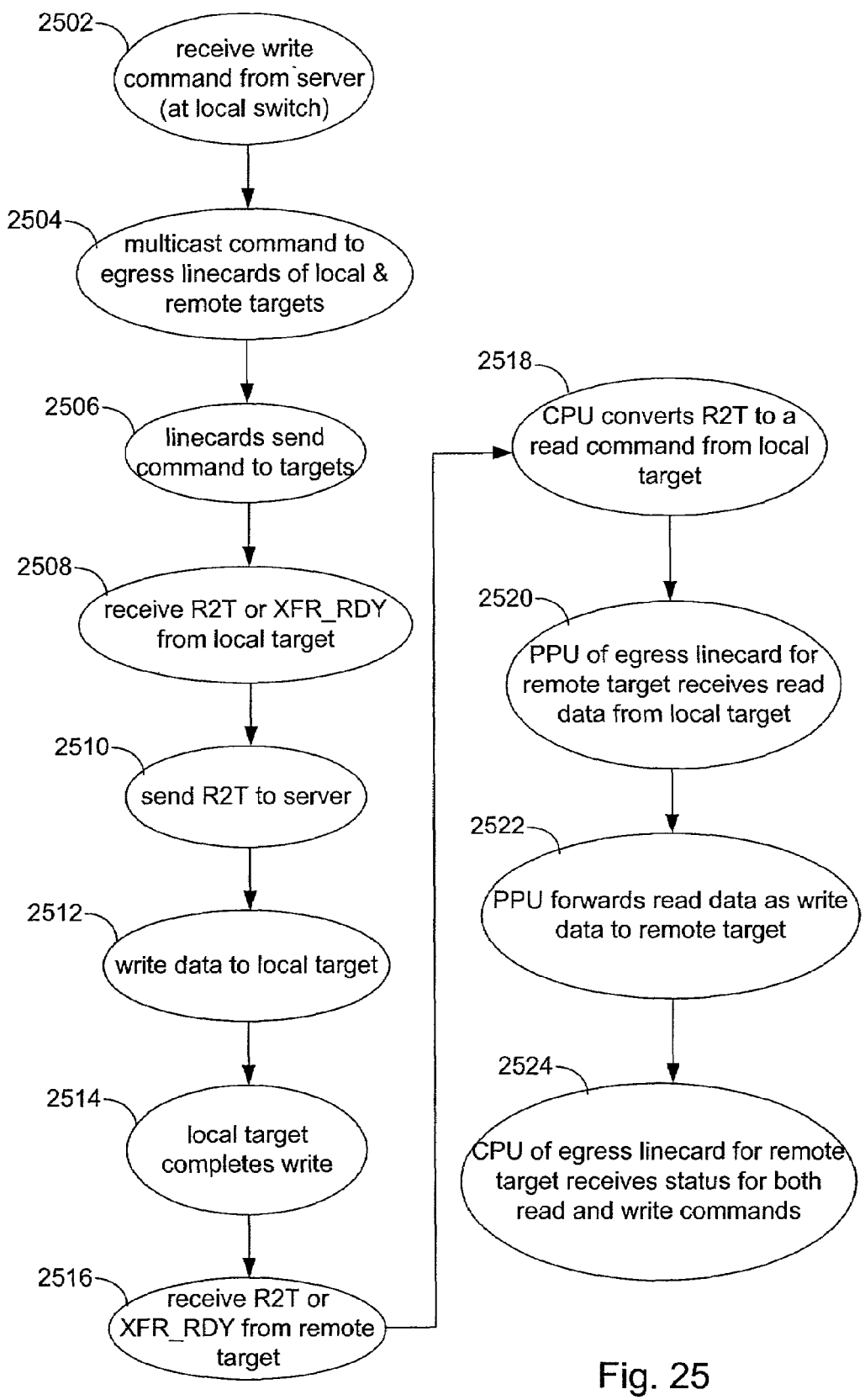
FIG. 25 is a flow diagram illustrating the steps taken for the storage service of mirroring over a slow link in accordance with an embodiment of the invention.

More specifically, referring to FIG. 25, a switch will receive a write command from a server, step 2502. As with local mirroring, the ingress PPU will multicast the command to the egress linecards for both the local and remote target, step 2504. However, the FlowID of the command destined for the remote target is a special FlowID so that the packet will be directed to the egress linecard CPU, instead of being handled directly by the PPU as would be done in other circumstances. Still, the packet destined for the local target is handled by the PPU. The command is then sent to each of the targets, local and remote, by the respective egress linecards, step 2506.

Due to network latency, an R2T or XFR_RDY will be received by the switch from the local target first, step 2508. The R2T or XFR_RDY is then passed back to the initiator (server), step 2510. The initiator will then send its write data to the switch, and the data are then passed to the local target for writing, step 2512. When the write is finished at the local target, the local target will send a response packet indicating that the task is complete, step 2514.

Eventually, an R2T or XFR_RDY is received from the remote target by the linecard, step 2516. Note that because the CPU for the linecard connecting to the remote target sent the write command, the remote R2T or XFR_RDY is received also by the linecard CPU, which manages the commands to the remote target. The linecard CPU for the remote target converts the received R2T or XFR_RDY to a read command to the local target, step 2518, to read the data previously written. The read data received from the local target is received by the PPU of the linecard for the remote target, step 2520. The PPU then forwards the read data as write data to the remote target, step 2522. When the write is complete, the remote target will send a Response packet so indicating, which packet is received by the linecard CPU for the remote target, step 2524. The linecard CPU receives the status for both the read and write commands.

If an R2T or XFR_RDY of the remote target is received before the local write is complete, the remote linecard waits until the local write is complete before proceeding to read the data from the local target, in one embodiment.

In the event there is an error from either the read or the write, the linecard CPU reports the error to the SCC. In the event of an error, the remote target will be out-of-sync with the local one and the linecard.

Thus, for the local target, the write commands are executed on the PPU of the linecard of the local target. But for the remote target, the write commands are managed by the CPU of the linecard for the remote target except that the PPU of that linecard forwards the read data as write data.

Snapshot

"Snapshot" is generally mirroring a virtual target up until a particular point in time, and then breaking away the mirrored member, thereby freezing the mirrored data in the mirrored member at the time of the break away. In other words, a seeming "snapshot" of the data at a particular time is kept. Once a snapshot is taken, a user can access the removed member (as another virtual target) to retrieve old information at any time without requiring a restore. Hence, by using "snapshot," some users of a switch in accordance with the invention will avoid the need to perform traditional backups and restores. Moreover, by using a switch in accordance with the invention, snapshots can be made quickly, taking only a few milliseconds, compared to traditional backup which may require a backup window of hours to copy a virtual target to tape media (and usually also preventing access to the data being copied). Snapshot of a virtual target can also take place at regular intervals. Further, each snapshot can be a different member of the mirrored virtual target, allowing for the availability of multiple snapshots (e.g., a snapshot from Tuesday, one from Wednesday, etc.).

Figure 26:
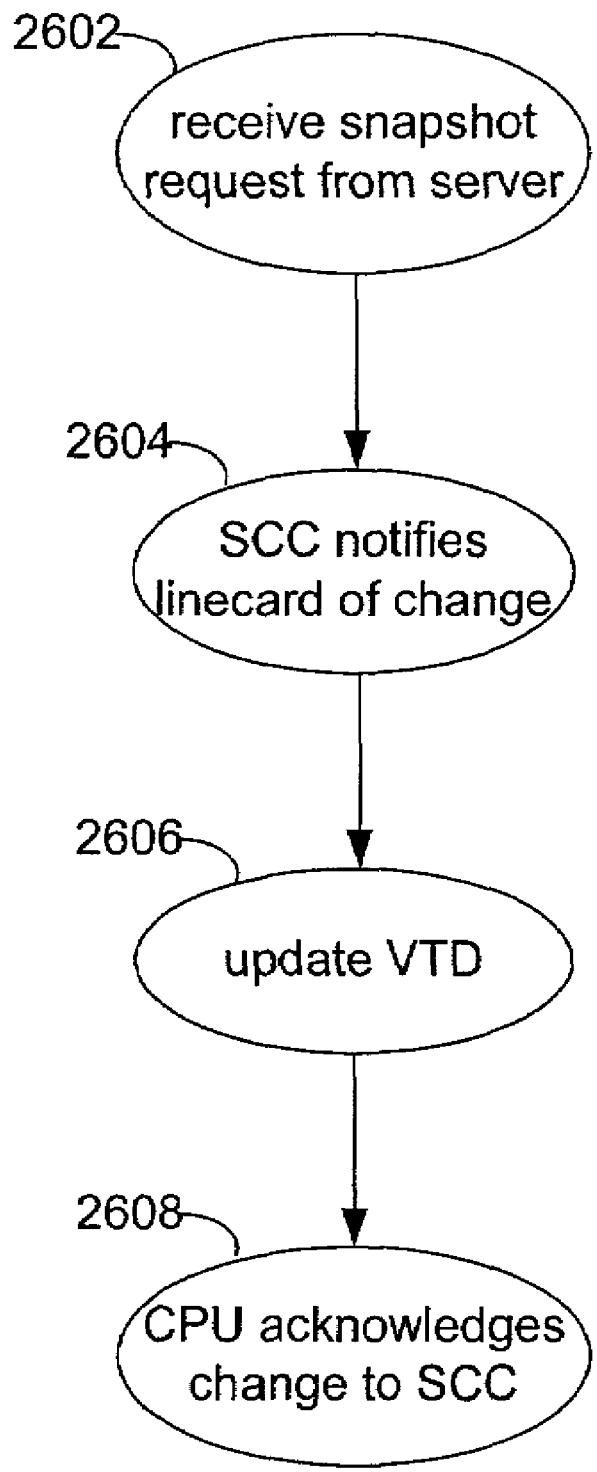
FIG. 26 is a flow diagram illustrating the steps taken for the storage service of snapshot in accordance with an embodiment of the invention.

Specifically, referring to FIG. 26, to perform snapshot services in accordance with one embodiment of the invention, a snapshot request is received from a management station by the switch, step 2602. The SCC informs the ingress linecard CPU (the linecard that connects to the server) of the change to remove a mirrored member, step 2604. The SCC also updates the virtual target object in the SCC database. The linecard CPU updates the FlowID stored in the VTD (in the PPU SRAM) for the virtual target so that it no longer reflects the removed member, step 2606. With this change, the incoming writes are no longer multicast to the removed member. Once the VTD is updated, the CPU acknowledges the change to the SCC, which in turn sends a response back to the management station to indicate that the snapshot is complete, step 2608.

In addition, prior to beginning any snapshot, there should be no outstanding requests to the virtual target. Thus, when a snapshot takes place, the server must be notified to quiesce all outstanding requests to the virtual target, in one embodiment. The server activity resumes after the snapshot.

Virtual Target Cloning (Replication)

A switch in accordance with the invention can support the addition of a new member to a mirrored virtual target, referred to herein as cloning (or replication), and can do so without taking the virtual target offline. In general, a new member is added by changing the Virtual Target Object in the SCC database, and the content of the mirrored target is replicated onto the new member while normal access is still active to the virtual target. Depending on the size of the virtual target, the replication will take some time to complete. Nonetheless, the replication is controlled by the switch, is transparent to the user, and does not generally interfere with access to the virtual target by a server.

Figure 27:
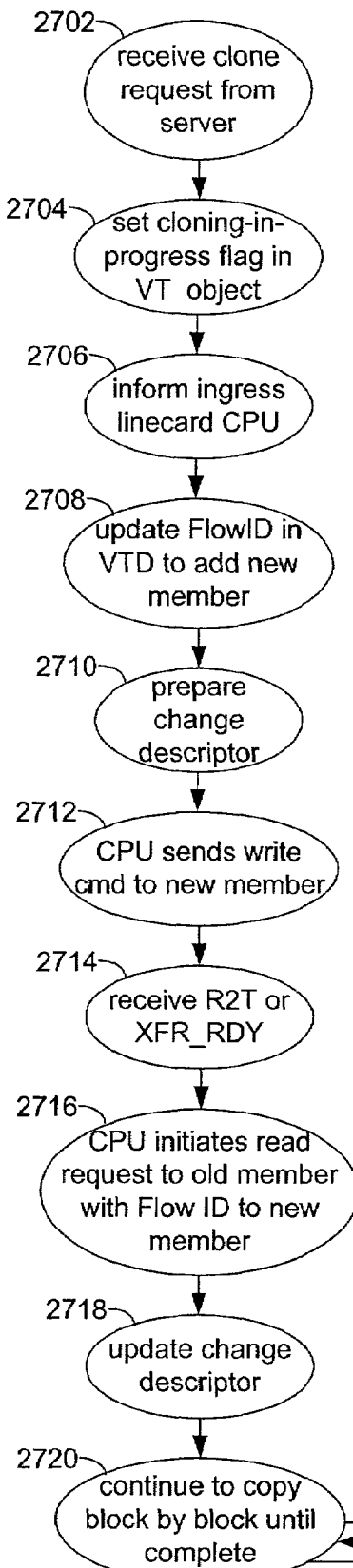
FIG. 27 is a flow diagram illustrating the steps taken for the storage service of cloning in accordance with an embodiment of the invention.
Figure 27:
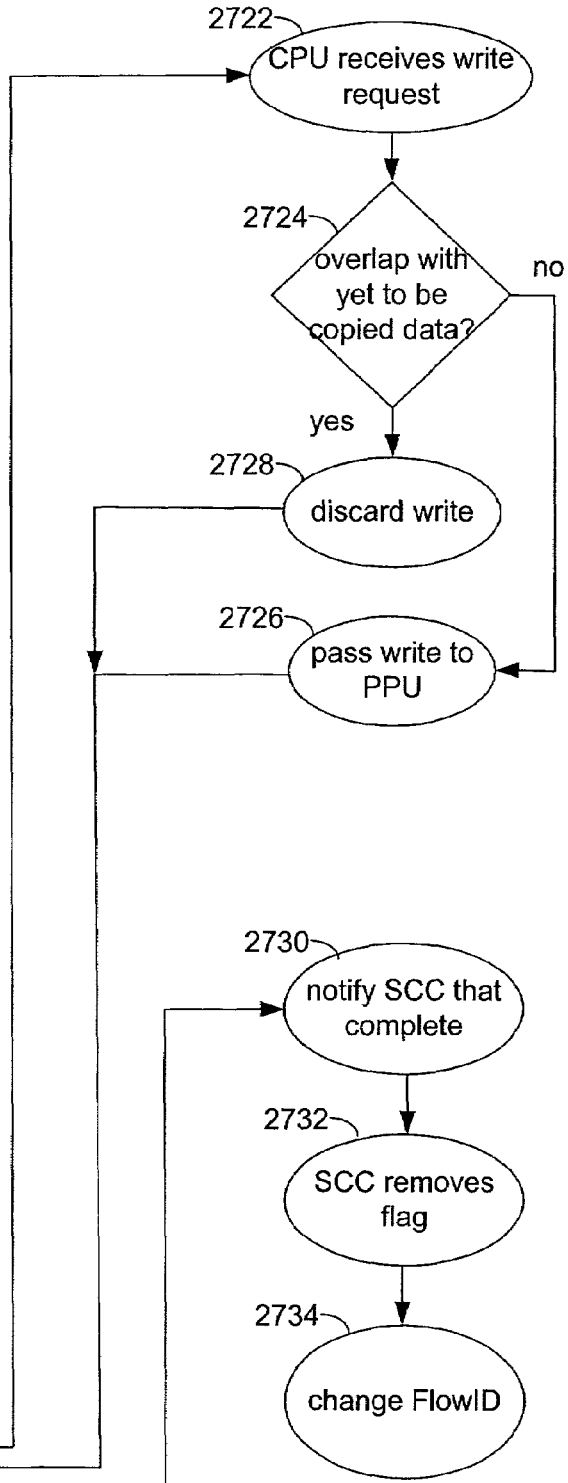

More specifically, referring to FIG. 27, a replicate request is received by the SCC, step 2702. The SCC sets a cloning-in-progress flag in the Virtual Target Object, step 2704, and informs the CPU of the linecard that connects to the server of the change, step 2706. The linecard CPU updates the VTD in the PPU SRAM to change the FlowID of the virtual target to add the new member, step 2708. With the FlowID changed, incoming writes are now multicast. Nonetheless, although incoming writes are multicast, the FlowID is set to direct writes to the egress linecard CPU for the new member so that the CPU handles the writes instead of the PPU. The egress linecard CPU will temporarily manage the traffic to the new member until replication is complete as described further below.

The CPU of the linecard connecting to the new member prepares a change descriptor specifying the contents of the virtual target to be copied to the new member, step 2710. The descriptor sets forth an offset and block count: (offset, block count). For example, to copy a 10 GB target, the change descriptor is (0, 20,000,000)—note that in one embodiment each block is 512 bytes and a 10 GB target has 20 million blocks.

Using the change descriptor, the linecard CPU manages the copy function a few blocks at a time. First, the linecard CPU sends a write command to the new member, step 2712. When an R2T or XFR_RDY is returned, step 2714, the linecard CPU initiates a read request to the old member, but specifies a FlowID directing the read data to the linecard CPU of the new member, step 2716. Any read or write error aborts the copy and is reported to the SCC.

After copying a set of blocks the change descriptor is updated, step 2718. For example, after copying 50 blocks, the change descriptor for the above example becomes (50, 19,999,950), since the first 50 blocks are now in sync. The process of copying a set of blocks continues until all of the blocks have been copied, step 2720.

In the event that a virtual target is comprised of multiple extents, if each extent is coupled to the switch through distinct linecards, then the replication process for both extents can be run concurrently. But, if both extents are coupled to the switch through the same linecard, then the replication process must be run sequentially, i.e., the second extent cannot be replicated until the completion of replication for the first extent.

In the meantime, during the replicate process, write requests to the virtual target may be received from a server and must be written to the all mirrored members, including the member that is still in the process of receiving all of the data of the virtual target. In such an instance, when the write request is multicast, it is received by the CPU of the linecard for the new member, step 2722, rather than being processed by the PPU on the respective linecards, as it will be for the old members of the mirrored target. The linecard CPU determines if the write is to any block that has not yet been copied by checking the write location against the offset of the change descriptor, step 2724. If the write is to data blocks that have been already copied, the write command is simply passed to the PPU, step 2726. However, if the write is to data blocks that have not yet been copied, then the write to the new member is discarded, step 2728, and a response to the initiator that the task is complete is sent. Nonetheless, the new data will eventually be copied into the new member from the old member during the continuing replication process. The process continues to perform the replication until completed, step 2720.

In the alternative, if during the replicate process a write request to the virtual target is received, then changes made to the virtual target can be tracked by the linecard CPU. When replication is complete, then those changed and tracked portions can be updated.

When the replication process is complete, the linecard CPU notifies the SCC, step 2730. The SCC updates the Virtual Target Object to remove the cloning-in-progress flag, step 2732. On the ingress linecard connecting to the initiator, the FlowID is updated, step 2734, so that write commands follow their normal progression to the PPU rather than being directed to the linecard CPU of the new member.

Third Party Copy

A third party function copies an offline virtual target (one that is not being accessed) to or from an archiving device such as a writable CD or tape drive. The copy is termed a "third party copy" because the server is not involved until the copy is complete—rather the copy is executed by the switch. In many embodiments, such a third party copy will be made from a snapshot of a virtual target previously taken. In most conventional systems, to perform such a copy the target device must be a "smart" device, e.g., a smart tape device, meaning that such a device is generally actively involved in and at least partially controls the copy process. In contrast, the third party copy service of the present system does not rely on any intelligence outside of the storage switch itself.

Figure 28:
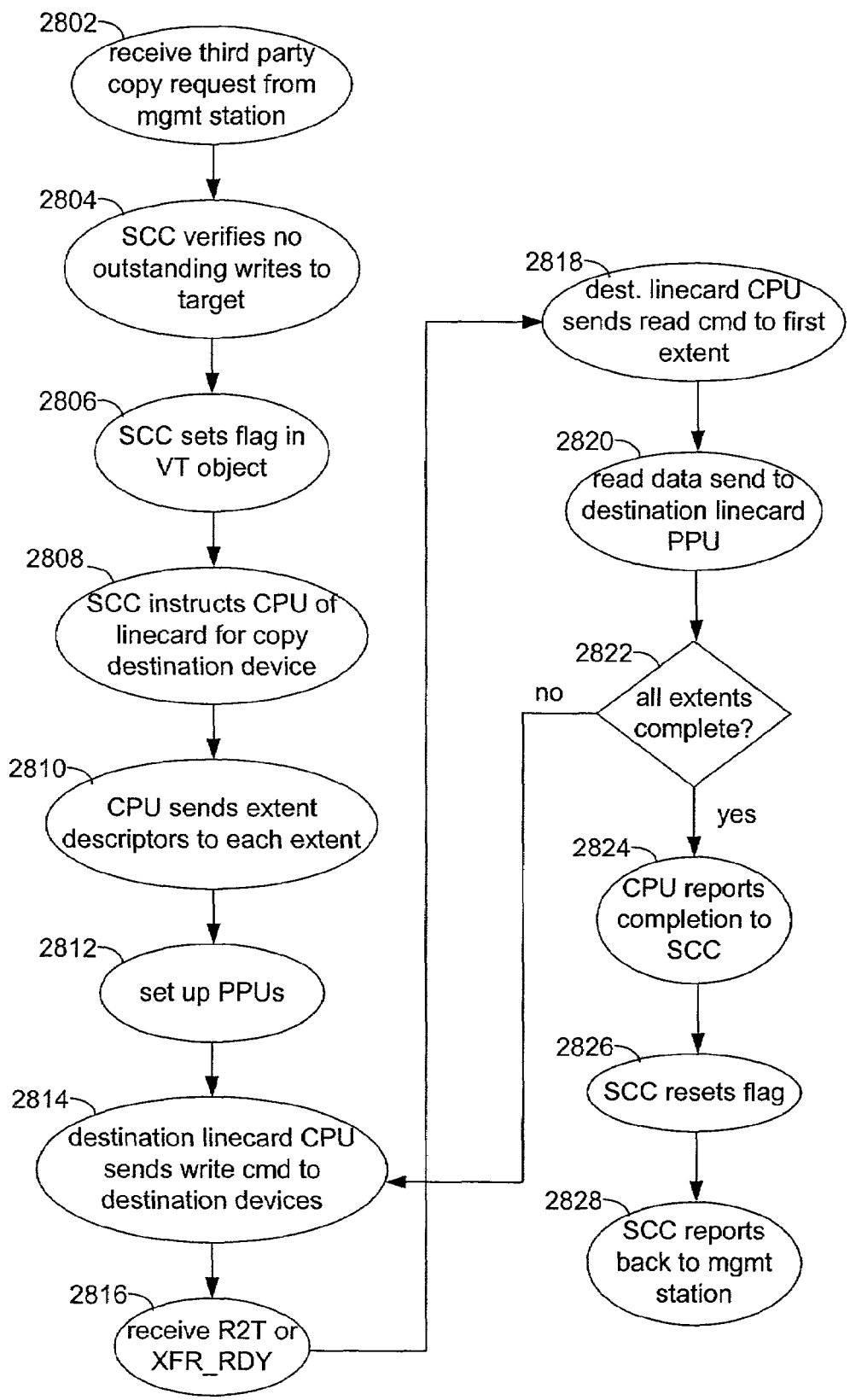
FIG. 28 is a flow diagram illustrating the steps taken for the storage service of third party copy in accordance with an embodiment of the invention.

Referring to FIG. 28, the switch will receive a copy request from a management station, step 2802. The SCC ensures that there are no outstanding connections for writing to the virtual target, step 2804. During the copy, the virtual target is available for read only in one embodiment. The SCC then sets a copy-in-progress flag in the Virtual Target Object in the SCC database, step 2806, to ensure no other connections to the target for writing. The SCC next instructs the CPU for the linecard connected to the copy-destination device to execute the copy, step 2808.

Each virtual target may be comprised of several extents, each of which may be on a distinct physical device. Thus, the CPU for the destination linecard must obtain data from each extent. To do so, the CPU for the destination linecard sends each linecard for each extent an extent descriptor, step 2810. The extent descriptor specifies the extent as well as the destination linecard (for the destination copy). The CPUs of each of the linecards for the respective extents then set up their respective PPUs (e.g., the VTDs and CAMs) to enable the PPUs to process the read requests, step 2812.

After getting the extent linecards set up, the destination linecard CPU then sends a write command to the destination device, step 2814. When an R2T or XFR_RDY is received by the destination linecard from the destination device, step 2816, the destination linecard sends a read command to one of the extents via the respective extent linecard, step 2818. The Read data is sent directly to the destination linecard and processed by the destination linecard PPU as write data, step 2820, which is written to the destination device. The process is repeated until the entire extent is copied. Any error condition terminates the copy. Then if less then all of the extents have been copied, step 2822, then the process returns to step 2814, where it is performed for the next extent. If all the extents have been copied, step 2822, then the CPU for the destination linecard reports the completion of the copy to the SCC, step 2824. On an erroneous completion, the SCC terminates the copy. But if the copy is complete without error, then the SCC resets the copy-in-progress flag on the Virtual Target Object in the SCC database, step 2826, and reports back to the management station the completion status, step 2828. The source virtual target is now available for writing again.

Periodic Snapshot & Backup

A switch in accordance with an embodiment of the invention can provide periodic snapshot and backups of a virtual target. Such a backup function generally comprises three steps:
1. Snapshot the virtual target,
2. Third party copy the virtual target from the snapshot, and
3. Rejoin the member carrying the snapshot to the virtual target as a mirrored member, and bring current all mirrored data on the member.

The third step can be performed by replication (previously described) or by otherwise tracking updated data for the virtual target from the time the snapshot is taken until the member is rejoined. For instance, a record of all changes made to the virtual target can be kept and then the mirrored member is simply updated with those changes upon rejoining the virtual target as a mirrored member.

If a user has plenty of storage space, the second and third steps may not be necessary as each snapshot virtual target will be accessible to a user. Thus, it is only a matter of allocating the snapshot targets and naming them. For example, if the virtual target is to be backed up every workday for the current week, monthly for the last six months, and thereafter, quarterly up to one year, then only a finite set of snapshot targets need to be allocated that might be named as follows:

iqn.com.marantinetworks.company.server.master
 iqn.com.marantinetworks.company.
  server.backup.monday
 iqn.com.marantinetworks.company.
  server.backup.tuesday
 iqn.com.marantinetworks.company.
  server.backup.wednesday
 iqn.com.marantinetworks.company.
  server.backup.thursday
 iqn.com.marantinetworks.company.server.backup.friday
 iqn.com.marantinetworks.company.
  server.backup.february
 iqn.com.marantinetworks.company.server.backup.march
 iqn.com.marantinetworks.company.server.backup.april
 iqn.com.marantinetworks.company.server.backup.may
 iqn.com.marantinetworks.company.server.backup.june
 iqn.com.marantinetworks.company.server.backup.july
 iqn.com.marantinetworks.company.server.backup.2000q3
 iqn.com.marantinetworks.company.server.backup.2000q4
 iqn.com.marantinetworks.company.server.backup.2001q1
 iqn.com.marantinetworks.company.server.backup.2001q2.

The switch allocates the snapshot targets and schedules the periodic activities according to a known policy. The switch also manages the naming and renaming of the targets. For instance, for the backup.2001q3, the switch will reuse the target for the backup.2000q3 and rename it for the backup.2001.q3.

Restore

For various reasons, many industries need to keep backup copies of data on archiving media (e.g., typically removable or portable media such as tapes or CDs). The switch can use the third party copy function to move a backup or snapshot target to an archiving media. The switch tracks the archiving media on its database. Each time a copy to the archiving media is performed, the SCC fetches the virtual target object to determine all destination extents and a record is entered into a database at the management station to track the media. Using a management station, a user can view a list of archiving media, e.g., a set of tapes or CDs, and select one for restoring.

The restore operation itself is another third party copy function to be scheduled by the switch. The operation, however, involves user intervention, as someone must place the media into a tape or CD drive. Nonetheless, as with other storage services described herein, the CPU of the source target device controls the work for the Restore operation while multiple destination SPU's are involved one at a time.

A switch in accordance with one embodiment of the invention supports three different priorities of restoring: urgent, important, and normal. An urgent restore is started immediately regardless of the current traffic situation on the system. An important restore is not started when there is congestion in the system, but is started within a few hours. A normal restore is completed within 24 hours depending on the traffic congestion of the system.

CONCLUSION

Thus in accordance with an embodiment of the invention, a storage switch has been disclosed that provides wire-speed processing of data packets, including classifying the packets, performing virtualization functions on the packets, and performing any necessary protocol translation of the packets. Compared to conventional practices, the architecture disclosed allows the required time to process a packet to be minimal. Such wire-speed processing is in part accomplished by distributing the intelligence of the switch to all of the linecards and generally avoiding the need for buffering. Such distributed intelligence allows a system that not only has a high bandwidth but is also easily scalable. Further, such a switch, using its linecards can also perform serverless storage services, that is, services where no entity outside of the switch need be involved in the control of performance of such services.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method for use in a system for storing and accessing data, the method comprising:
    (a) receiving a first packet formatted in accordance with a first protocol from a first device that operates in accordance with the first protocol;
    (b) translating the first packet to a second packet formatted in accordance with a second protocol, wherein said translating includes mapping at least some of the fields of the first packet formatted in accordance with the first protocol into the second packet formatted in accordance with the second protocol;
    (c) forwarding the second packet to a second device that operates in accordance with the second protocol; and
wherein said translating occurs without buffering the packet.

2. The method of claim 1, wherein said translating occurs at wire speed.

3. The method of claim 1, wherein translating further includes adding information into any fields of the second packet formatted in accordance with the second protocol that are not mapped from the first packet formatted in accordance with the first protocol.

4. The method of claim 1, wherein the first protocol is iSCSI and the second protocol is Fibre Channel.

5. The method of claim 4, wherein the first protocol is iSCSI embedded in TCP.

6. The method of claim 1, wherein the first protocol is Fibre Channel and the second protocol is iSCSI.

7. The method of claim 6, wherein the second protocol is iSCSI embedded in TCP.

8. The method of claim 1, wherein the first device is an initiator and the second device is a target.

9. The method of claim 1, wherein the first device is a target and the second device is an initiator.

10. A method for use in a system for storing and accessing data, the method comprising:
    receiving a packet formatted in accordance with a first recognized protocol; and
    mapping the fields of the packet to a new packet formatted in accordance with a second protocol without buffering the packet.

11. The method of claim 10, wherein the steps of receiving and mapping are performed at wire speed.

12. The method of claim 10, wherein mapping includes mapping by a processor the fields of the packet to a new packet formatted in accordance with a second protocol without buffering.

13. The method of claim 10, wherein the first protocol is iSCSI and the second protocol is Fibre Channel.

14. The method of claim 13, wherein the first protocol is iSCSI embedded in TCP.

15. The method of claim 10, wherein the first protocol is Fibre Channel and the second protocol is iSCSI.

16. The method of claim 15, wherein the second protocol is iSCSI embedded in TCP.

17. The method of claim 10, wherein the packet contains a SCSI command descriptor block (CDB).

18. A method for use in a system for storing and accessing data, the method comprising:
   receiving a packet from a first device, the packet formatted in accordance with one of the iSCSI or Fibre Channel protocols;
   if the packet is formatted in accordance with the iSCSI protocol, translating the packet into a Fibre Channel packet by mapping at least some of the fields from the packet formatted in accordance with the iSCSI protocol into the Fibre Channel packet;
   if the packet is formatted in accordance with the Fibre Channel protocol, translating the packet into an iSCSI packet by mapping at least some of the fields from the packet formatted in accordance with the Fibre Channel protocol into the iSCSI packet;
   forwarding the packet as translated to a second device; and
   wherein said translating steps are performed without buffering of the packet.

19. The method of claim 18, wherein said translating steps are performed at wire speed.

20. The method of claim 18, wherein the first device is an initiator and the second device is a target.

21. The method of claim 18, wherein the first device is a target and the second device is an initiator.

22. The method of claim 18, wherein the packet received is an iSCSI Command PDU and wherein the packet as translated is a Fibre Channel Command IU.

23. The method of claim 18, wherein the packet received is a Fibre Channel XFR_RDY IU and wherein the packet as translated is an iSCSI R2T PDU.

24. The method of claim 18, wherein the packet received is an iSCSI Write Data PDU and wherein the packet as translated is a Fibre Channel Data IU.

25. The method of claim 18, wherein the packet received is a Fibre Channel Data IU and wherein the packet as translated is an iSCSI Read Data PDU.

26. The method of claim 18, wherein the packet received is a Fibre Channel Response IU and wherein the packet as translated is an iSCSI Response PDU.

27. The method of claim 18, wherein the packet received is a Fibre Channel Command IU and wherein the packet as translated is an iSCSI Command PDU.

28. The method of claim 18, wherein the packet received is an iSCSI R2T PDU and wherein the packet as translated is a Fibre Channel XFR_RDY IU.

29. The method of claim 18, wherein the packet received is a Fibre Channel Data IU and wherein the packet as translated is an iSCSI Write Data PDU.

30. The method of claim 18, wherein the packet received is an iSCSI Read Data PDU and wherein the packet as translated is a Fibre Channel Data IU.

31. The method of claim 18, wherein the packet received is an iSCSI Response PDU and wherein the packet as translated is a Fibre Channel Response IU.

32. A method for use in a system for storing and accessing data, the method comprising:
   receiving at an ingress linecard a packet formatted in accordance with a first protocol, the packet destined for a virtual target with a virtual target address;
   the ingress linecard retrieving information about the virtual target from a virtual target descriptor, the information including a flowID, and placing a virtual target descriptor identifier and the flowID, in a local header of the packet;
   the ingress linecard forwarding the packet to a fabric, which forwards the packet to an egress linecard in accordance with the flowID;
   the egress linecard using the virtual target descriptor identifier to identify information about a physical target associated with the virtual target, including whether the physical target requires a packet formatted in accordance with a second protocol, and using the information about the physical target to convert a virtual target block address to a physical target block address and to translate the format of the packet from the first protocol to the second protocol; and
   the egress linecard sending the packet to the physical target using the physical target block address.

33. The method of claim 32, wherein said egress linecard translates the format of the packet from the first protocol to the second protocol without buffering the packet.

34. The method of claim 32, wherein said egress linecard translates the format of the packet from the first protocol to the second protocol at wire speed.

35. A set of software instructions stored on at least one medium in a switch for use in a system for storing and accessing data, which instructions are executable by a processor, the instructions including:
   instructions for receiving a packet from a first device, the packet formatted in accordance with one of the iSCSI or Fibre Channel protocols;
   if the packet is formatted in accordance with the iSCSI protocol, instructions for translating the packet into a Fibre Channel packet by mapping at least some of the fields from the packet formatted in accordance with the iSCSI protocol into the Fibre Channel packet;
   if the packet is formatted in accordance with the Fibre Channel protocol, instructions for translating the packet into an iSCSI packet by mapping at least some of the fields from the packet formatted in accordance with the Fibre Channel protocol into the iSCSI packet;
   instructions for forwarding the packet as translated to a second device; and
   wherein said instructions for translating the packet by mapping at least some of the fields do not require the packet to be buffered.

* * * * *